(12) United States Patent
Silverman

(10) Patent No.: US 6,545,671 B1
(45) Date of Patent: Apr. 8, 2003

(54) ROTATING ELEMENT SHEET MATERIAL WITH REVERSIBLE HIGHLIGHTING

(75) Inventor: Alexander E. Silverman, Sunnyvale, CA (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/517,522

(22) Filed: Mar. 2, 2000

(51) Int. Cl.$^7$ ................................................ G09G 5/00
(52) U.S. Cl. ............................ 345/179; 345/84; 345/85
(58) Field of Search .......................... 345/84, 85, 179

(56) References Cited

U.S. PATENT DOCUMENTS

| | | | |
|---|---|---|---|
| 2,326,634 A | 8/1943 | Gebhard et al. | ................. 88/82 |
| 2,354,018 A | 7/1944 | Heltzer et al. | .................. 88/82 |
| 2,354,048 A | 7/1944 | Palmquist | ..................... 40/135 |

(List continued on next page.)

FOREIGN PATENT DOCUMENTS

| | | |
|---|---|---|
| WO | WO 98/03896 | 1/1998 |
| WO | WO 98/41899 | 9/1998 |
| WO | WO 99/10767 | 3/1999 |

OTHER PUBLICATIONS

"Xerox PARC and 3M to collaborate on electronic paper," Information Today, vol. 16, No. 8, Sep. 1999.
Gibbs, "The Reinvention of Paper," Scientific American: Technology and Business, Sep. 1998.
Mattis, "Screen Saviors," Business 2.0, Jul. 1999.
Mann, "Who will own your next good idea?" The Atlantic Monthly, Sep. 1998, vol. 282, pp. 57–82.
Comiskey et al., "An electrophoretic ink for all–printed reflective electronic displays," Nature, Jul. 16, 1998, vol. 394, pp. 253–255.
Klein, "Will the future be written in E–Ink?" The Wall Street Journal, Jan. 4, 2000.

(List continued on next page.)

Primary Examiner—Richard Hjerpe
Assistant Examiner—Kevin M. Nguyen
(74) Attorney, Agent, or Firm—Finnegan, Henderson, Farabow, Garrett & Dunner

(57) ABSTRACT

A kit comprising rotating element sheet material, a highlighting implement, and an erasing implement, a binder, and a method of use. The rotating element sheet material comprises a plurality of first rotatable elements and a plurality of second rotatable elements disposed in a substrate. Each first rotatable element in the plurality has a first collection of responses to incident electromagnetic radiation of interest. One response in the first collection renders the first rotatable element transparent-clear to incident electromagnetic energy of interest, and a second response renders the first rotatable element opaque to incident electromagnetic energy of interest. The first rotatable element also exhibits a first work function. Likewise, each second rotatable element has a second collection of responses to incident electromagnetic radiation of interest. A first response in the second collection renders the second rotatable element transparent-clear to the incident electromagnetic energy of interest. A second response renders the second rotatable element transparent-colored to the incident electromagnetic energy of interest. The second rotatable elements also exhibit a second work function that is less than the first work function. The addressing implement introduces a vector field in a first direction in the substrate where the vector field has a magnitude greater than the second work function and less than the first work function. In addition, the erasing implement introduces a vector field in a second direction in the substrate where the vector field has a magnitude greater than the second work function and less than the first work function. The binder is configured to accommodate the rotating element sheet material, the highlighting implement, and the erasing implement.

17 Claims, 34 Drawing Sheets

U.S. PATENT DOCUMENTS

| | | | |
|---|---|---|---|
| 2,354,049 A | 7/1944 | Palmquist | 40/135 |
| 2,407,680 A | 9/1946 | Palmquist et al. | 88/82 |
| 2,600,963 A | 6/1952 | Bland | 49/58 |
| 2,684,788 A | 7/1954 | Bland | 222/177 |
| 2,794,301 A | 6/1957 | Law et al. | 49/84 |
| 2,950,985 A | 8/1960 | d'Adrian | 117/33 |
| 2,965,921 A | 12/1960 | Bland | 18/2.5 |
| 2,980,547 A | 4/1961 | d'Adrian | 106/47 |
| 3,036,388 A | 5/1962 | Tate | 35/66 |
| 3,063,388 A | 11/1962 | Magarian et al. | 105/376 |
| 3,150,947 A | 9/1964 | Bland | 65/21 |
| 3,222,204 A | 12/1965 | Weber et al. | 117/27 |
| 3,243,273 A | 3/1966 | Bland | 65/21 |
| 3,310,391 A | 3/1967 | Law | 65/21 |
| 3,406,363 A | 10/1968 | Tate | 335/302 |
| 3,594,065 A | 7/1971 | Marks | 350/160 |
| 3,615,993 A | 10/1971 | French | 156/155 |
| 3,617,333 A | 11/1971 | Brown | 117/35 |
| 3,648,281 A | 3/1972 | Dahms et al. | 340/373 |
| 3,795,435 A | 3/1974 | Schwab | 350/105 |
| 3,915,771 A | 10/1975 | Gatzke et al. | 156/151 |
| 3,982,334 A | 9/1976 | Tate | 35/66 |
| 4,001,140 A | 1/1977 | Foris et al. | 252/316 |
| 4,002,022 A | 1/1977 | Lopez | 58/126 |
| 4,082,426 A | 4/1978 | Brown | 350/105 |
| RE29,742 E | 8/1978 | Tung | 2/412 |
| 4,117,192 A | 9/1978 | Jorgensen | 428/337 |
| 4,117,194 A | 9/1978 | Barbe et al. | 428/374 |
| 4,126,854 A | 11/1978 | Sheridon | 340/373 |
| 4,143,103 A | 3/1979 | Sheridon | 264/4 |
| 4,143,472 A | 3/1979 | Murata et al. | 35/66 |
| 4,229,732 A | 10/1980 | Hartstein et al. | 340/378.2 |
| 4,232,084 A | 11/1980 | Tate | 428/309 |
| 4,253,909 A | 3/1981 | Lee | 156/654 |
| 4,256,677 A | 3/1981 | Lee | 264/8 |
| 4,261,653 A | 4/1981 | Goodrich | 350/362 |
| 4,267,946 A | 5/1981 | Thatcher | 222/345 |
| 4,268,413 A | 5/1981 | Dabisch | 252/408 |
| 4,273,672 A | 6/1981 | Vassiliades | 252/316 |
| 4,283,438 A | 8/1981 | Lee | 427/47 |
| 4,288,788 A | 9/1981 | Rogers et al. | 340/378.2 |
| 4,299,880 A | 11/1981 | Arens | 428/304 |
| 4,367,920 A | 1/1983 | Tung et al. | 350/105 |
| 4,368,952 A | 1/1983 | Murata et al. | 350/362 |
| 4,374,889 A | 2/1983 | Arens | 428/207 |
| 4,381,616 A | 5/1983 | Saxer | 40/502 |
| 4,402,062 A | 8/1983 | Batchelder | 365/153 |
| 4,411,973 A | 10/1983 | Gilmour et al. | 430/7 |
| 4,417,543 A | 11/1983 | Lee | 118/620 |
| 4,418,098 A | 11/1983 | Maistrovich | 427/161 |
| 4,418,346 A | 11/1983 | Batchelder | 340/787 |
| 4,419,383 A | 12/1983 | Lee | 427/47 |
| 4,438,160 A | 3/1984 | Ishikawa et al. | 427/214 |
| 4,441,791 A | 4/1984 | Hornbeck | 350/360 |
| 4,457,723 A | 7/1984 | Tate | 434/409 |
| 4,492,435 A | 1/1985 | Banton et al. | 350/360 |
| 4,500,172 A | 2/1985 | Gagnon et al. | 350/331 R |
| 4,511,210 A | 4/1985 | Tung et al. | 350/105 |
| 4,532,608 A | 7/1985 | Wu | 365/127 |
| 4,569,857 A | 2/1986 | Tung et al. | 427/163 |
| 4,592,628 A | 6/1986 | Altman et al. | 350/486 |
| 4,627,689 A | 12/1986 | Asher | 350/362 |
| 4,632,517 A | 12/1986 | Asher | 350/360 |
| 4,675,476 A | 6/1987 | Kobayashi | 178/18 |
| 4,678,695 A | 7/1987 | Tung et al. | 428/120 |
| 4,688,900 A | 8/1987 | Doane et al. | 350/347 |
| 4,695,528 A | 9/1987 | Dabisch et al. | 430/290 |
| 4,710,732 A | 12/1987 | Hornbeck | 332/7.51 |
| 4,713,295 A | 12/1987 | Laroche | 428/406 |
| 4,721,649 A | 1/1988 | Belisle et al. | 428/325 |
| 4,725,494 A | 2/1988 | Belisle et al. | 428/325 |
| 4,729,687 A | 3/1988 | Arens | 401/198 |
| 4,740,266 A | 4/1988 | Wu | 156/633 |
| 4,781,789 A | 11/1988 | Wu | 156/633 |
| 4,781,790 A | 11/1988 | Wu | 156/633 |
| 4,783,236 A | 11/1988 | Wu | 156/633 |
| 4,795,243 A | 1/1989 | Suzuki | 350/362 |
| 4,795,528 A | 1/1989 | Wu | 156/633 |
| 4,810,431 A | 3/1989 | Leidner | 264/15 |
| 4,837,071 A | 6/1989 | Tagoku et al. | 428/195 |
| 4,877,253 A | 10/1989 | Arens | 273/240 |
| 4,890,902 A | 1/1990 | Doane et al. | 350/347 |
| 4,919,521 A | 4/1990 | Tada et al. | 350/362 |
| 4,931,019 A | 6/1990 | Park | 434/409 |
| 4,948,232 A | 8/1990 | Lange | 350/334 |
| 4,956,619 A | 9/1990 | Hornbeck | 330/4.3 |
| 4,991,941 A | 2/1991 | Kalmanash | 350/347 |
| 4,994,204 A | 2/1991 | Doane et al. | 252/299.01 |
| 5,039,557 A | 8/1991 | White | 427/137 |
| 5,066,559 A | 11/1991 | Elmasry et al. | 430/111 |
| 5,075,186 A | 12/1991 | Sheridon | 430/47 |
| 5,128,203 A | 7/1992 | LaRoche | 428/325 |
| 5,131,736 A | 7/1992 | Alvarez | 359/886 |
| 5,151,032 A | 9/1992 | Igawa | 434/409 |
| 5,155,607 A | 10/1992 | Inoue et al. | 359/51 |
| 5,157,011 A | 10/1992 | Okabe et al. | 503/201 |
| 5,189,658 A | 2/1993 | Moses | 369/100 |
| 5,219,820 A | 6/1993 | Morohoshi et al. | 503/204 |
| 5,223,473 A | 6/1993 | Oliver et al. | 503/226 |
| 5,226,099 A | 7/1993 | Mignardi et al. | 385/19 |
| 5,233,459 A | 8/1993 | Bozler et al. | 359/230 |
| 5,249,000 A | 9/1993 | Okabe et al. | 346/151 |
| 5,251,048 A | 10/1993 | Doane et al. | 359/51 |
| 5,262,098 A | 11/1993 | Crowley et al. | 264/8 |
| 5,262,374 A | 11/1993 | Okabe et al. | 503/201 |
| 5,270,872 A | 12/1993 | Spry | 359/885 |
| 5,274,460 A | 12/1993 | Yamada et al. | 358/296 |
| 5,290,066 A | 3/1994 | Mody | 281/15.1 |
| 5,315,418 A | 5/1994 | Sprague et al. | 359/41 |
| 5,315,776 A | 5/1994 | Strawbridge et al. | 40/505 |
| 5,331,454 A | 7/1994 | Hornbeck | 359/224 |
| 5,344,594 A | 9/1994 | Sheridon | 264/4.1 |
| 5,351,995 A | 10/1994 | Booker | 283/117 |
| 5,354,598 A | 10/1994 | Arens | 428/195 |
| 5,363,222 A | 11/1994 | Ledebuhr | 359/40 |
| 5,383,008 A | 1/1995 | Sheridon | 355/256 |
| 5,384,067 A | 1/1995 | Doane et al. | 252/299.01 |
| 5,389,426 A | 2/1995 | Arens et al. | 428/195 |
| 5,389,945 A | 2/1995 | Sheridon | 345/85 |
| 5,397,503 A | 3/1995 | Yuasa et al. | 252/299.01 |
| 5,411,398 A | 5/1995 | Nakanishi et al. | 434/409 |
| 5,416,996 A | 5/1995 | Clemens et al. | 40/502 |
| 5,432,526 A | 7/1995 | Hyatt | 345/87 |
| 5,432,534 A | 7/1995 | Maruyama et al. | 347/172 |
| 5,459,602 A | 10/1995 | Sampsell | 359/234 |
| 5,469,020 A | 11/1995 | Herrick | 313/511 |
| 5,475,401 A * | 12/1995 | Verrier et al. | 178/18.03 |
| 5,515,075 A | 5/1996 | Nakagiri et al. | 345/111 |
| 5,526,016 A | 6/1996 | Nakagiri et al. | 345/111 |
| 5,535,047 A | 7/1996 | Hornbeck | 359/295 |
| 5,582,700 A | 12/1996 | Bryning et al. | 204/450 |
| 5,604,027 A | 2/1997 | Sheridon | 428/323 |
| 5,627,562 A | 5/1997 | Skodlar | 345/111 |
| 5,659,330 A | 8/1997 | Sheridon | 345/84 |
| 5,667,924 A | 9/1997 | Ziolo | 430/39 |
| 5,703,671 A | 12/1997 | Narita et al. | 355/32 |
| 5,708,525 A | 1/1998 | Sheridon | 359/296 |
| 5,717,283 A | 2/1998 | Biegelsen et al. | 313/483 |
| 5,717,514 A | 2/1998 | Sheridon | 359/296 |
| 5,717,515 A * | 2/1998 | Sheridon | 345/107 |
| 5,723,204 A | 3/1998 | Stefik | 428/206 |

| | | | |
|---|---|---|---|
| 5,724,064 A | 3/1998 | Stefik et al. | 345/105 |
| 5,731,792 A | 3/1998 | Sheridon | 345/84 |
| 5,737,115 A | 4/1998 | Mackinlay et al. | 359/296 |
| 5,739,801 A | 4/1998 | Sheridon | 345/84 |
| 5,739,946 A | 4/1998 | Iwanaga et al. | 359/296 |
| 5,751,268 A | 5/1998 | Sheridon | 345/107 |
| 5,754,332 A | 5/1998 | Crowley | 359/296 |
| 5,757,345 A | 5/1998 | Sheridon | 345/84 |
| 5,760,761 A | 6/1998 | Sheridon | 345/107 |
| 5,767,826 A | 6/1998 | Sherdon et al. | 345/84 |
| 5,777,782 A | 7/1998 | Sheridon | 359/296 |
| 5,784,189 A | 7/1998 | Bozler et al. | 359/254 |
| 5,808,593 A | 9/1998 | Sheridon | 345/84 |
| 5,808,783 A | 9/1998 | Crowley | 359/296 |
| 5,815,306 A | 9/1998 | Sheridon et al. | 359/296 |
| 5,821,624 A | 10/1998 | Pasch | 257/776 |
| 5,825,529 A | 10/1998 | Crowley | 359/296 |
| 5,828,441 A | 10/1998 | Narita et al. | 355/32 |
| 5,866,284 A | 2/1999 | Vincent | 430/37 |
| 5,869,929 A | 2/1999 | Eida et al. | 313/501 |
| 5,877,844 A | 3/1999 | Matsumoto | 355/35 |
| 5,891,479 A | 4/1999 | Sheridon | 425/8 |
| 5,892,497 A | 4/1999 | Robertson | 345/107 |
| 5,893,206 A | 4/1999 | Furlani et al. | 29/608 |
| 5,894,367 A | 4/1999 | Sheridon | 359/623 |
| 5,900,192 A | 5/1999 | Richley | 264/8 |
| 5,900,858 A * | 5/1999 | Richley | 345/107 |
| 5,904,790 A | 5/1999 | Sheridon | 156/83 |
| 5,906,743 A | 5/1999 | Cohen et al. | 210/502.1 |
| 5,914,805 A | 6/1999 | Crowley | 359/296 |
| 5,917,646 A | 6/1999 | Sheridon | 359/296 |
| 5,919,409 A | 7/1999 | Sheridon | 264/8 |
| 5,922,268 A | 7/1999 | Sheridon | 264/437 |
| 5,930,026 A | 7/1999 | Jacobson et al. | 359/296 |
| 5,940,054 A | 8/1999 | Harris | 345/85 |
| 5,956,005 A | 9/1999 | Sheridon | 345/84 |
| 5,961,804 A | 10/1999 | Jacobson et al. | 204/606 |
| 5,969,472 A | 10/1999 | Kisner | 313/484 |
| 5,974,901 A | 11/1999 | Zborowski et al. | 73/865.5 |
| 5,975,680 A | 11/1999 | Wen et al. | 347/43 |
| 5,976,428 A | 11/1999 | Richley | 264/10 |
| 5,982,346 A | 11/1999 | Sheridon et al. | 345/85 |
| 5,986,629 A | 11/1999 | Smith et al. | 345/84 |
| 5,989,629 A | 11/1999 | Sacripante et al. | 427/180 |
| 6,014,116 A | 1/2000 | Haynes et al. | 345/1 |
| 6,014,247 A | 1/2000 | Winter et al. | 359/296 |
| 6,017,584 A | 1/2000 | Albert et al. | 427/213.3 |
| 6,034,807 A | 3/2000 | Little et al. | 359/227 |
| 6,038,059 A | 3/2000 | Silverman | 359/296 |
| 6,054,071 A | 4/2000 | Mikkelsen, Jr. | 264/1.36 |
| 6,054,809 A | 4/2000 | Haynes et al. | 313/505 |
| 6,055,091 A | 4/2000 | Sheridon et al. | 359/296 |
| 6,067,185 A | 5/2000 | Albert et al. | 359/296 |
| 6,072,621 A | 6/2000 | Kishi et al. | 359/296 |
| 6,097,531 A | 8/2000 | Sheridon | 359/296 |
| 6,110,538 A | 8/2000 | Sheridon | 427/457 |
| 6,118,419 A | 9/2000 | Smith et al. | 345/84 |
| 6,120,588 A | 9/2000 | Jacobson | 106/31.16 |
| 6,120,839 A | 9/2000 | Comiskey et al. | 427/213.3 |
| 6,122,094 A | 9/2000 | Silverman | 359/296 |
| 6,128,124 A | 10/2000 | Silverman | 359/296 |
| 6,130,773 A | 10/2000 | Jacobson et al. | 359/296 |
| 6,137,467 A | 10/2000 | Sheridon et al. | 345/107 |
| 6,147,791 A | 11/2000 | Sheridon | 359/296 |
| 6,162,321 A | 12/2000 | Silverman | 156/276 |
| 6,174,153 B1 | 1/2001 | Sheridon | 425/3 |
| RE37,085 E | 3/2001 | Sheridon | 428/323 |
| 6,197,228 B1 | 3/2001 | Sheridon | 264/1.36 |
| 6,211,998 B1 | 4/2001 | Sheridon | 359/296 |
| 6,222,513 B1 * | 4/2001 | Howard et al. | 345/107 |
| 6,243,058 B1 * | 6/2001 | Mikkelsen et al. | 345/84 |

OTHER PUBLICATIONS

Wisnieff, "Printing Screens," Nature, Jul. 16, 1998, vol. 394, Issue No. 6690, pp. 225 and 227.

L.L. Lee, "A Magnetic–Particles Display," IEEE Transactions on Electron Devices, vol. ED–22, No. Sep. 9, 1975, pp. 758–765.

L.L. Lee, "Fabrication of Magnetic Particles Displays," Proceeding of the S.I.D., vol. 18/3 & 4 1977, pp. 283–288.

* cited by examiner

ROTATING ELEMENT SHEET MATERIAL WITH REVERSIBLE HIGHLIGHTING

RELATED APPLICATIONS

The following identified United States patent applications are relied upon and are fully incorporated herein by reference:

U.S. patent application entitled "System and method for rotatable element assembly and laminate substrate assembly," by David K. Biegelsen, Joseph, M. Crowley, and Alexander E. Silverman, filed on Dec. 17, 1999, and accorded Ser. No. 09/465,801.

U.S. patent application entitled "Rotating element sheet material with microstructured substrate and method of use," by John Christopher Knights, filed on May 3, 1999, and accorded Ser. No. 09/564,504.

U.S. patent application entitled "Rotating element sheet material with generalized containment structure substrate," by Nicholas K. Sheridon, filed on Apr. 14, 1999, and accorded Ser. No. 09/549,518.

I. FIELD OF THE INVENTION

The present invention relates to the fabrication of reversible highlighting rotating element sheet material and to a reversible highlighting addressing method.

II. BACKGROUND OF THE INVENTION

One of the largest expenditures in the area of education is that of textbooks and course materials. The market for both new and used textbooks and course materials extends through all levels of education, from elementary school to college and beyond to graduate and professional school. One of the most common reasons that educational material inevitably drops out of the new and used markets is due to a mainstay of studying techniques: the use of write-only conventional highlighters. As more advanced modes are created for conveying textual and graphical information, as with "reusable electric paper," it remains desirable to duplicate the advantages of the conventional highlighter while avoiding the drawbacks.

I.A.1. Conventional Highlighters

The conventional highlighter, or conventional highlighting implement, is generally a felt-tipped marker and is available commercially under the names HI-LITER (available from Avery Dennison, Pasadena, Calif.) and POCKET ACCENT (available from Sanford, Bellwood, Ill.), as well as others. The highlighting implement is used to apply a layer of transparent-colored ink to light-colored paper printed with conventional dark-colored ink. The transparent color of the highlighting ink is usually selected such that, when applied to the light-colored paper, a noticeable change in appearance occurs. Visually, text or graphics of a first dark color on a background of a first light color is altered to appear as text or graphics in a second dark color on background of a second light color. The first dark color corresponds to the color of the conventional ink used to print the text or graphics. Likewise, the first light color corresponds to the color of the paper on which the text or graphics was printed. Furthermore, the second dark color is a combination of the first dark color and the first transparent color of the highlighting ink. Usually, the first transparent color of the highlighting ink is chosen such that the first dark color appears visually identical to the second dark color. That is, the first dark color saturates the first transparent color. Conversely, the first transparent color of the highlighting ink is chosen such that there is a noticeable difference between the first light color and the second light color. However, it is also chosen such that there remains sufficient contrast between the second light color and the second dark color so that the text or graphics in a second dark color on a background of a second light color remain legible. By way of example, the first light color may be white, the first dark color may be black, and the first transparent color of the highlighting ink may be yellow, orange, pink, or other colors. In the example described above, the first transparent color of the highlighting ink saturates the white appearance of the first light-colored background.

As a write-only process, subsequent conventional highlights after a first conventional highlight are of decreasing usefulness when the goal of the user is to mark significant passages of text for later easy reference. A typical practice after a first conventional highlight is to select a highlighting ink of a second transparent color that saturates the first transparent color. For example, if the first transparent color is yellow, the first light color is white, and the first dark color is black, a second transparent ink that is orange-colored will generally saturate the yellow-colored appearance of the first conventional highlight. Following a second conventional highlight, again, there is decreasing usefulness in a third or fourth conventional highlight. Ultimately, the highlighted material is discarded, and a fresh set of materials that present text or graphics of a first dark color on a background of a first light color is generated for a first conventional highlight.

There also exist a class of so-called "erasable highlighters." For example, U.S. Pat. No. 3,941,488, and U.S. Pat. No. 4,681,471 disclose kits consisting of markers and erasers where the marker disperses an ink, and the eraser disperses a corresponding reagent selected to remove or obliterate the dispersed ink without affecting the appearance of the underlying text and graphics. Both of the above disclosures, however, are based on a specific pairing between marking ink and erasing reagent, and are not generally suitable for all commercially available highlighters. U.S. Pat. No. 5,427,278 discloses a highlighting-ink remover designed to, obliterate water-based, non-pigmented dyes without affecting, again, the underlying text and graphics. Although the above technique is more suitable than the preceding two with respect to use with conventional highlighters, it is based upon the use of a liquid bleaching agent, and, hence, the quality of the paper or substrate can be affected following each use. Again, such a technique can be of decreasing usefulness after each highlight and removal.

In light of the foregoing, it remains desirable to fabricate textbooks and course materials that can accommodate reversible highlighting without affecting the quality of the underlying text, graphics, or substrate following each highlight and removal. Therefore, later users can reverse all of the existing highlighted aspects and then introduce new highlighted aspects to suit their own needs.

II.A. Rotating Element Sheet Material

Rotating element sheet material has been disclosed in U.S. Pat. Nos. 4,126,854 and 4,143,103, both herein incorporated by reference, and generally comprises a substrate, an enabling fluid, and a class of rotatable elements. As discussed more below, rotating element sheet material has found a use as "reusable electric paper." FIG. 1 depicts an enlarged section of rotating element sheet material 18, including rotatable element 10, enabling fluid 12, cavity 14, and substrate 16. Observer 28 is also shown. Although FIG. 1 depicts a spherically shaped rotatable element and cavity, many other shapes will work and are consistent with the present invention. As disclosed in U.S. Pat. No. 5,389,945, herein incorporated by reference, the thickness of substrate 16 may be of the order of hundreds of microns, and the dimensions of rotatable element 10 and cavity 14 may be of the order of 10 to 100 microns.

In FIG. 1, substrate 16 is an elastomer material, such as silicone rubber, that accommodates both enabling fluid 12 and the class of rotatable elements within a cavity or cavities disposed throughout substrate 16. The cavity or cavities contain both enabling fluid 12 and the class of rotatable elements such that rotatable element 10 is in contact with enabling fluid 12 and at least one translational degree of freedom of rotatable element 10 is restricted. The contact between enabling fluid 12 and rotatable element 10 breaks a symmetry of rotatable element 10 and allows rotatable element 10 to be addressed. The state of broken symmetry of rotatable element 10, or addressing polarity, can be the establishment of an electric dipole about an axis of rotation. For example, it is well known that small particles in a dielectric liquid acquire an electrical charge that is related to the Zeta potential of the surface coating. Thus, an electric dipole can be established on a rotatable element in a dielectric liquid by the suitable choice of coatings applied to opposing surfaces of the rotatable element.

The use of rotating element sheet material 18 as "reusable electric paper" is due to the fact that the rotatable elements are typically given a second broken symmetry, a multivalued aspect, correlated with the addressing polarity discussed above. That is, the above mentioned coatings may be chosen so as to respond to incident electromagnetic energy in distinguishable ways. Thus, the aspect of rotatable element 10 to observer 28 favorably situated can be controlled by an applied vector field.

For example, as disclosed in U.S. Pat. No. 4,126,854, hereinabove incorporated by reference, rotatable element 10 may comprise a black polyethylene generally spherical body with titanium oxide sputtered on one hemisphere, where the titanium oxide provides a light-colored aspect in one orientation. Such a rotatable element in a transparent dielectric liquid will exhibit the desired addressing polarity as well as the desired aspect.

II.B. Rotatable Elements with Two-valued Aspects

A multivalued aspect in its simplest form is a two-valued aspect. When the aspect is the chromatic response to visible light, rotatable element 10 with a two-valued aspect can be referred to as a bichromal rotatable element. Such a rotatable element is generally fabricated by the union of two layers of material as described in U.S. Pat. No. 5,262,098, herein incorporated by reference.

FIGS. 2–4 depict rotatable element 10 with a two-valued aspect and an exemplary system that use such rotatable elements. In FIG. 2, rotatable element 10 is composed of first layer 20 and second layer 22 and is, by way of example again, a generally spherical body. The surface of first layer 20 has first coating 91 at a first Zeta potential, and the surface of second layer 22 has second coating 93 at a second Zeta potential. First coating 91 and second coating 93 are chosen such that, when in contact with a dielectric fluid (not shown), first coating 91 has a net positive electric charge with respect to second coating 93. This is depicted in FIG. 2 by the "+" and "−" symbols respectively. Furthermore, the combination of first coating 91 and the surface of first layer 20 is non-white-colored, indicated in FIG. 2 by hatching, and the combination of second coating 93 and the surface of second layer 22 is white-colored. One skilled in the art will appreciate that the material associated with first layer 20 and first coating 91 may be the same. Likewise, the material associated with second layer 22 and second coating 93 may be the same.

FIG. 3 depicts no-field set 30. No-field set 30 is a subset of randomly oriented rotatable elements in the vicinity of vector field 24 when vector field 24 has zero magnitude. Vector field 24 is an electric field. No-field set 30, thus, contains rotatable elements with arbitrary orientations with respect to each other. Therefore, observer 28 in the case of no-field set 30 registers views of the combination of second coating 93 and the surface of second layer 22, and first coating 91 and the surface of first layer 20 in an unordered sequence. Infralayer 26 forms the backdrop of the aspect. Infralayer 26 can consist of any type of material or aspect source, including but not limited to other rotatable elements or some material that presents a given aspect to observer 28.

FIG. 4 depicts first aspect set 32. First aspect set 32 is a subset of rotatable elements in the vicinity of vector field 24 when the magnitude of vector field 24 is nonzero and has the orientation indicated by arrow 25. In first aspect set 32, all of the rotatable elements orient themselves with respect to arrow 25 due to the electrostatic dipole present on each rotatable element 10. In contrast to no-field set 30, observer 28 in the case of first aspect set 32 registers a view of a set of rotatable elements ordered with the non-white-colored side up. Again, infralayer 26 forms the backdrop of the aspect. In FIG. 4, rotatable element 10, under the influence of applied vector field 24, orients itself with respect to vector field 24 due to the electric charges present as a result of first coating 91 and second coating 93, as depicted in FIG. 2.

One skilled in the art will appreciate that first aspect set 32 will maintain its aspect after applied vector field 24 is removed, in part due to the energy associated with the attraction between rotatable element 10 and the substrate structure, as, for example, cavity walls (not shown). This energy contributes, in part, to the switching characteristics and the memory capability of rotating element sheet material 18, as disclosed in U.S. Pat. No. 4,126,854, hereinabove incorporated by reference, and discussed in more detail below.

II.C. Rotatable Elements with Multivalued Aspect

A rotatable element with multivalued aspect is generally fabricated as disclosed in U.S. Pat. No. 5,919,409, herein incorporated by reference. An exemplary rotatable element 10 with multivalued aspect is depicted in FIG. 5. Rotatable element 10 in FIG. 5 is composed of first layer 36, second layer 37 and third layer 38. First layer 36 and third layer 38 are transparent-clear to visible light and second layer 37 may be opaque or transparent-colored to visible light. The surface of third layer 38 has third coating 95 at a first Zeta potential, and the surface of first layer 36 has first coating 97 at a second Zeta potential such that third coating 95 has a net positive charge, "+," with respect to first coating 97 when rotatable element 10 is in contact with a dielectric fluid (not shown). First coating 97 and third coating 95 are also chosen to be transparent-clear to visible light. As above, one skilled in the art will appreciate that the material associated with first layer 36 and first coating 97 may be the same. Likewise, the material associated with third layer 38 and third coating 95 may be the same.

Rotatable elements with multivalued aspects are generally utilized in rotating element sheet material that uses canted vector fields for addressing. A canted vector field is a field whose orientation vector in the vicinity of a subset of rotatable elements can be set so as to point in any direction in three-dimensional space. U.S. Pat. No. 5,717,515, herein incorporated by reference, discloses the use of canted vector fields in order to address rotatable elements. The use of canted vector fields with rotating element sheet material 18 allows complete freedom in addressing the orientation of a subset of rotatable elements, where the rotatable elements have the addressing polarity discussed above. An exemplary system that utilizes rotatable elements with three-valued aspects and a canted vector field for addressing is depicted in FIGS. 6–9.

In FIGS. 6–9, rotatable element 10 with a multivalued aspect is a "light valve," as disclosed, for example, in U.S. Pat. No. 5,737,115, herein incorporated by reference and depicted in FIG. 5. FIGS. 6 and 7 depict first aspect set 72. In first aspect set 72, observer 28 registers a coherent view of the face of the disk of opaque or transparent-color second layer 37. Such a case corresponds to the case of a light valve that is "closed." First aspect set 72 maximally obstructs infralayer 26, where infralayer 26 can consist of any type of material or aspect source, including but not limited to other rotatable elements, or some material that presents a given aspect to observer 28. FIG. 6 is a side view indicating the relative positions of observer 28, first aspect set 72, and infralayer 26. FIG. 7 is an alternate view of first aspect set 72 from a top perspective. In FIG. 7, the symbol ⊖ indicates an arrow directed out of the plane of the figure. In FIGS. 6 and 7, rotatable element 10, under the influence of applied vector field 24, orients itself with respect to vector field 24 due to the electric charges present as a result of first coating 97 and third coating 95, as depicted in FIG. 5.

FIGS. 8 and 9 depict second aspect set 76 of the system introduced in FIGS. 5–7. In second aspect set 76, observer 28 registers a coherent view of the disk of opaque or transparent-color second layer 37 edge-on. In this case, infralayer 26 is minimally obstructed by the set of rotatable elements. Such a case corresponds to the case of a light valve that is "open." FIG. 8 is a side view indicating the relative positions of observer 28, second aspect set 76, and infralayer 26. FIG. 9 is an alternate view of second aspect set 76 from a top perspective. Again, in FIGS. 8 and 9, rotatable element 10, under the influence of applied vector field 24, orients itself with respect to vector field 24 due to the electric charges present as a result of first coating 97 and third coating 95, as depicted in FIG. 5.

One skilled in the art will appreciate that first aspect set 72 and second aspect set 76 will maintain their orientation after applied vector field 24 is removed due to the energy associated with the attraction between rotatable element 10 and the substrate structure, as, for example, cavity walls (not shown). Again, this energy contributes, in part, to the switching characteristics and the memory capability of rotating element sheet material 18, as disclosed in U.S. Pat. No. 4,126,854, hereinabove incorporated by reference and discussed in more detail below.

In addition, one skilled in the art will appreciate that no-field set, first aspect set, and second aspect set discussed above in FIGS. 3, 4, and 6–9 can form the elements of a pixel, where vector field 24 can be manipulated on a pixel by pixel basis using an addressing scheme as discussed, for example, in U.S. Pat. No. 5,717,515, hereinabove incorporated by reference.

II.D. Work Function

As discussed above, a useful property of rotating element sheet material 18 is the ability to maintain a given aspect after the applied vector field 24 for addressing is removed. This ability contributes, in part, to the switching characteristics and the memory capability of rotating element sheet material 18, as disclosed in U.S. Pat. No. 4,126,854, hereinabove incorporated by reference. This will be referred to as aspect stability. The mechanism for aspect stability in the above embodiments is generally the energy associated with the attraction between the rotatable elements and the substrate structure, or "work function." A host of factors influence the magnitude of the energy associated with the work function including, but not limited to: surface tension of enabling fluid in contact with first rotatable element or second rotatable element; the relative specific gravity of the rotatable elements to the enabling fluid; magnitude of charge on rotatable elements in contact with substrate structure, as, for example, cavity walls; relative electronic permittivity of enabling fluid and substrate structure; "stickiness" of substrate structure; and other residual fields that may be present. The applied vector field 24 for addressing must be strong enough to overcome the work function in order to cause an orientation change; furthermore, the work function must be strong enough to maintain this orientation in the absence of an applied vector field 24 for addressing.

FIG. 10 depicts a subsection of rotating element sheet material 18 that includes first rotatable element 80 and second rotatable element 90. Again, although FIG. 10 depicts spherically shaped rotatable elements and cavities, many other shapes will work and are consistent with the present invention, as, for example, cylindrically shaped rotatable elements and cavities. Also shown in FIG. 10 is enabling fluid 12, first cavity wall 82, second cavity wall 92, substrate 16, and surface 94. In the exemplary subsection of rotating element sheet material depicted in FIG. 10, first rotatable element 80 and second rotatable element 90 are fabricated so as to exhibit different work functions. For example, as disclosed in U.S. Pat. No. 5,739,801, herein incorporated by reference, a spherical rotatable element with a larger diameter and the same coatings as a spherical rotatable element with a smaller diameter can be shown to exhibit a higher work function. In FIG. 10, it is the interaction between first rotatable element 80 and first cavity wall 82 that gives rise to first work function. Likewise, it is the interaction between second rotatable element 90 and second cavity wall 92 that gives rise to second work function.

FIG. 11 depicts an exemplary graph of number 112, N, of rotatable elements that change orientation as a function of applied vector field 24, V, for rotating element sheet material 18 of FIG. 10 including a plurality of first rotatable elements 80 and a plurality of second rotatable elements 90. First work function 124, $V_w^1$, corresponds to the magnitude of applied vector field 24 when the number of first rotatable elements 80 and second rotatable elements 90 that change orientation has reached first saturation level 116 plus second saturation level 114, $N_s^1 + N_s^2$, corresponding to the orientation change of all first rotatable elements 80 and second rotatable elements 90 under the influence of applied vector field 24. Likewise, second work function 122, $V_w^2$, corresponds to the magnitude of applied vector field 24 when the number of second rotatable elements 90 that change orientation has reached second saturation level 114, $N_s^2$, corresponding to the orientation change of all second rotatable elements 90 only under the influence of applied vector field 24.

The process of addressing first rotatable elements 80 or second rotatable elements 90 only is depicted in FIGS. 12–14 and summarized below in Table 1.

As disclosed, for example, in U.S. Pat. No. 5,739,801, herein incorporated by reference, the process of changing the orientation of first rotatable elements 80 only from the orientation depicted in FIG. 10 involves a two-step process. The first step is indicated in FIG. 12. In FIG. 12, vector field 24 is applied in the direction of arrow 100 at first work function 124. This causes all of first rotatable elements 80 and second rotatable elements 90 to change orientation so that their addressing polarity aligns with the direction of the applied vector field 24. This is indicated in FIG. 12. In the context of the "light-valve" rotatable element discussed earlier, such an orientation corresponds to "closed" valves.

In the second step of the two-step process, vector field 24 is applied in the direction of transverse arrow 110 at second work function 122. This causes all of second rotatable elements 90 to change orientation so that their addressing polarity aligns with the direction of the applied vector field 24. This is depicted in FIG. 13. The purpose of the second step is to change the orientation of the second rotatable elements 90 back to the "open" orientation. This will be referred to as "highlight-erasing" the aspect associated with the second rotatable elements 90.

Likewise, the process of changing the orientation of second rotatable elements 90 only from the orientation depicted in FIG. 10 is depicted in FIG. 14. Second work function 122 is applied in the direction of arrow 100 in order to change the orientation of second rotatable elements 90 only. This causes all of second rotatable elements 90 to change orientation so that their addressing polarity aligns with the direction of the applied vector field 24. In FIG. 14, first rotatable element 80 that is initially in an "open" orientation remains in an open orientation.

In this way, one or the other of the rotatable elements can be selectively oriented for viewing by favorably situated observer 28.

The method of selectively orienting first rotatable element 80 or second rotatable element 90 only is surnmarized below in Table 1. In Table 1, the columns are divided according to applied vector field 24 at first work function 124 or applied vector field 24 at second work function 122, and the columns are further subdivided according to whether the orientation of vector field 24 is in the general direction of observer 28, indicated by the symbol $\odot$ and corresponding to the direction of arrow 100, or whether it is generally transverse to the direction of observer 28, indicated by the symbol $\rightarrow$ and corresponding to the direction of transverse arrow 110. The letter "Y" indicates that an applied field of magnitude suitable to overcome the appropriate work function is present in that particular orientation, and the letter "N" indicates that an applied field of magnitude not suitable to overcome the appropriate work function is present in that particular orientation. An additional column that indicates the number of steps necessary to obtain the desired aspect from a previous different aspect is also indicated. The row labeled "First Aspect" corresponds to the aspect and orientation depicted in FIG. 13, and the row labeled "Second Aspect" corresponds to the aspect and orientation depicted in FIG. 14. The use of "Y-1st" indicates the first step of a two-step process, and the use of "Y-2nd" indicates the second step of a two-step process. For both rows, the starting orientation is that orientation depicted in FIG. 10.

TABLE 1

| Aspect at figure plane | $\odot V_w^1$ | $\rightarrow V_w^1$ | $\odot V_w^2$ | $\rightarrow V_w^2$ | Number of steps |
|---|---|---|---|---|---|
| First aspect | Y-1st | N | N | Y-2nd | 2 |
| Second aspect | N | N | Y | N | 1 |

II.E. Erasure Systems

A system for introducing a canted vector field in the direction of transverse arrow 110 for erasing purposes has been described, for example, in U.S. Pat. No. 5,708,525, herein incorporated by reference. FIG. 15 depicts selective erasing system 180 that can be used to introduce vector field 24 in the direction of transverse arrow 110 through a subsection of rotating element sheet material 18. In FIG. 15, selective erasing system 180 contains potential drop implement 182. As depicted in FIG. 15, one side of potential drop implement 182 has a magnitude equal to first potential 181, $V_1$, and the opposite side of potential drop implement 182 has a magnitude equal to second potential 183, $V_2$. Thus, potential drop implement 182 introduces vector field 24 throughout section 178 of the substrate of rotating element sheet material 18 in the direction of transverse arrow 110. Thus, by bringing selective erasing system 180 near surface 94 of rotating element sheet material 18, an erasing field is selectively introduced. The potential drop implement 182 is preferably located at the distal end of selective erasing system 180, where one side of distal end of selective erasing system 180 is determined by the location of first potential 181 and the opposite side of distal end of selective erasing system 180 is determined by the location of second potential 183.

Another erasing system is depicted in FIG. 16 and is also disclosed in U.S. Pat. No. 5,708,525, hereinabove incorporated by reference. In FIG. 16, positive electrode 184 and negative electrode 185 are dispersed throughout rotating element sheet material 18. The view depicted in FIG. 16 is a top perspective of rotating element sheet material 18. The dotted rectangular outline depicts rotating element sheet material 18. Positive electrode 184 and negative electrode 185 protrude outside of rotating element sheet material 18, and extend within rotating element sheet material 18 beneath surface 94 in the example depicted in FIG. 16. The magnitude of vector field 24 is given by the potential difference, V, between positive electrode 184 and negative electrode 185. The symbol "+" indicates a positive polarity and the symbol "−" indicates a negative polarity. Again, vector field 24 of magnitude V will be oriented in the direction of transverse arrow 110 or transverse arrow 111. Thus, by introducing a suitable potential difference between positive electrode 184 and negative electrode 185 the entire sheet of rotating element sheet material 18 can be bulk-erased.

In what follows, "substantive aspect" is the aspect addressed at first work function 124, excluding those aspects that can be addressed at lower values of the applied vector field 24, and hence can be erased at lower values of the applied vector field 24. For example, addressing system 190, disclosed in U.S. Pat. No. 5,389,945, herein incorporated by reference, and depicted in FIG. 17 can be a horizontal bar or wand which travels down surface 94 of rotating element sheet material 18 in the direction of arrow 130 and addresses all first rotatable elements 80 to create substantive aspect 160. The exemplary rotating element sheet material 18 of FIG. 10 is rotating element sheet material 18 of this discussion. Bottom surface 192, which may comprise electrodes, interacts with addressing system 190, which rides along top surface 94 of rotating element sheet material 18, to introduce the appropriate vector field 24 at the appropriate location across addressing system 190. One skilled in the art will appreciate, however, that other addressing systems are also possible. Again, the view in FIG. 17 is from a top perspective.

In addition to addressing all of the first rotatable elements 80, as described above, all of the second rotatable elements 90 will also be highlight-addressed by the device depicted in FIG. 17 and also as depicted in FIG. 12. Thus, in order to orient second rotatable elements 90 such that they again present a transparent-clear aspect to observer 28, rotating element sheet material 18 can be highlight-erased at second work function 122. Either of the erasure systems presented in FIGS. 15 or 16 can be used to introduce a suitable highlight-erasing field.

III. SUMMARY OF THE INVENTION

Accordingly, a first embodiment of the present invention comprises a system of rotating element sheet material with reversible highlighting and a highlighting implement, where the rotating element sheet material with reversible highlighting is fabricated using two pluralities of rotatable elements. One plurality of rotatable elements is addressed to present a first aspect associated with substantive aspect, and the second plurality of rotatable elements is addressed to present a second aspect associated with reversible highlighting. The highlighting implement is configured to selectively orient the second rotatable elements only using a first vector field.

A second embodiment of the present invention comprises a system of rotating element sheet material with reversible highlighting and a highlighting implement, where the rotating element sheet material with reversible highlighting is fabricated using three pluralities of rotatable elements, where one plurality of rotatable elements is addressed to present a first aspect associated with substantive aspect, the second plurality of rotatable elements is addressed to present a second aspect associated with a first reversible highlighting, and the second and third rotatable elements together are addressed to present a third aspect associated with a second reversible highlighting. The highlighting implement is configured to either selectively orient the second rotatable elements only using a first vector field in a first direction, or selectively orient both the second rotatable elements and the third rotatable elements using a second vector field in a first direction.

Another embodiment of the present invention comprises the first embodiment system described above, further comprising an erasing implement, where the erasing implement is configured to selectively orient the second rotatable elements only using a second vector field.

A further embodiment of the present invention comprises the second embodiment system described above, further comprising an erasing implement, where the erasing implement is configured to either selectively orient the second rotatable elements only using the first vector field in a second direction or selectively orient both the second rotatable elements and the third rotatable elements using the second vector field in a second direction.

Further, in another embodiment of the present invention, a kit comprises the first embodiment system described above, an erasing implement, and a binder, where the erasing implement is configured to selectively orient the second rotatable elements only using a second vector field, and the binder is configured to accommodate the first embodiment system and the erasing implement.

Further still, in another embodiment of the present invention, a kit comprises the second embodiment system described above, an erasing implement, and a binder, where the erasing implement is configured to either selectively orient the second rotatable elements only using the first vector field in a second direction or selectively orient both the second rotatable elements and the third rotatable elements using the second vector field in a second direction, and the binder is configured to accommodate the second embodiment system and the erasing implement.

A first embodiment of a method of use consistent with the present invention comprises: providing the first embodiment system above; providing an erasing implement, where the erasing implement is configured to selectively orient the second rotatable elements only using a second vector field; applying the highlighting implement to a first region of the rotating element sheet material with reversible highlighting to selectively orient the second rotatable elements only; and applying the erasing implement to a portion of the first region of the rotating element sheet material with reversible highlighting to selectively orient the second rotatable elements only.

A second embodiment of a method of use consistent with the present invention comprises: providing the second embodiment system above; providing an erasing implement, where the erasing implement is configured to either selectively orient the second rotatable elements only using the first vector field in a second direction or selectively orient both the second rotatable elements and the third rotatable elements using the second vector field in a second direction; applying the highlighting implement to a first region of the rotating element sheet material with reversible highlighting to selectively orient the second rotatable elements only, or both the second rotatable elements and the third rotatable elements; and applying the erasing implement to a portion of the first region of the rotating element sheet material with reversible highlighting to selectively orient the second rotatable elements only, or both the second rotatable elements and the third rotatable elements.

Additional features and advantages of the invention will be set forth in the description that follows, and in part will be apparent from the description, or may be learned by practice of the invention. The objectives and other advantages of the invention will be realized and attained by the process and apparatus particularly pointed out in the written description and claims herein as well as the appended drawings.

IV. BRIEF DESCRIPTION OF DRAWINGS

The accompanying drawings, which are incorporated in and constitute a part of this specification, illustrate an implementation of the invention and, together with the description, serve to explain the advantages and principles of the invention. In the drawings, FIG. 1 depicts an exemplary subsection of rotating element sheet material of the prior art.

V. DETAILED DESCRIPTION

Figure 1:
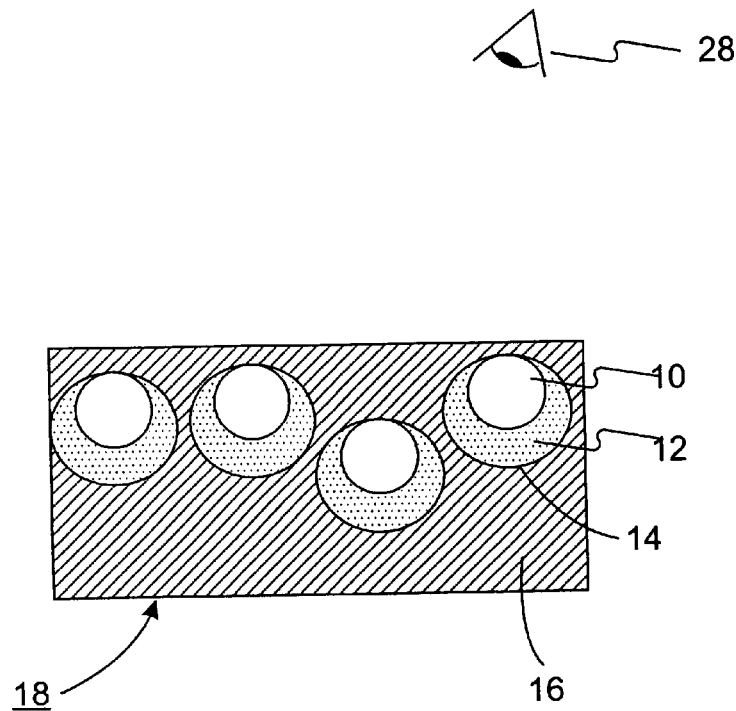
Figure 2:
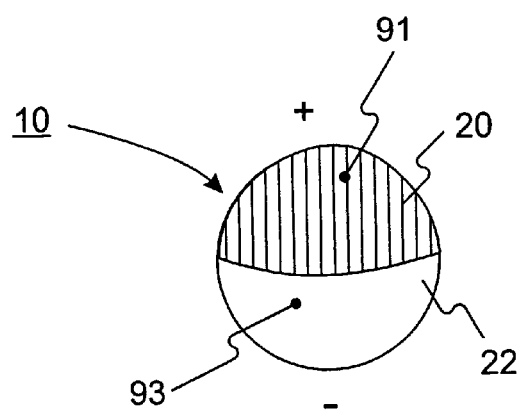
FIG. 2 depicts an exemplary rotatable element of the prior art with a two-valued aspect.
Figure 3:
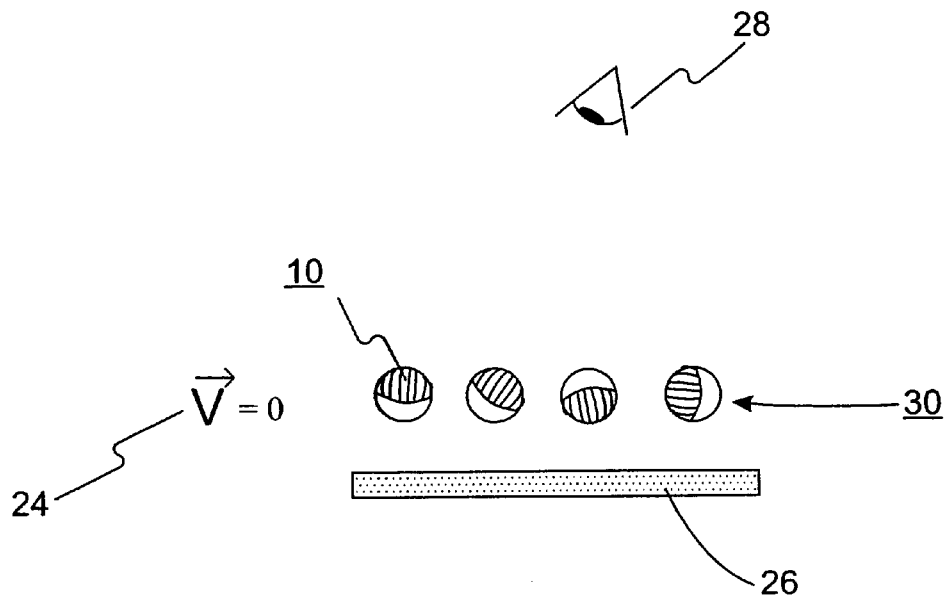
FIG. 3 depicts an exemplary system of the prior art that uses rotatable elements with two-valued aspects randomly oriented in the presence of an addressing vector field with zero magnitude.
Figure 4:
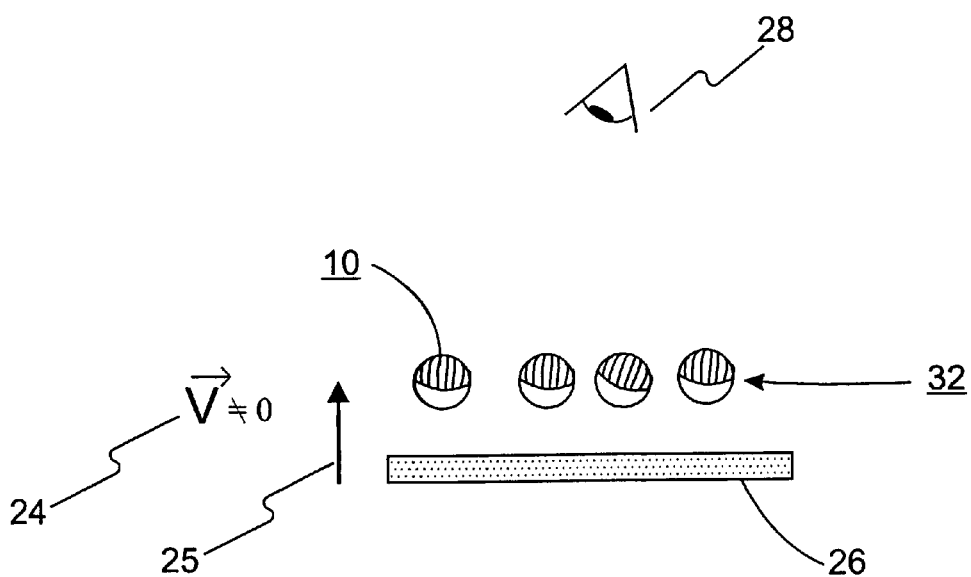
FIG. 4 depicts the exemplary system of FIG. 3 in the presence of a non-zero addressing vector field.
Figure 5:
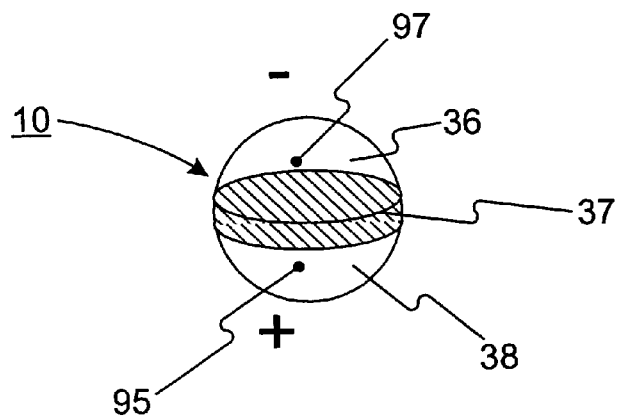
FIG. 5 depicts an exemplary rotatable element of the prior art with a multivalued aspect.
Figure 6:
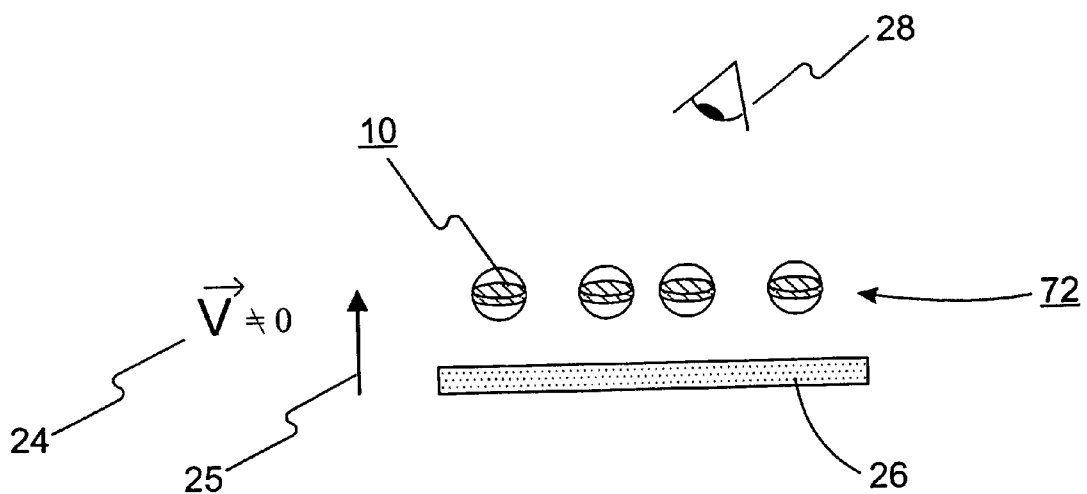
FIG. 6 depicts a side view of an exemplary system of the prior art that uses rotatable elements with multivalued aspects in the presence of a canted vector field in a first direction for addressing.
Figure 7:
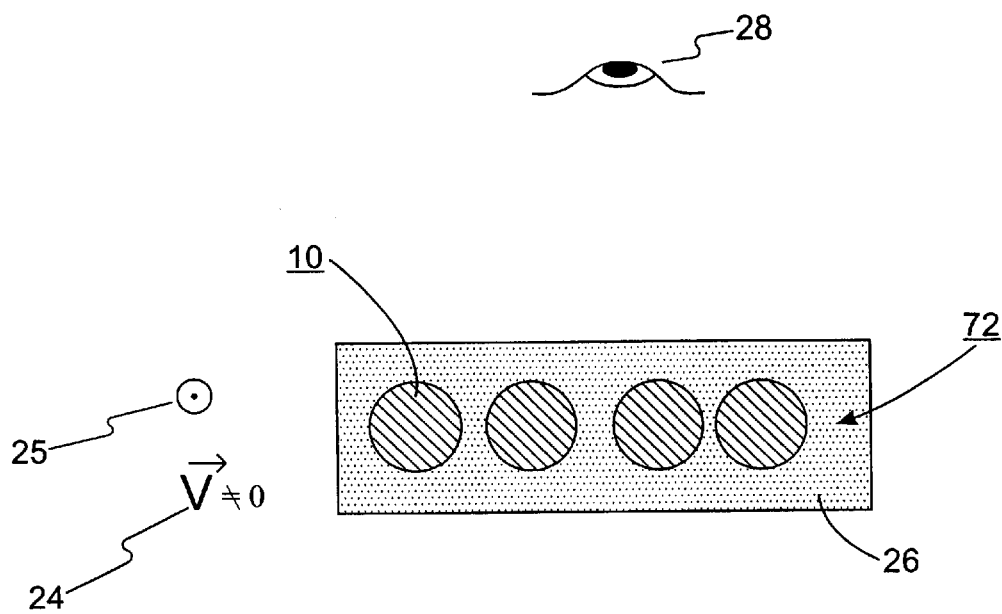
FIG. 7 depicts an alternate view of the exemplary system of FIG. 6.
Figure 8:
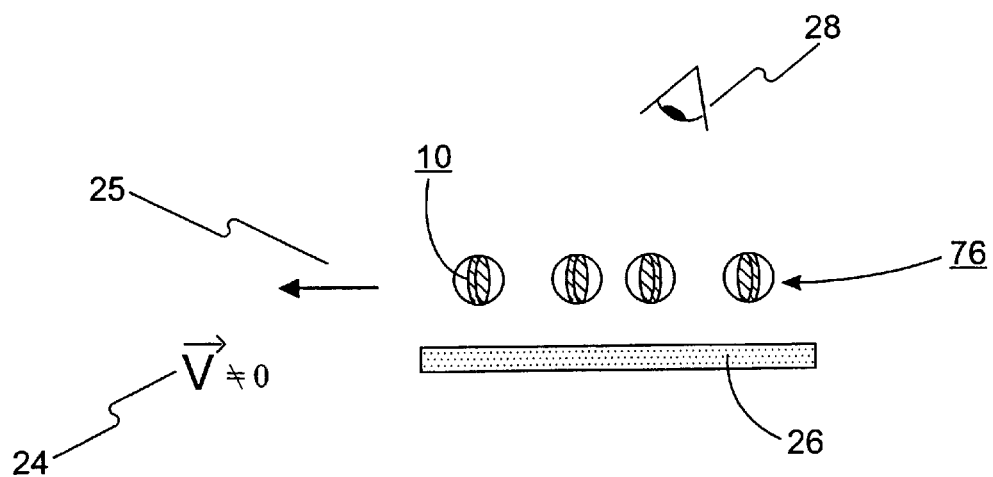
FIG. 8 depicts the exemplary system of FIG. 6 in the presence of a canted vector field in a second direction for addressing.
Figure 9:
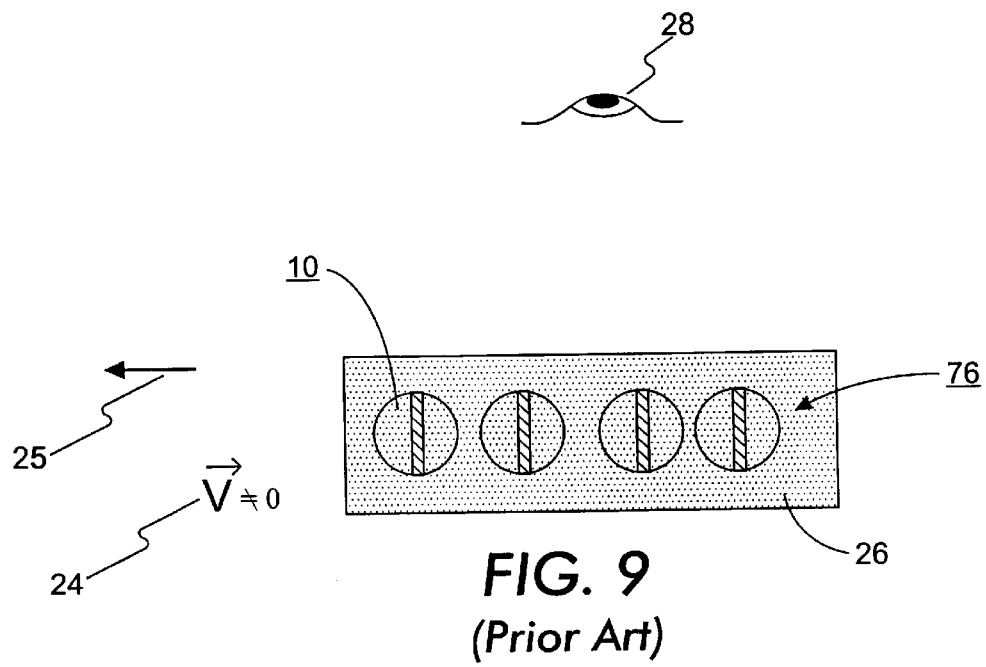
FIG. 9 depicts an alternate view of the exemplary system of FIG. 8.
Figure 10:
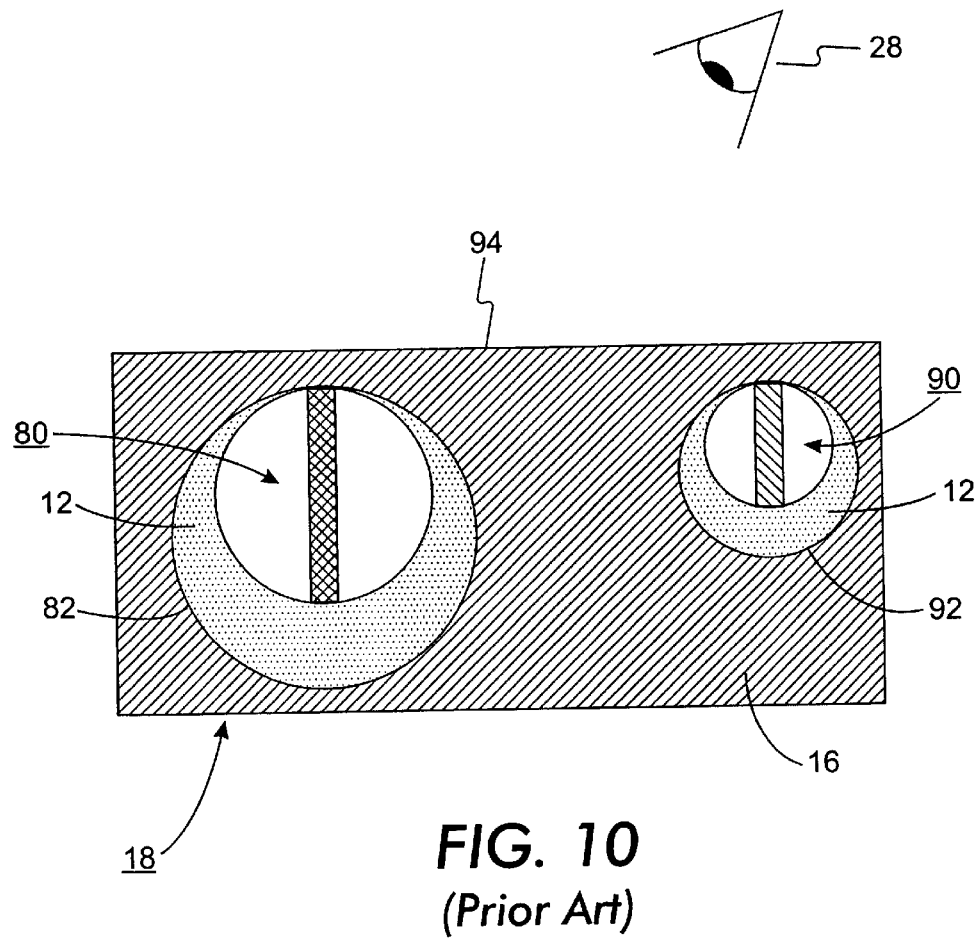
FIG. 10 depicts an exemplary subsection of rotating element sheet material of the prior art with a first rotatable element and a second rotatable element.

Reference will now be made in detail to an implementation consistent with the present invention as illustrated in the accompanying drawings. Whenever possible, the same reference number will be used throughout the drawings and the following description to refer to the same or like parts.

V.A. Definitions

As used herein, "aspect" refers to a common response to incident electromagnetic energy of interest. For example, if the incident electromagnetic energy of interest lies in the visible spectrum, then a first aspect can correspond to a black appearance, and a second aspect can correspond to a white appearance. If the incident electromagnetic energy of interest lies in the x-ray region, then a first aspect can correspond to the transmission of the x-ray energy, while a second aspect can correspond to the absorption of the x-ray energy. Furthermore, the "common response" can comprise of any of the phenomena of absorption, reflection, polarization, transmission, fluorescence or any combination thereof.

As used herein, "observer" refers to a human perceiver, or to a human perceiver in conjunction with an apparatus sensitive to the electromagnetic energy of interest. If the electromagnetic energy of interest lies in the visible spectrum, then observer can refer to a human perceiver. If the electromagnetic energy of interest lies outside of the visible spectrum, then observer refers to an apparatus sensitive to the electromagnetic energy and capable of resolving the aspects of interest into human perceivable form.

As used herein, "vector field" refers to a field whose amplitude in space is capable of having a magnitude and a direction. Vector fields of interest in the present invention include electric fields, magnetic fields, or electromagnetic fields.

As used herein, "work function" refers to the amount of energy necessary to overcome the attraction between a rotatable element and the substrate structure so as to enable a change of orientation, as for example, between the rotatable element and the cavity walls. A host of factors influence the magnitude of the energy associated with the work function including, but not limited to: surface tension of enabling fluid in contact with rotatable elements; the relative specific gravity of enabling fluid and rotatable element; magnitude of charge on rotatable element; relative electronic permittivity of enabling fluid and substrate structure; "stickiness" of substrate structure; and other residual vector fields that may be present.

As used herein, "substantive aspect" refers to the aspect associated with the information conveyed to the observer that is only addressable and only erasable at a work function that is high relative to the work function associated with the "highlighted aspect" (defined below).

As used herein, "highlighted aspect" refers to an aspect that distinguishes substantive material (as defined above) for an observer, usually for later reference, and that is addressable and erasable at a work function that is low relative to the work function associated with the "substantive aspect."

As used herein, a first aspect "saturates" a second aspect when the union of the first aspect and the second aspect is a third aspect that is indistinguishable, or distinguishable only slightly from the first aspect. For example, a transparent orange-colored aspect saturates a transparent yellow-colored aspect.

As used herein, "highlight-address" and "highlight-erase" refer to the vector fields necessary to present a highlighted aspect or a non-highlighted aspect respectively for the rotatable element addressable at the work function that is low relative to the work function associated with "substantive aspect" defined above.

As used herein, "address" and "erase" refer to the vector fields at the work function that is high relative to the work function associated with "highlighted aspect" defined above.

As used herein, "transparent-clear" refers to an aspect associated with an orientation of a rotatable element such that all or most of the incident electromagnetic energy of interest is transmitted. As used herein, "transparent-colored" refers to an aspect associated with an orientation of a rotatable element such that a subset of the incident electromagnetic energy of interest is transmitted and a subset of the incident electromagnetic energy of interest is reflected and/or absorbed. As used herein, "opaque" refers to an aspect associated with an orientation of a rotatable element such that all or most of the incident electromagnetic energy of interest is reflected and/or absorbed. As used herein, "non-transparent-clear" encompasses both "transparent-colored" and "opaque."

As used herein, "open" and "closed" refer to the orientation of light-valve-type rotatable elements such that a favorably situated observer is presented with transparent-clear aspect or a non-transparent-clear aspect respectively.

As used herein, "diameter" refers to an order of magnitude dimension corresponding to any of height, width, and depth of any of rotatable elements or cavities. The use of "diameter" does not imply that circular or spherical geometry only is under consideration.

V.B. Reversible Highlighting System and Method 1

Figure 18:
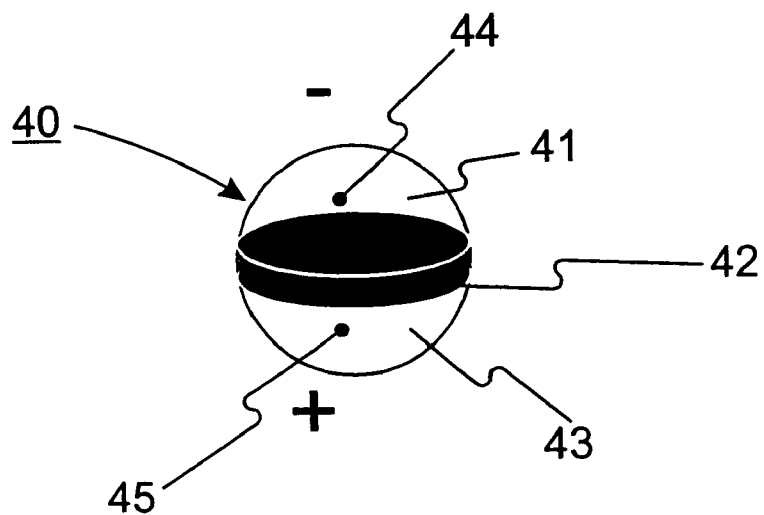
FIG. 18 depicts an exemplary first rotatable element consistent with the present invention.
Figure 19:
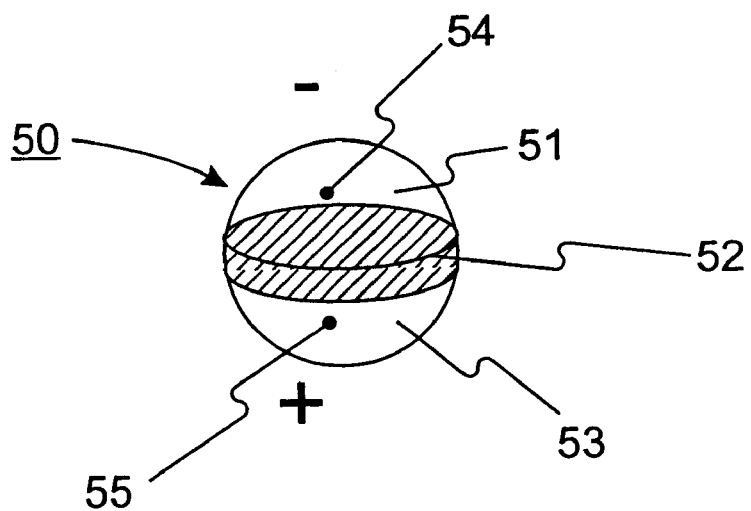
FIG. 19 depicts an exemplary second rotatable element consistent with the present invention.

Rotatable elements consistent with a preferred embodiment of the present invention are depicted in FIGS. 18 and 19. FIG. 18 depicts first rotatable element 40 and FIG. 19 depicts second rotatable element 50. Both first rotatable element 40 and second rotatable element 50 are fabricated as "light-valves" as previously depicted in the systems of FIGS. 5–10, and 12–14.

In first rotatable element 40, first layer 41 is transparent-clear and third layer 43 is transparent-clear. Furthermore, the surface of third layer 43 has transparent-clear third coating 45 at a first Zeta potential, and the surface of first layer 41 has transparent-clear first coating 44 at a second Zeta potential such that the surface of third layer 43 has a net positive charge, "+," with respect to the surface of first layer 41 when rotatable element 40 is in contact with a dielectric fluid (not shown). In FIG. 18, second layer 42 of first rotatable element 40 is opaque to visible light and presents a dark-colored aspect when it is in a "closed" orientation.

Second rotatable element 50 is depicted in FIG. 19. In second rotatable element 50, first layer 51 is transparent-clear and third layer 53 is transparent-clear. Furthermore, the surface of third layer 53 has transparent-clear third coating 55 at a first Zeta potential, and the surface of first layer 51 has transparent-clear first coating 54 at a second Zeta potential such that the surface of third layer 53 has a net positive charge, "+," with respect to the surface of first layer 51 when rotatable element 50 is in contact with a dielectric fluid (not shown). In FIG. 19, second layer 52 of second rotatable element 50 is transparent-colored to visible light and presents a light-colored aspect when it is in a "closed" orientation. The transparent color associated with second rotatable element 50 in a preferred embodiment is a color associated with conventional highlighters, such as yellow, pink, orange, or other colors. One skilled in the art will appreciate that, although opaque segments may also be used in the second rotatable elements 50, the visual appearance of the resulting display will be less like that of a conventional highlighter than would be the case with transparent-colored center segments on dark-colored text and graphics and a light-colored background.

Figure 20:
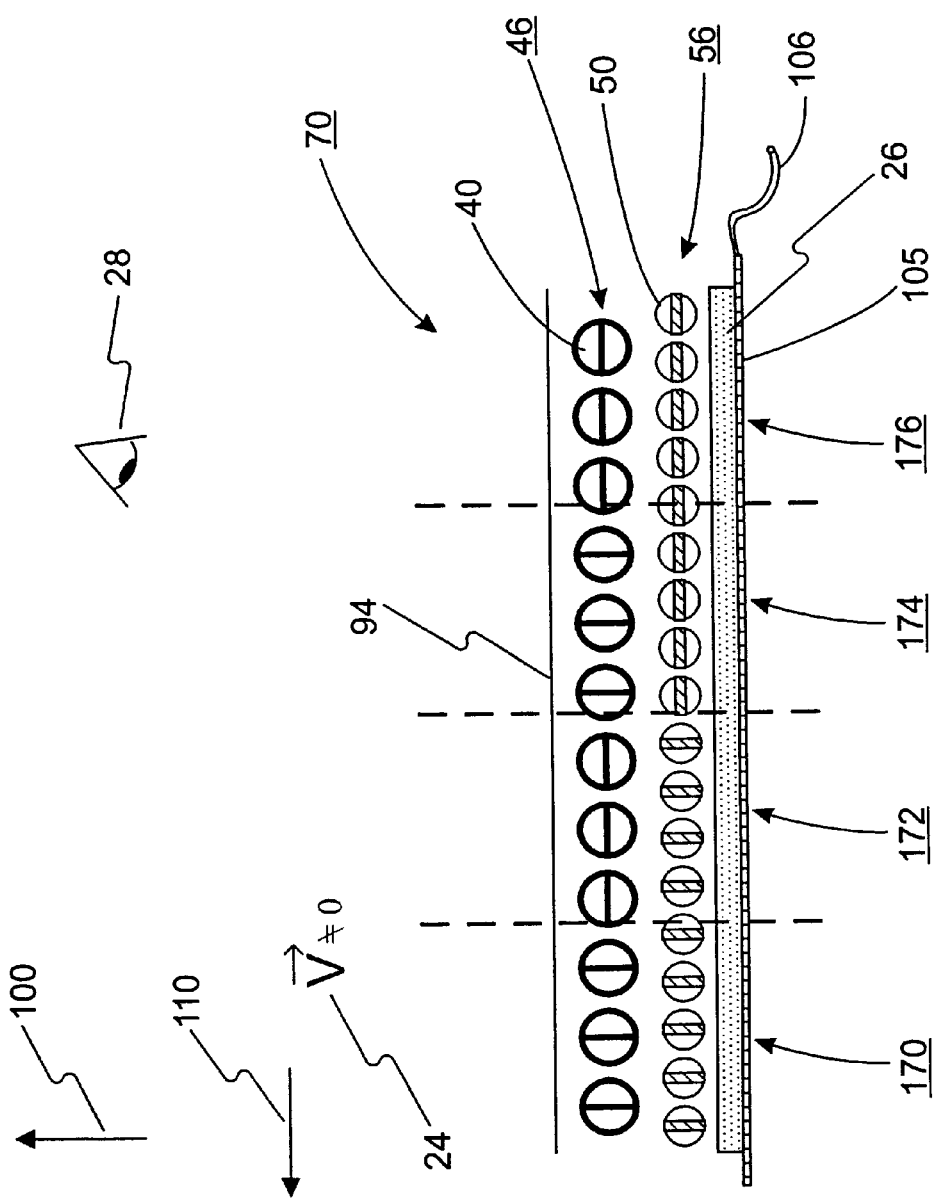
FIG. 20 depicts a first exemplary subsection of rotating element sheet material with reversible highlighting using the rotatable elements of FIGS. 18 and 19.
Figure 21:
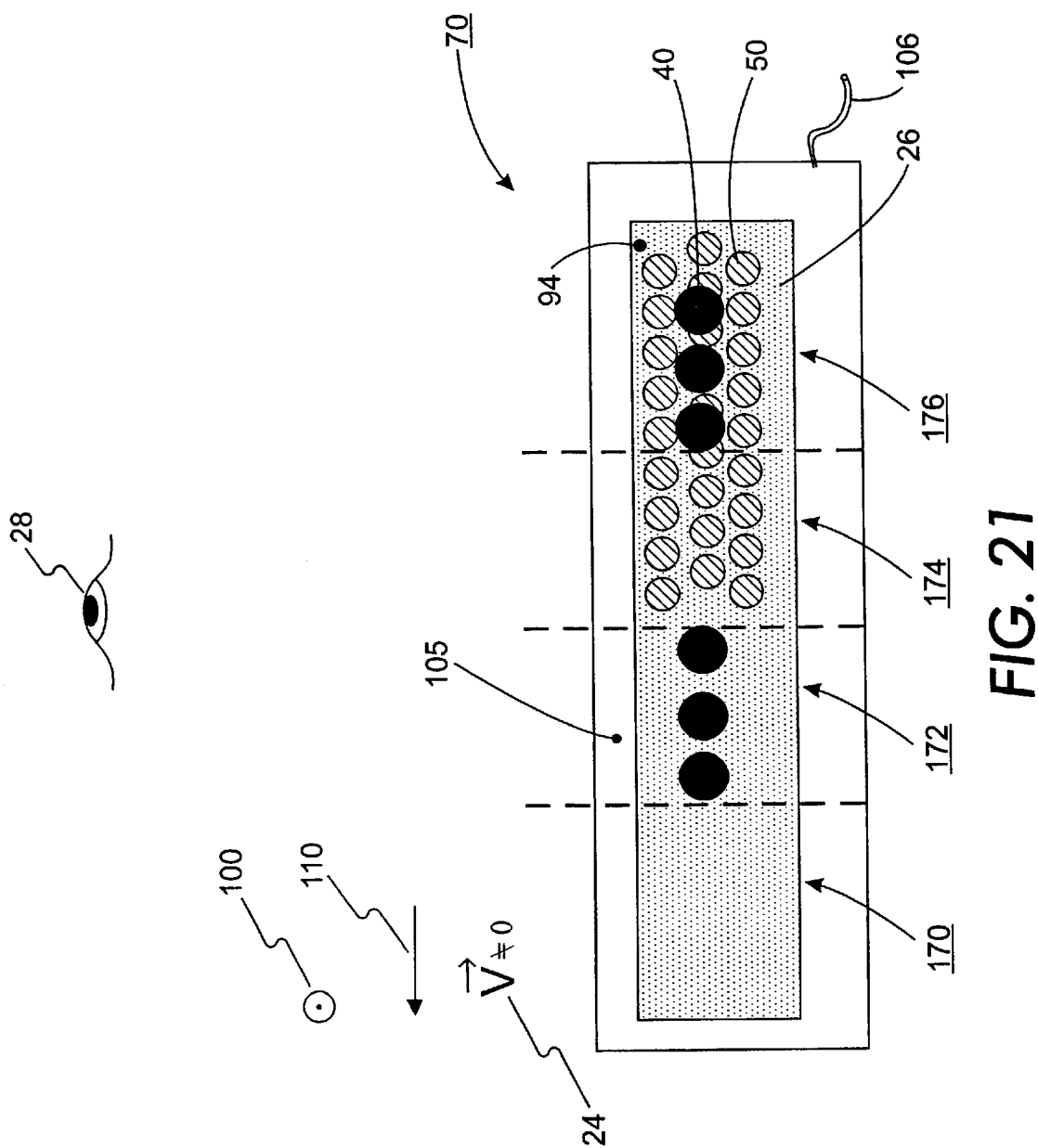
FIG. 21 depicts an alternate view of the exemplary system of FIG. 20.

Rotating element sheet material 70 with reversible highlighting is depicted in FIGS. 20 and 21. In FIGS. 20 and 21, there is a plurality of first rotatable elements 40 in first layer 46, and a plurality of second rotatable elements 50 in second layer 56. First rotatable elements 40 have common aspects, as well as a common first work function 124. Likewise, second rotatable elements 50 have common aspects, as well as a common second work function 122. The graph of FIG. 11, discussed earlier, is an exemplary graph of first work function 124 and second work function 122 associated with rotating element sheet material 70 of FIGS. 20 and 21, where first work function 124 is associated with first rotatable element 40 and second work function 124 is associated with second rotatable element 50. FIG. 20 is a side perspective and FIG. 21 is a top perspective view. For ease of depiction in FIG. 21, only those rotatable elements in a "closed" orientation from FIG. 20 are shown. Rotatable elements in an "open" orientation from FIG. 20 are not shown in FIG. 21. In FIG. 21, the symbol Θ indicates an arrow directed out of the plane of the figure.

In the preferred embodiment depicted in FIGS. 20 and 21, first rotatable elements 40 are in first layer 46, second rotatable elements 50 are in second layer 56, and both first layer and second layer are between infralayer 26 and observer 28. Surface 94 lies between observer 28 and first rotatable elements 40 and second rotatable elements 50. Infralayer 26, in a preferred embodiment of the present invention, is a light-colored reflective material. It will be appreciated by one skilled in the art that although FIG. 20 depicts ordered layers of rotatable elements, in practice, such plurality of rotatable elements can be distributed randomly through the substrate and a similar effect will be achieved. FIGS. 20 and 21, however, depict merely a preferred ordering since it presents a maximal configuration of rotatable elements to aspect area. Such an "eggcrate" configuration, for example, is disclosed in U.S. Pat. No. 5,815,306, herein incorporated by reference. Below infralayer 26 is conducting layer 105, which may be connected to a power source (not shown).

First rotatable elements 40 can be rotated to expose or to conceal the light-colored infralayer, thus producing the visual effect of either a light-colored aspect, or a dark-colored aspect. Thus, first rotatable elements 40 provide the aspect associated with the substantive material. This is depicted in FIG. 21 by the solid black circles.

Figure 11:
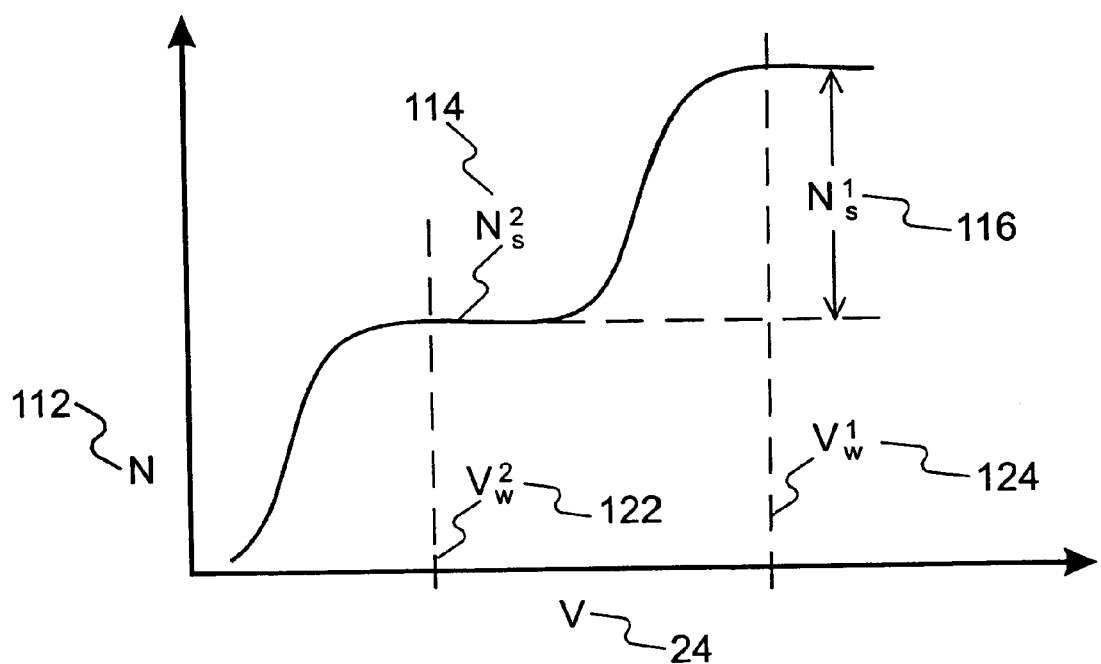
FIG. 11 depicts an exemplary graph of the number of rotatable elements that change orientation as a function of applied vector field of the prior art, displaying work function and saturation numbers for the rotating element sheet material of FIG. 10.
Figure 12:
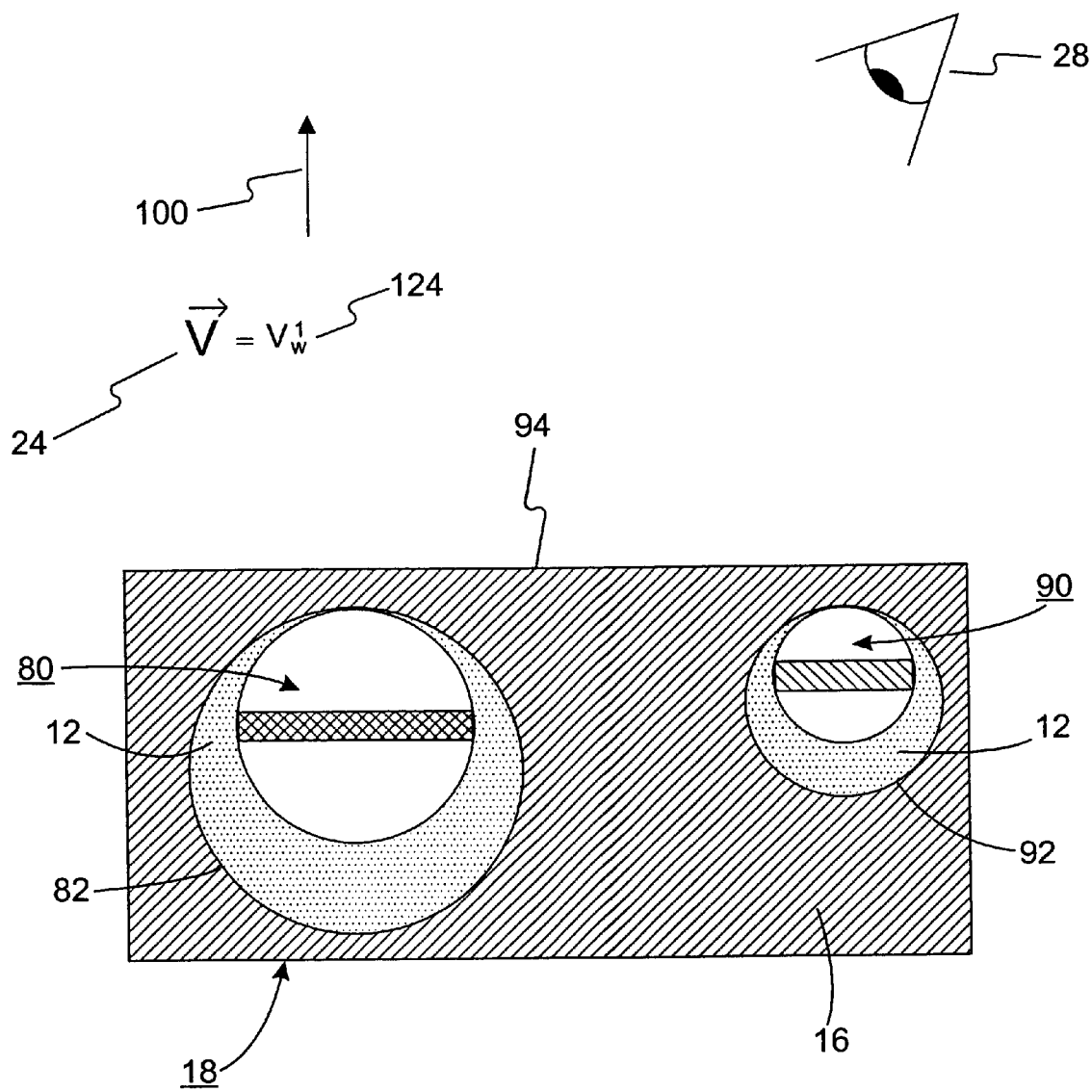
FIG. 12 depicts an exemplary subsection of rotating element sheet material of the prior art with a first rotatable element and a second rotatable element and an addressing vector field at a first work function.
Figure 13:
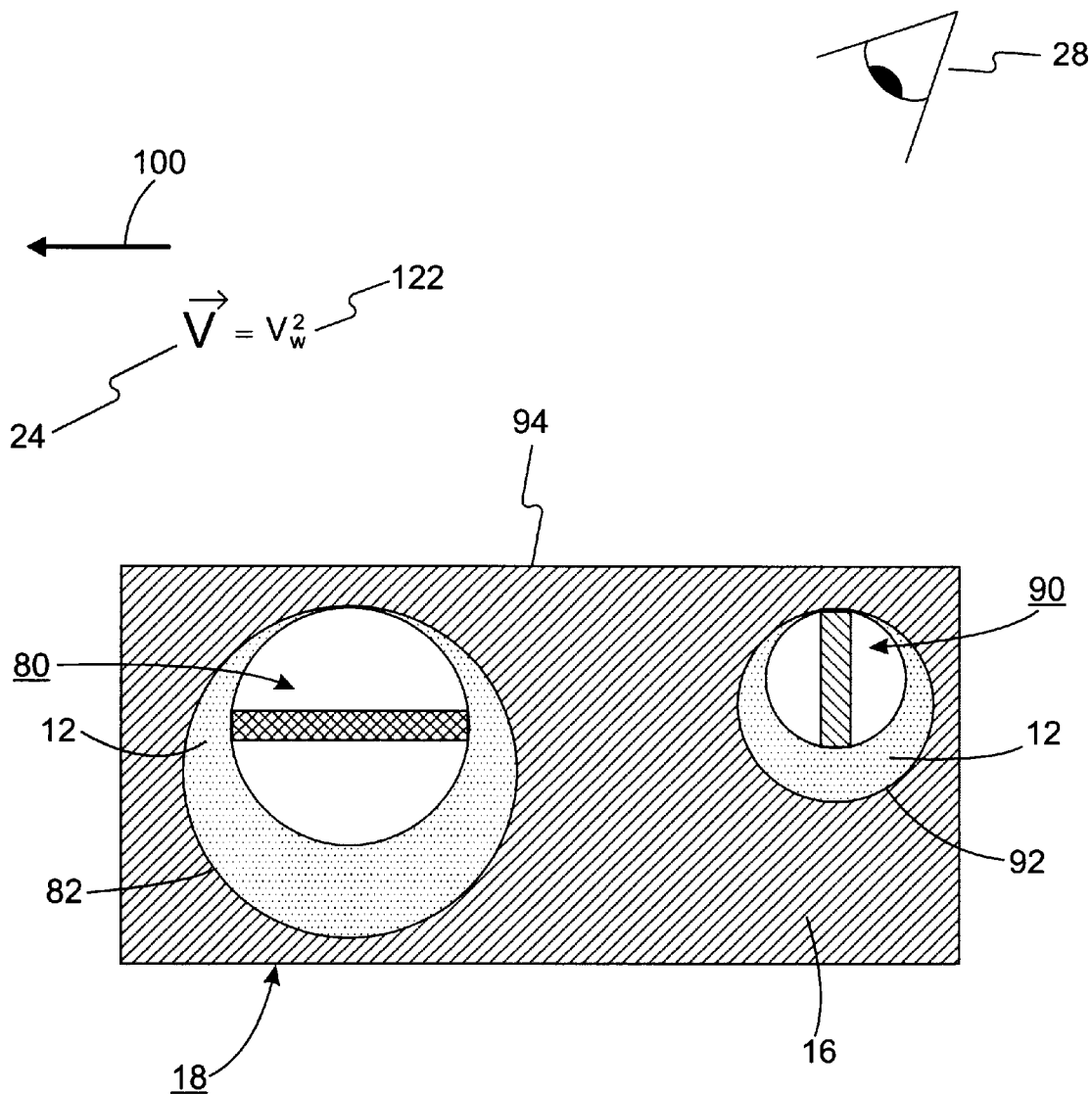
FIG. 13 depicts an exemplary subsection of rotating element sheet material of the prior art with a first rotatable element and a second rotatable element and an erasing vector field at a second work function.
Figure 14:
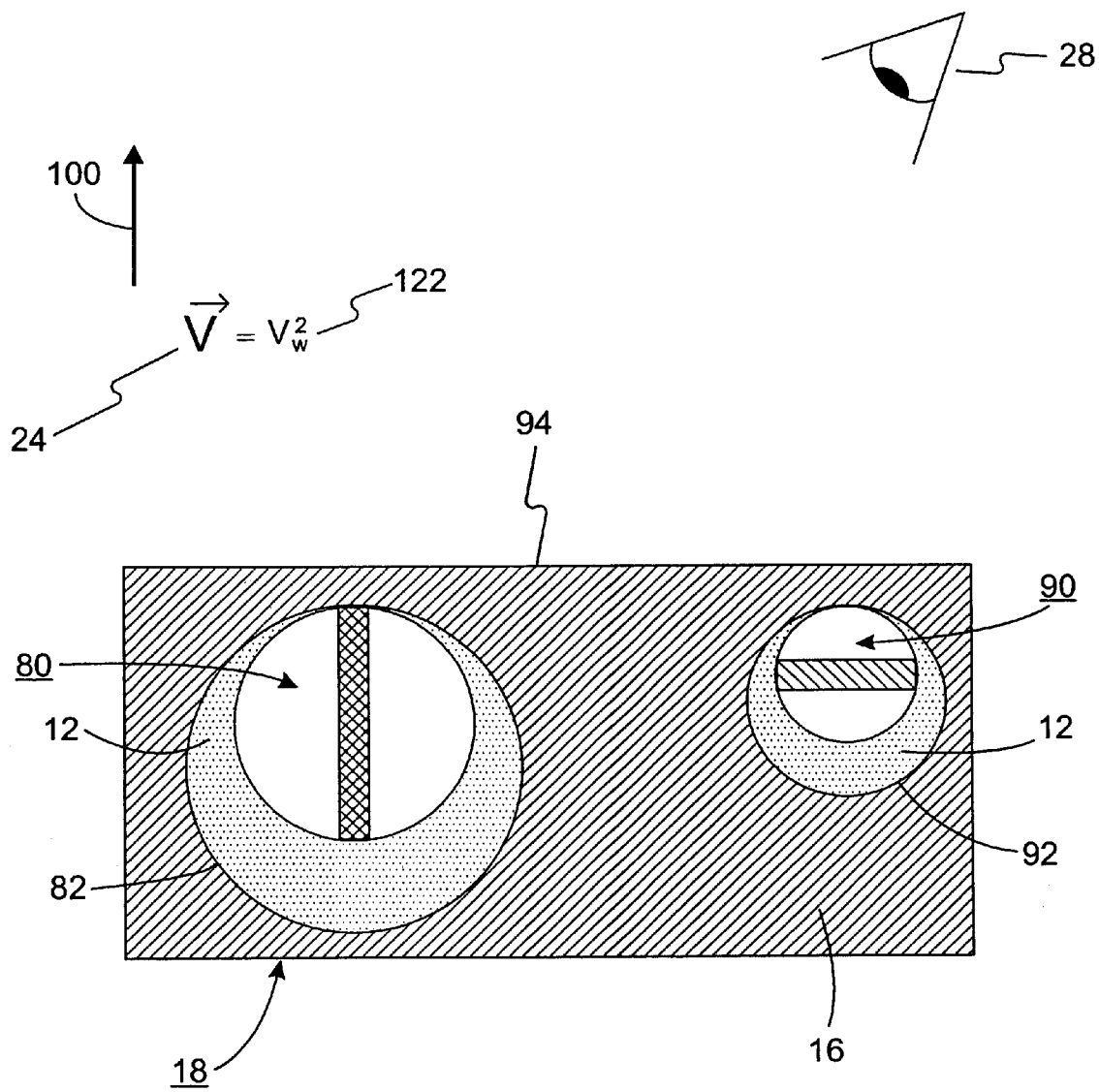
FIG. 14 depicts an exemplary subsection of rotating element sheet material of the prior art with a first rotatable element and a second rotatable element and an addressing field at a second work function.

First rotatable elements 40 exhibit first work function 124 of FIG. 11, which is higher than second work function 122 associated with second rotatable elements 50. One manner of establishing this difference is to use first rotatable elements 40 with a larger diameter than second rotatable elements 50. For example, as disclosed in U.S. Pat. No. 5,739,801, hereinabove incorporated by reference, spheroidal rotatable elements with a larger diameter will exhibit a higher threshold for changing orientation due to a larger moment of inertia. Thus, if first rotatable elements 40 are larger in diameter than the second rotatable elements 50, then first rotatable elements 40 will have a higher work function than second rotatable elements 50.

Again, FIG. 11 depicts an exemplary set of work functions associated with rotating element sheet material 70 of FIGS. 20 and 21. First work function 124, $V_W^1$, represents the threshold necessary to address both first saturation level 116, $N_W^1$, of first rotatable elements 40 and second saturation level 114, $N_W^2$, of second rotatable elements 50; second work function 122, $V_W^2$, represents the threshold necessary to address second saturation level 114, $N_W^2$, of second rotatable elements 50 only.

Figure 17:
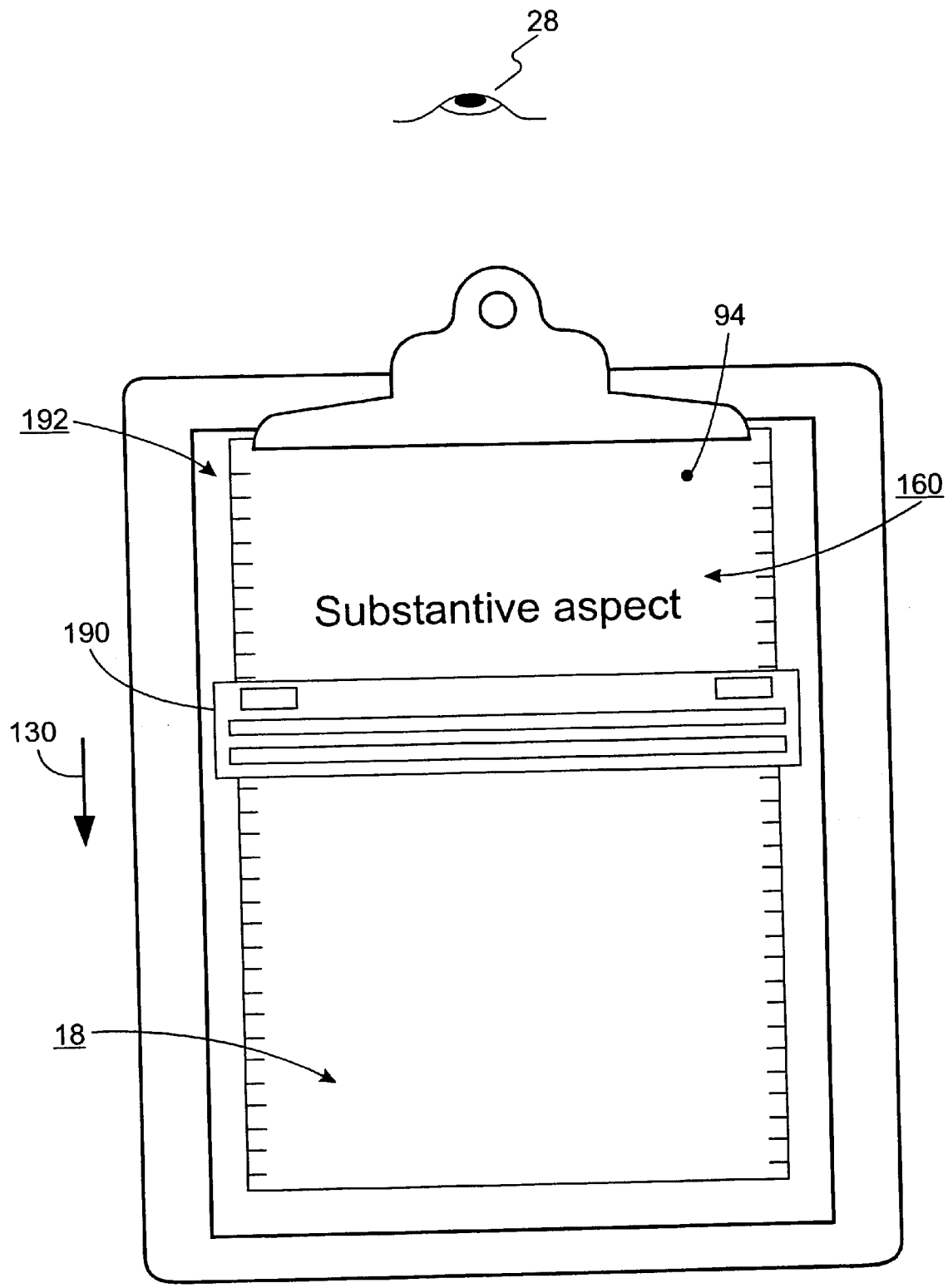
FIG. 17 depicts an addressing implement of the prior art.

In FIGS. 20 and 21, region 170, region 172, region 174, and region 176 depict regions of rotating element sheet material 70 that have been placed under the influence of separate vector fields for addressing purposes. This can be accomplished through the use of addressing implement 190 as depicted in FIG. 17, as well as through the use of a reversible highlighting implement as described below. In the embodiment depicted in FIG. 20, each region is initially erased through the application of vector field 24 at first work function 124 in the direction of transverse arrow 110.

In region 170, no further vector field is applied. Thus, in region 170, observer 28 views all of first rotatable elements 40 and second rotatable elements 50 edge on. Because both first rotatable elements 40 and second rotatable elements 50 function as "light valves," observer 28 views a transparent-clear aspect associated with this configuration. Thus, observer 28 views infralayer 26, which is a light-colored reflective layer as shown in FIG. 21.

In region 172, first work function 124 is applied in the direction of arrow 100 and then second work function 122 is applied in the direction of transverse arrow 110. Thus, in region 172 of FIGS. 20 and 21, observer 28 views all of first rotatable elements 40 in a "closed" state, and all of second rotatable elements 50 in an "open" state. Observer 28 views a dark-colored aspect associated with this configuration and no highlighted aspect, as depicted in FIG. 21.

In region 174, second work function 122 is applied in the direction of arrow 100 only. Thus, in region 174, observer 28 views all of first rotatable elements 40 edge on, and all of and second rotatable elements 50 in a closed state. Observer 28 views a infralayer 26 with a highlighted aspect, as depicted in FIG. 21.

Finally, in region 176, first work function 124 is applied in the direction of arrow 100 only. Thus, in region 176, observer 28 views all of first rotatable elements 40 and second rotatable elements 50 in a closed state. Observer 28 views a highlighted dark aspect, as depicted in FIG. 21.

The method of selectively orienting first rotatable element 40 or second rotatable element 50 only is summarized below in Table 2. In Table 2, the columns are divided according to applied vector field 24 at first work function 124 or applied vector field 24 at second work function 122, and the columns are further subdivided according to whether the orientation of vector field 24 is in the general direction of observer 28, indicated by the symbol ⊙ and corresponding to the direction of arrow 100, or whether it is generally transverse to the direction of observer 28, indicated by the symbol→and corresponding to the direction of transverse arrow 110. The letter "Y" indicates that an applied field of magnitude suitable to overcome the appropriate work function is present in that particular orientation, and the letter "N" indicates that an applied field of magnitude not suitable to overcome the appropriate work function is present in that particular orientation. An additional column that indicates the number of steps necessary to obtain the desired aspect from a previous different aspect is also indicated. The rows are subdivided according to region 172, region 174, and region 176 of FIGS. 20 and 21. The use of "Y-1st" indicates the first step of a two-step process, and the use of "Y-2nd" indicates the second step of a two-step process. For all rows, the starting orientation is that orientation depicted in region 170 of FIGS. 20 and 21.

TABLE 2

| Region | ⊙ $V_w^1$ | → $V_w^1$ | ⊙ $V_w^2$ | → $V_w^2$ | Number of steps |
|---|---|---|---|---|---|
| Region 172 | Y-1st | N | N | Y-2nd | 2 |
| Region 174 | N | N | Y | N | 1 |
| Region 176 | Y | N | N | N | 1 |

Figure 22:
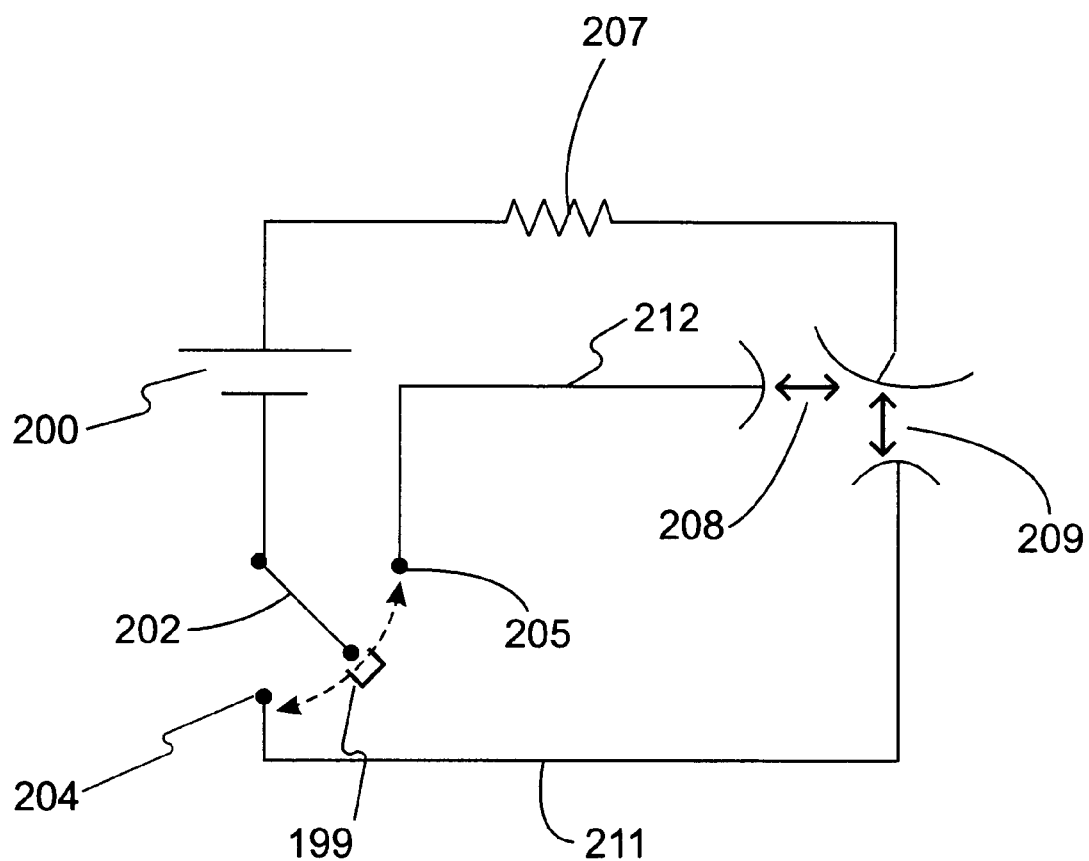
FIG. 22 is an exemplary circuit diagram associated with a reversible highlighting implement.

In a preferred embodiment of the present invention, the plurality of first rotatable elements 40 dispersed throughout an exemplary sheet of rotating element sheet material with reversible highlighting 70 are addressed to present a substantive aspect using an applied vector field at first work function 124. Since, in the embodiment discussed here, this would also address a plurality of second rotatable elements 50, the entire sheet should be put under the influence of an applied vector field at a second work function 122 in the direction of transverse arrow 110 or transverse arrow 111 discussed earlier, or a highlight-erase field. This will reorient the plurality of second rotatable elements 50 into an highlight-erased orientation. The highlight-erase field can be introduced by using selective-erasure system 180 of FIG. 15, or the bulk-erasure system of FIG. 16 discussed earlier. The user, then, with a reversible highlighting implement, can then selectively highlight-address second rotatable elements 50, and may also selectively highlight-erase second rotatable elements 50 with a reversible highlighting implement. An exemplary circuit diagram associated with such a reversible highlighting implement is depicted in FIG. 22. Toggle 202 can be manipulated by a user to be in off position 199, highlight-address position 204, or highlight-erase position 205. The elements of the circuit depicted in FIG. 22 include power source 200, exemplary resistance 207, and the capacitors associated with gap 208 or 209. Gap 208 corresponds to the gap introduced by potential drop implement 182 depicted in FIG. 15 of selective-erasing system 180 and that spans region 178. Thus, toggle 202 in highlight-erase position 205 closes highlight-erase circuit 212 associated with an implement for selective highlight-erasure. Gap 209 corresponds to the gap between surface 94 of rotating element sheet material with reversible highlighting 70 and conducting layer 105 as depicted in FIG. 20. Thus, the combination of toggle 202 in highlight-address position 204 and the distal end of reversible highlighting implement applied to surface 94 of rotating element sheet material with reversible highlighting 70 closes highlight-address circuit 211 associated with an implement for selective highlight-addressing.

Figure 23:
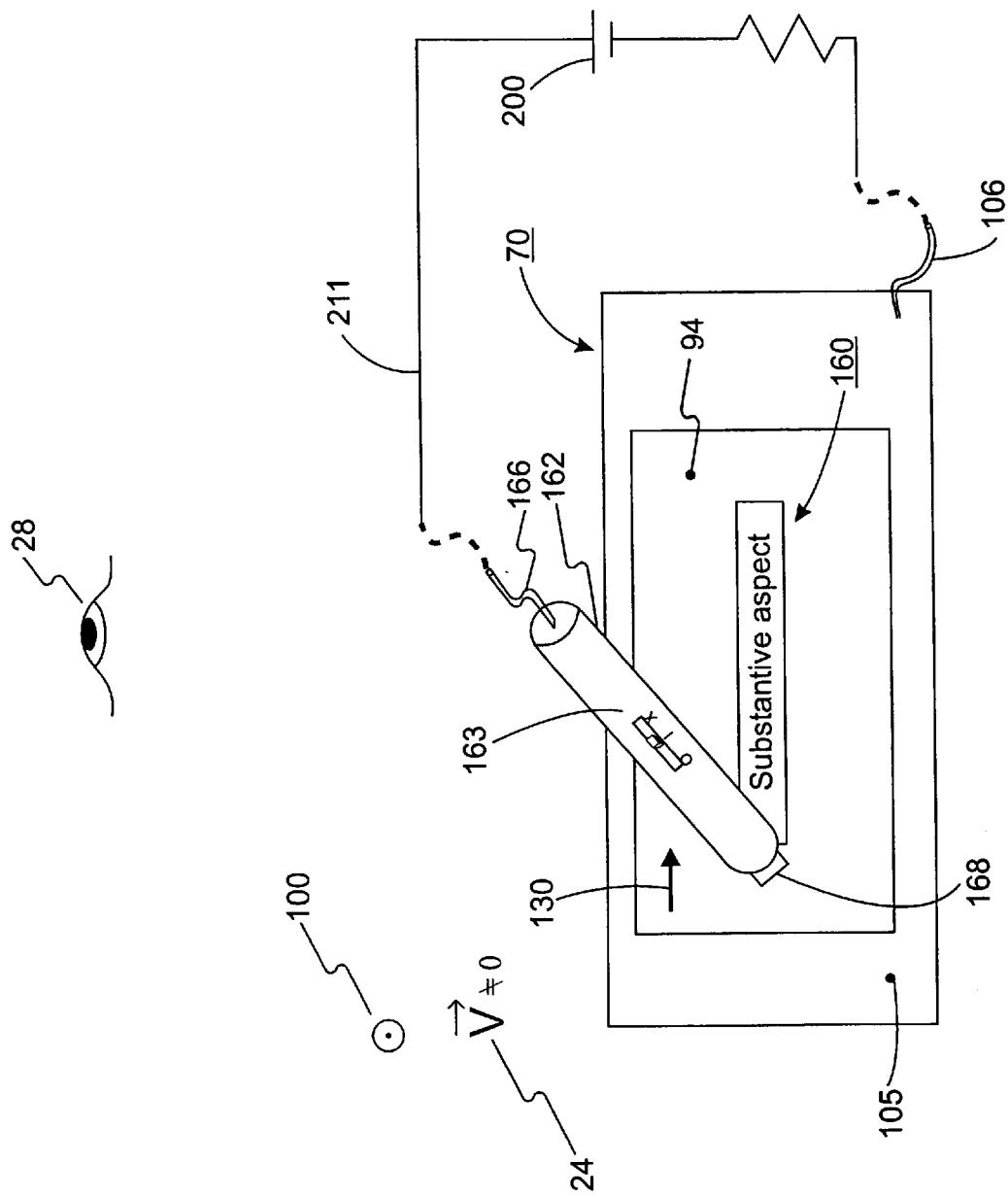
FIG. 23 depicts an exemplary reversible highlighting implement consistent with the present invention and a substantive aspect to be highlighted.
Figure 24:
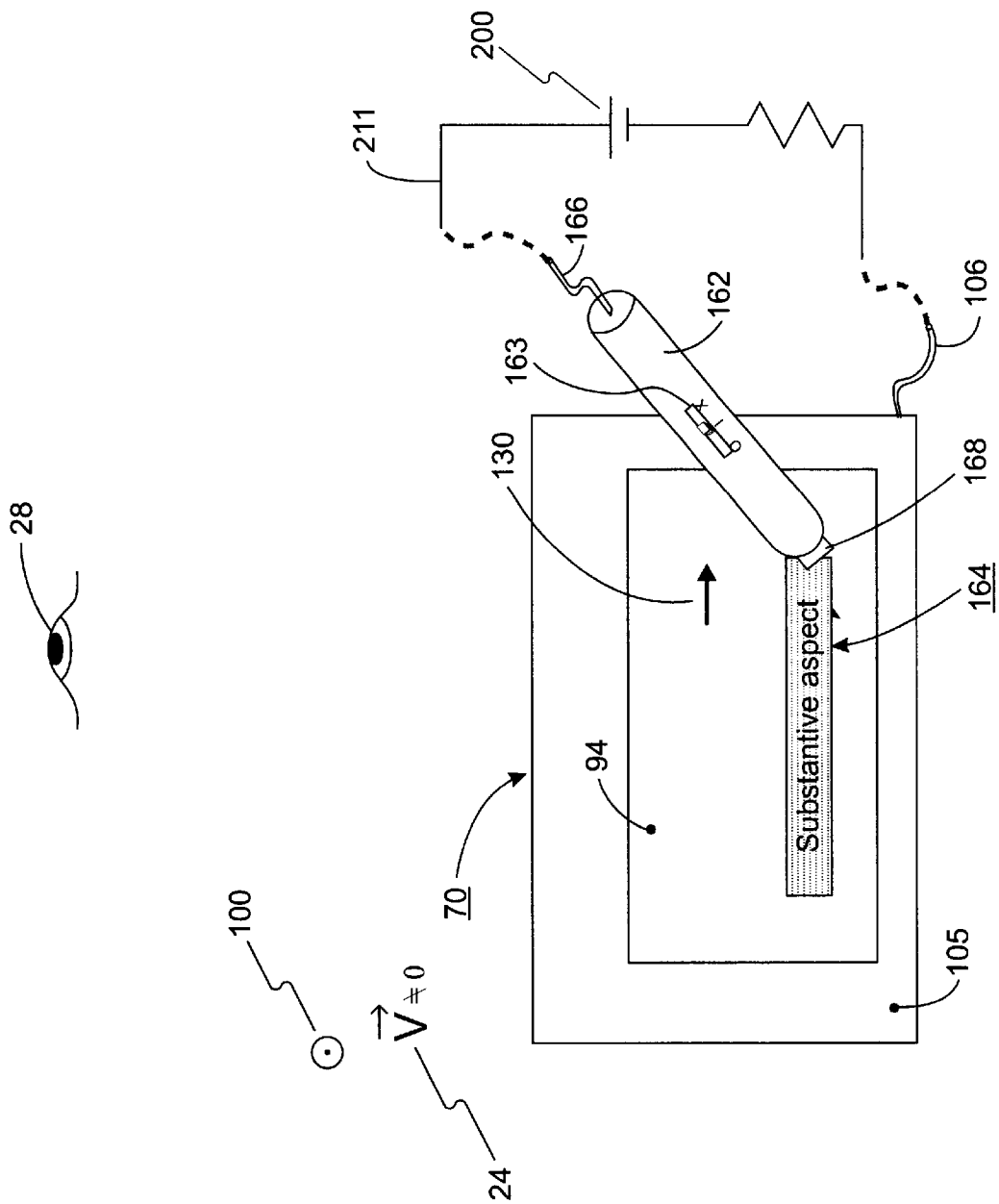
FIG. 24 depicts a reversible highlighting implement and a highlighted aspect of the system of FIG. 23.

In one embodiment of the present invention, rotating element sheet material is prepared containing substantive material 160 with all of second rotatable elements 40 in a highlight-erase orientation, or "open," as depicted, for example in region 170 and 172 respective. Next, reversible highlighting implement 162 can be manipulated by a user such that distal end 168 is dragged across surface 94 of rotating element sheet material 70. This is depicted in FIGS. 23 and 24. Reversible highlighting implement 162 can operate at second work function 122 and can introduce vector field 24 in the direction of arrow 100. For example, if conducting layer 105 is set at a first potential, V1, and if the distal end 168 of reversible highlighting implement 162 is set at a second potential V2, then by introducing the distal end 168 of reversible highlighting implement 162 to surface 94 of rotating element sheet material 70, all of the second rotatable elements 50 in the vicinity of highlighting implement 162 will change their orientation, as depicted in FIG. 24 by shading. Reversible highlighting implement 162 does not change the aspect presented to observer 28 associated with first rotatable elements 40 even though it does change the aspect presented to observer 28 associated with second rotatable elements 50. Also shown in FIGS. 23 and 24 is highlight-address circuit 211. Toggle 163 in FIGS. 23 and 24 in the position indicated by the symbol "I" corresponds to toggle 202 of FIG. 22 in highlight-address position 204. Toggle 163 in FIGS. 23 and 24 in the position indicated by the symbol "O" corresponds to toggle 202 of FIG. 22 in off position 199. Furthermore, Toggle 163 in FIGS. 23 and 24 in the position indicated by the symbol "X" corresponds to toggle 202 of FIG. 22 in highlight-erase position 205.

FIG. 23 displays substantive aspect 160 as it might be presented to observer 28 before the application of reversible highlighting implement 162, and FIG. 24 displays substantive plus highlighted aspect 164 after reversible highlighting implement 162 has been dragged across in the direction of arrow 130 with toggle 163 in highlight-address position, denoted by an "I." Connector 166 is a connection from reversible highlighting implement 162 to first power source 200 of highlight-address circuit 211. Likewise, connector 106 is a connection from conducting layer 105 to first power source 200 of highlight-address circuit 211.

Figure 15:
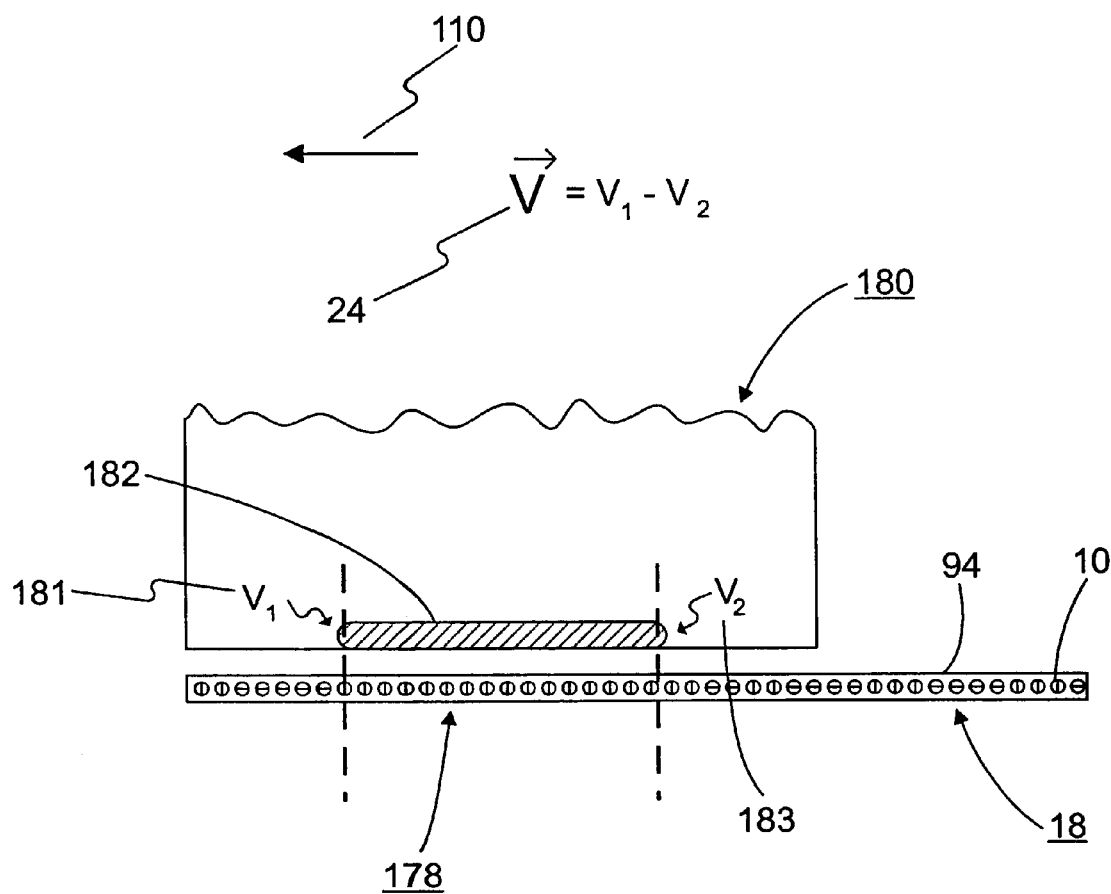
FIG. 15 depicts an exemplary selective-erasing implement of the prior art.
Figure 16:
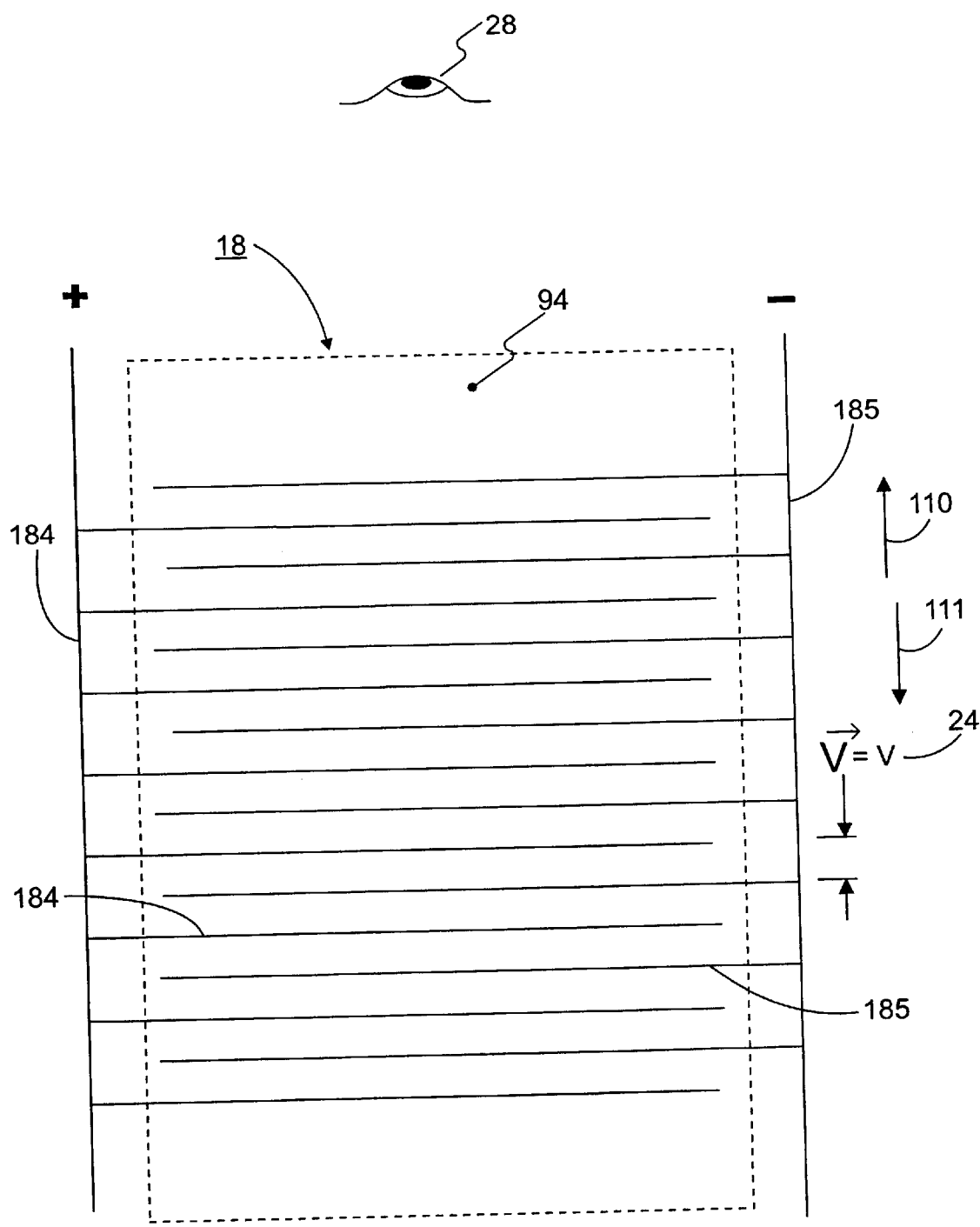
FIG. 16 depicts an exemplary bulk-erasing system of the prior art.
Figure 25:
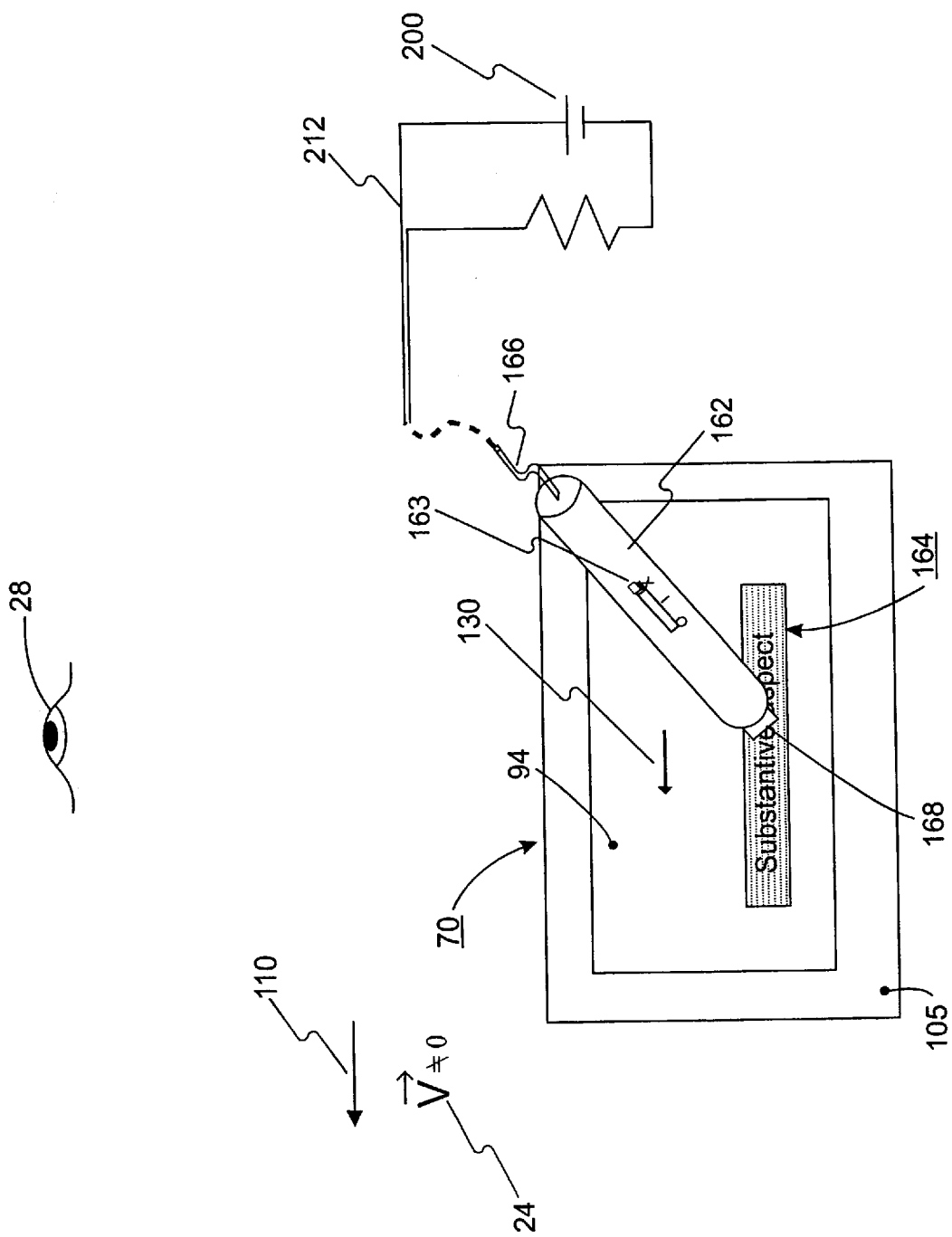
FIG. 25 depicts an exemplary reversible highlighting implement and a highlighted aspect to be selectively erased consistent with the present invention.
Figure 26:
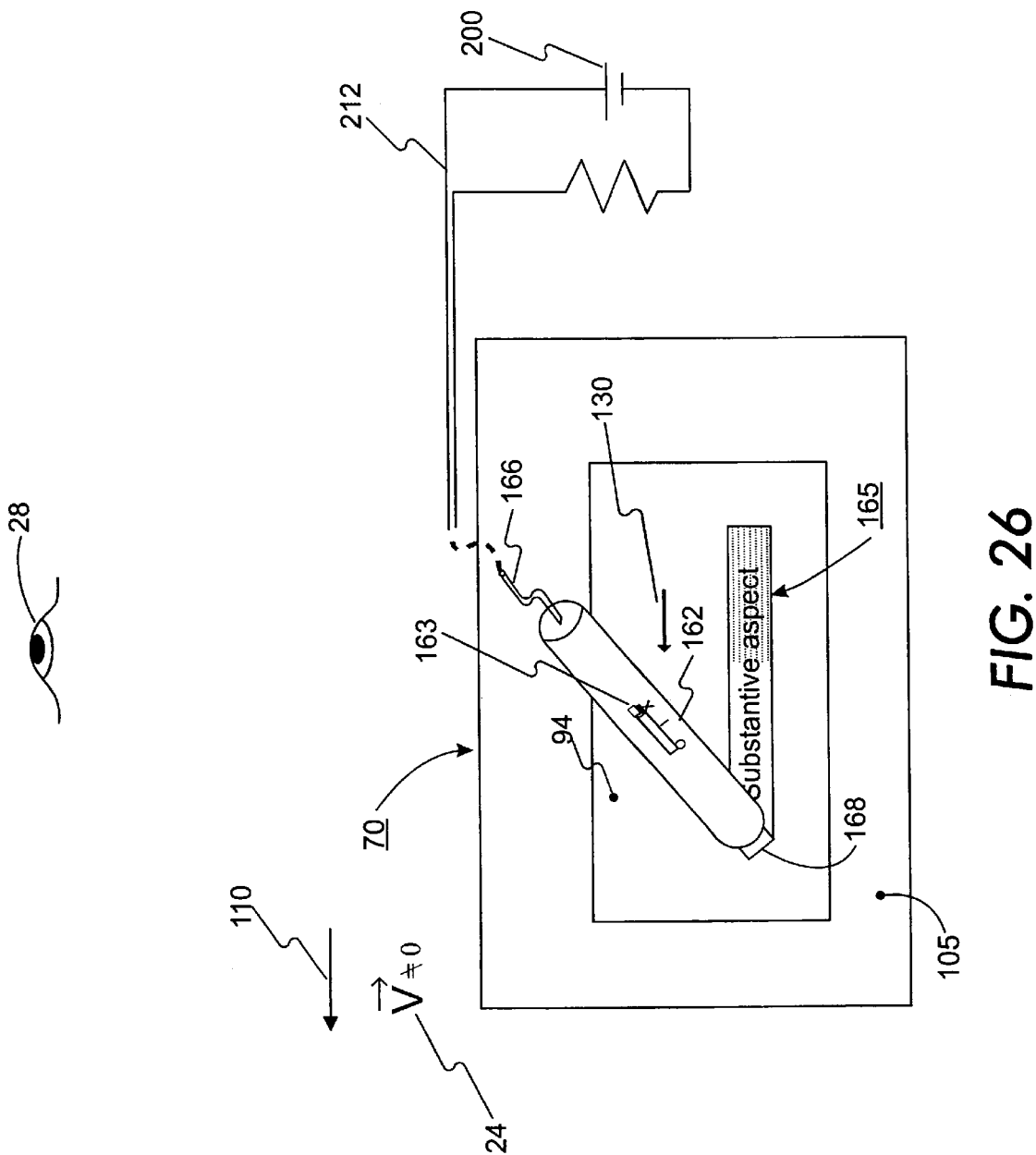
FIG. 26 depicts an exemplary highlighting implement and a highlighted aspect selectively erased of the system of FIG. 25.

In a further embodiment of the present invention, rotating element sheet material is prepared containing substantive material 160 with some of second rotatable elements 50 in a "closed" orientation. Next, reversible highlighting implement 162 with toggle 163 set in highlight-erase position, denoted by an "X" in FIG. 25, can be manipulated by a user such that it is dragged across surface 94 of rotating element sheet material 70 in order to have selective highlight-erasure. This is depicted in FIGS. 25 and 26. Reversible highlighting implement 162 in highlight-erase mode functions as selective erasure implement 180 as depicted in FIG. 15 and using highlight-erase circuit 212 depicted in FIG. 22.

It operates at second work function 122 and introduces vector field 24 in the direction of transverse arrow 110, or another suitable transverse direction. For example, as discussed with respect to FIG. 15 above, if one side of distal end 168 of reversible highlighting implement is set at a first potential, V1, and if the other side of distal end 168 of reversible highlighting implement 162 is set at a second potential V2, then by introducing distal end 168 of reversible highlighting implement 162 to surface 94 of rotating element sheet material 70, all of the second rotatable elements 50 in the vicinity of reversible highlighting implement 162 will change their orientation, as depicted in FIG. 26 by the absence of shading. Arrow 130 in FIGS. 25 and 26 indicate the direction of motion of reversible highlighting implement 162. Again, reversible highlighting implement 162 does not change the aspect presented to observer 28 associated with first rotatable elements 40 even though it does change the aspect presented to observer 28 associated with second rotatable elements 50.

FIG. 25 displays highlighted material 164 as it might be presented to observer 28 before the application of reversible highlighting implement 162, and FIG. 26 displays substantive material plus selective highlight-erase aspect 165 after reversible highlighting implement 162 has been dragged across a portion of the highlighted area. Connector 166 is a connection from reversible highlighting implement 162 to power source 200 of highlight-erase circuit 212.

Figure 27:
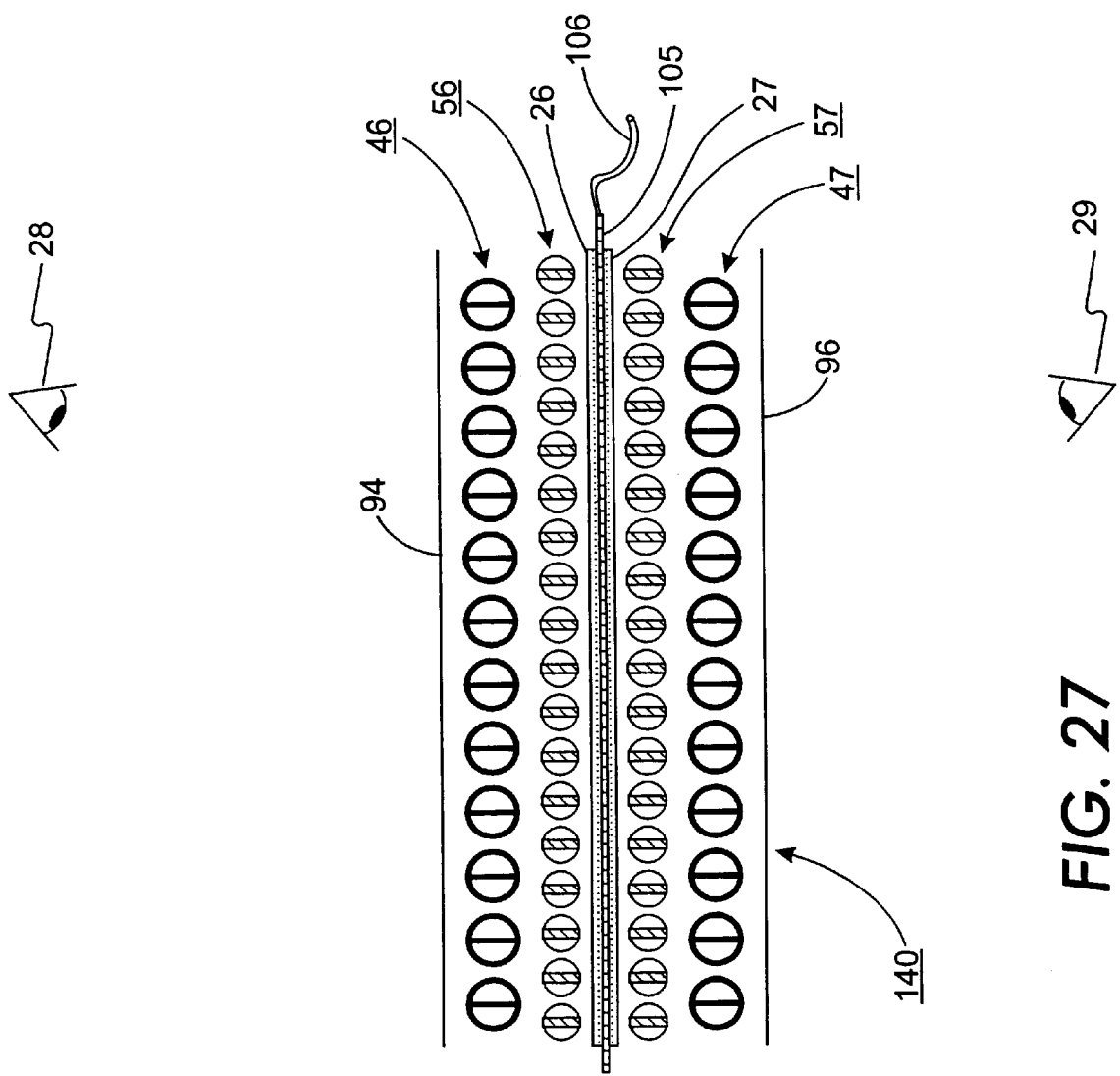
FIG. 27 depicts a cross section of an exemplary two-sided sheet of rotating element sheet material with reversible highlighting.

In a preferred embodiment of the present invention, the rotating element sheet material with reversible highlighting is fabricated so as to function on both sides of rotating element sheet material, as taught, for example in U.S. Pat. No. 5,723,204, herein incorporated by reference. An exemplary cross section of such rotating element sheet material 140 is depicted in FIG. 27. Also shown in FIG. 27 is first observer 28 and second observer 29. Surface 94 lies between first observer 28 and first layer 46 and second layer 56. Infralayer 26 forms the backdrop of the aspect presented to first observer 28 and conducting layer 105 lies below infralayer 26. Connector 106 can connect between conducting layer 105 and a power source (not shown). On the opposite side of conducting layer 105 is the corresponding second infralayer 27 third layer 57, fourth layer 47 and surface 96, where such elements, in the depicted cross-section plane, are the corresponding mirror-image elements to infralayer 26, second layer 46, first layer 46 and surface 94, respectively. A reversible highlighting implement (not shown) may be applied to surface 94 to influence the orientation second rotatable elements in second layer 56. Likewise, it may be applied to surface 96 in order to influence the orientation of second rotatable elements in third layer 57. Conducting layer 105 serves both as a pole of the capacitor corresponding to gap 209 of FIG. 22, and also as a shield of vector fields between the regions separated by conducting layer 105. Thus, vector fields introduced along surface 94 are shielded from affecting the region between surface 96 and infralayer 27 due to conducting layer 105. Likewise, vector fields introduced along surface 96 are shielded from affecting the region between surface 94 and infralayer 26, also due to conducting layer 105. In this manner, one or the other side of the rotating element sheet material with reversible highlighting 140 of FIG. 27 may be selectively addressed, erased, highlight-addressed, and highlight-erased.

V.C. Reversible Highligting System and Method 2

Rotatable elements consistent with another preferred embodiment of the present invention are depicted in FIGS.

Figure 28:
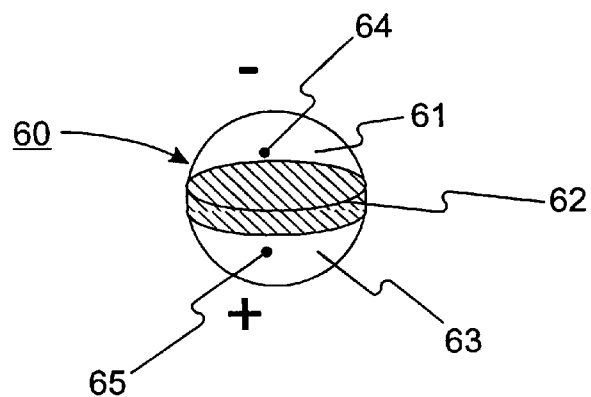
FIG. 28 depicts an exemplary rotatable element consistent with the present invention.

18, 19, and 28. FIG. 18 depicts first rotatable element 40, FIG. 19 depicts second rotatable element 50, and FIG. 28 depicts third rotatable element 60. First rotatable element 40, second rotatable element 50, and third rotatable element 60 are all fabricated as "light-valves," as previously depicted in the systems of FIGS. 5–10, and 12–14.

As before, in first rotatable element 40, first layer 41 is transparent-clear and third layer 43 is transparent-clear. Furthermore, the surface of third layer 43 has transparent-clear third coating 45 at a first Zeta potential, and the surface of first layer 41 has transparent-clear first coating 44 at a second Zeta potential such that the surface of third layer 43 has a net positive charge, "+," with respect to the surface of first layer 41 when rotatable element 40 is in contact with a dielectric fluid (not shown). In FIG. 18, second layer 42 of first rotatable element 40 is opaque to visible light and presents a dark-colored aspect when it is in a "closed" orientation.

Second rotatable element 50 is depicted in FIG. 19. In second rotatable element 50, first layer 51 is transparent-clear and third layer 53 is transparent-clear. Furthermore, the surface of third layer 53 has transparent-clear third coating 55 at a first Zeta potential, and the surface of first layer 51 has transparent-clear first coating 54 at a second Zeta potential such that the surface of third layer 53 has a net positive charge, "+," with respect to the surface of first layer 51 when rotatable element 50 is in contact with a dielectric fluid (not shown). In FIG. 19, second layer 52 of second rotatable element 50 is transparent-colored to visible light and presents a light-colored aspect when it is in a "closed" orientation. The transparent color associated with second rotatable elements 50 in a preferred embodiment is a color associated with conventional highlighters, such as yellow, pink, orange, or other colors. One skilled in the art will appreciate that, although opaque segments may also be used in the second rotatable elements 50, the visual appearance of the resulting display will be less like that of a conventional highlighting marker than would be the case with transparent-color center segments on dark-colored text and graphics and a light-colored background.

Third rotatable element 60 is depicted in FIG. 28. In third rotatable element 60, first layer 61 is transparent-clear and third layer 63 is transparent-clear. Furthermore, the surface of third layer 63 has transparent-clear third coating 65 at a first Zeta potential, and the surface of first layer 61 has transparent-clear first coating 64 at a second Zeta potential such that the surface of third layer 63 has a net positive charge, "+," with respect to the surface of first layer 61 when rotatable element 60 is in contact with a dielectric fluid (not shown). In FIG. 28, second layer 62 of third rotatable element 60 is transparent-colored to visible light and presents a light-colored aspect when it is in a "closed" orientation. The transparent color associated with third rotatable elements 60 in a preferred embodiment is a second color associated with conventional highlighters, such as yellow, pink, orange, or other colors, and is distinguishable from the transparent color of second rotatable element 50. One skilled in the art will appreciate that, although opaque segments may also be used in the third rotatable elements 60, the visual appearance of the resulting display will be less like that of a conventional highlighting marker than would be the case with transparent-color center segments on dark-colored text and graphics and a light-colored background. One skilled in the art will also appreciate that the transparent color of third rotatable element 60 may be chosen so as to saturate the transparent color of second rotatable element 50.

Figure 29:
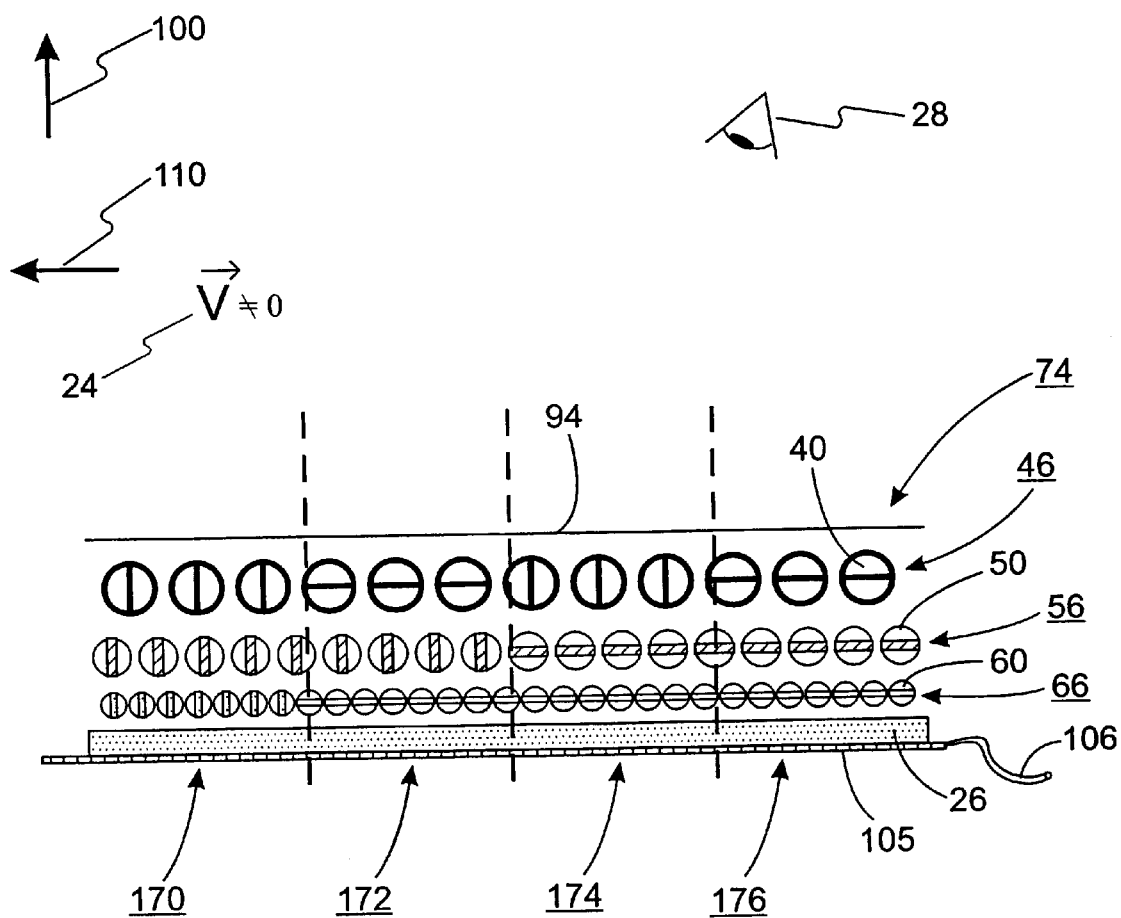
FIG. 29 depicts a second exemplary subsection of rotating element sheet material with reversible highlighting using the rotatable elements depicted in FIGS. 18, 19, and 28.
Figure 30:
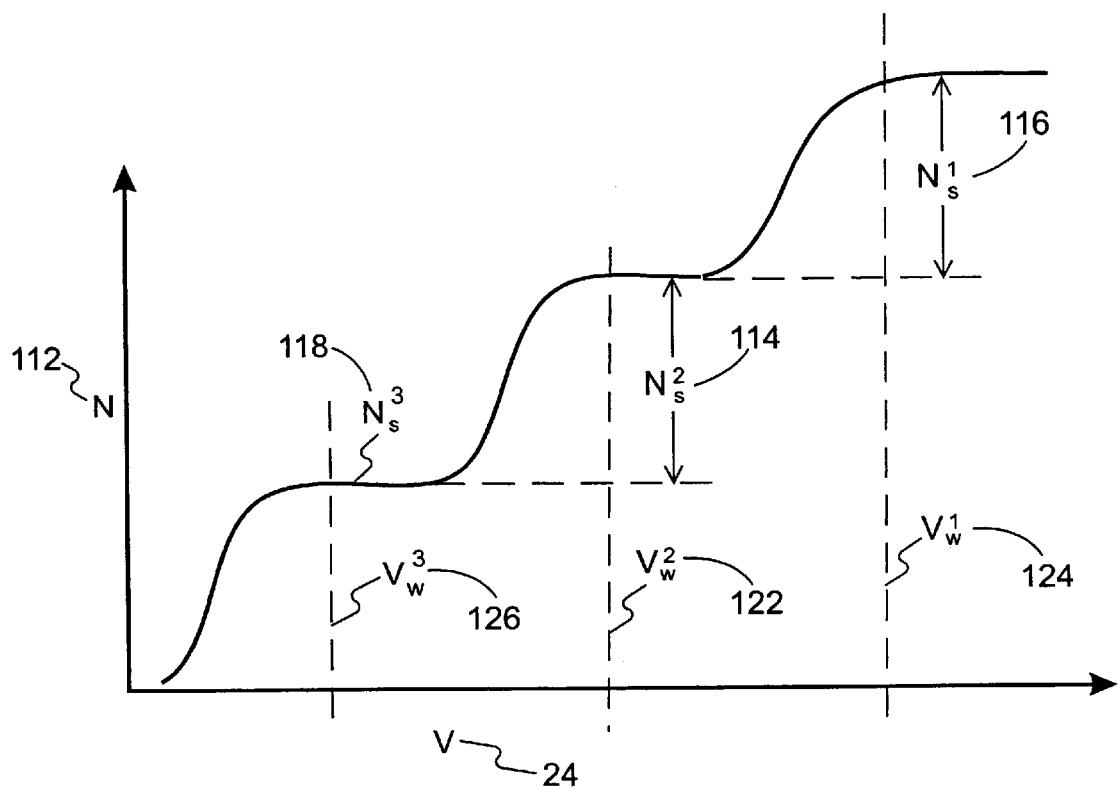
FIG. 30 depicts an exemplary graph of the number of rotatable elements that change orientation as a function of applied vector field, displaying work function and saturation numbers for a the rotating element sheet material of FIG. 29.
Figure 31:
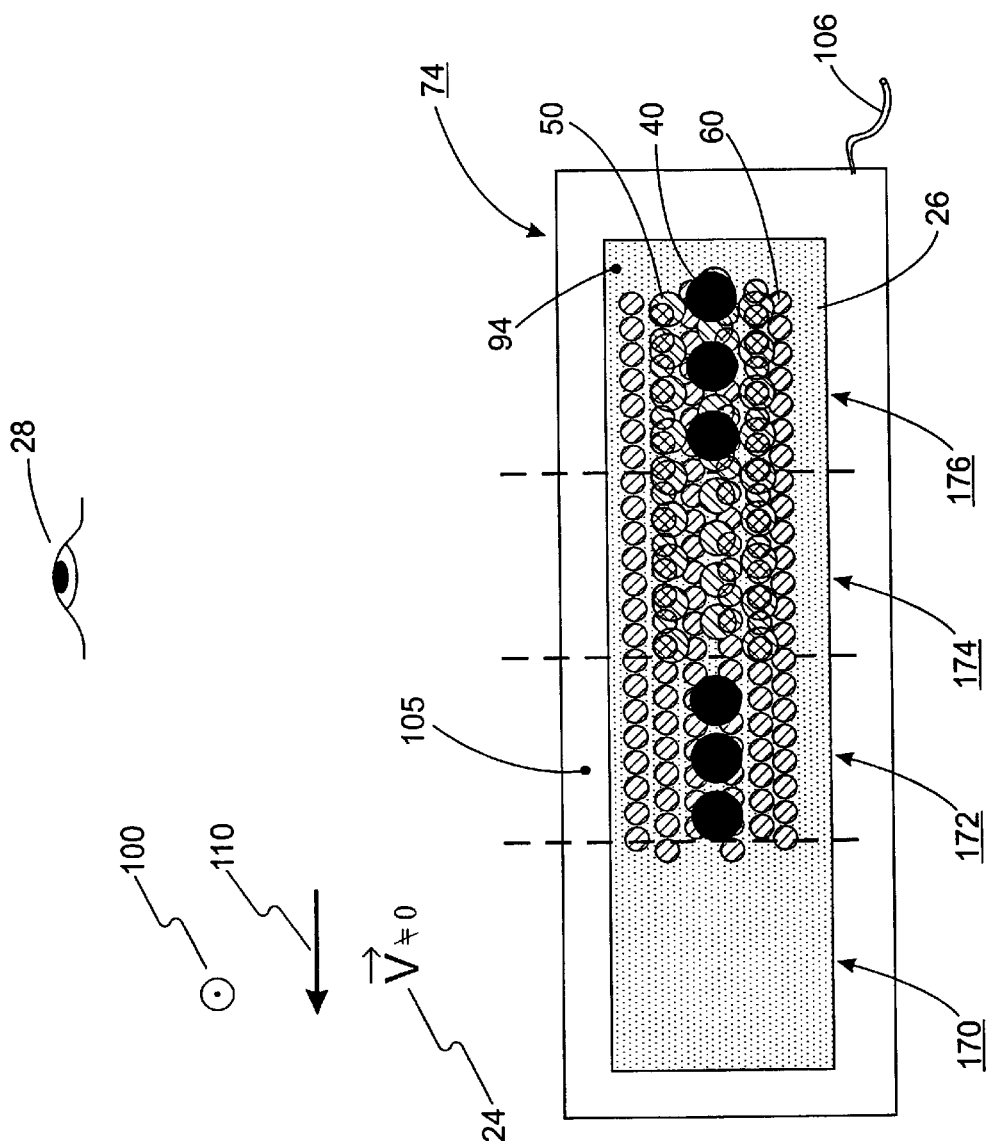
FIG. 31 depicts an alternate view of the exemplary system of FIG. 29.

Rotating element sheet material 74 with reversible highlighting utilizing first rotatable element 40, second rotatable element 50, and third rotatable element 60 is depicted in FIGS. 29 and 31. In FIGS. 29 and 31, there is a plurality of first rotatable elements 40, a plurality of second rotatable elements 50, and a plurality of third rotatable elements 60. In FIGS. 29 and 31, first rotatable elements 40 have the same first aspects, as well as a common first work function 124. Likewise, second rotatable elements 50 have the same second aspects, as well as a common second work function 122. Finally, third rotatable elements 60 have the same third aspects, as well as a common third work function 126. The graph of FIG. 30 is an exemplary graph of first work function 124, second work function 122, and third work function 126 associated with rotating element sheet material 74 of FIGS. 29 and 31. For ease of depiction in FIG. 31, only those rotatable elements in a "closed" orientation from FIG. 29 are shown. Rotatable elements in an "open" orientation from FIG. 29 are not shown.

In the preferred embodiment depicted in FIGS. 29 and 31, first rotatable elements 40 are in first layer 46, second rotatable elements 50 are in second layer 56, third rotatable elements 60 are in third layer 66, and all of first layer, second layer, and third layer are between infralayer 26 and observer 28. Furthermore, surface 94 lies between observer 28 and any of first rotatable element 40, second rotatable element 50, and third rotatable element 60. Infralayer 26, in a preferred embodiment of the present invention, is a light reflective material. It will be appreciated by one skilled in the art that although FIG. 29 depicts ordered layers of rotatable elements, in practice, such plurality of rotatable elements can be distributed randomly through the substrate, and the same view will be achieved. FIGS. 29 and 31, however, depicts merely a preferred ordering since it presents a maximal configuration of rotatable elements to aspect area. Such an "eggcrate" configuration, for example, is disclosed in U.S. Pat. No. 5,815,306, hereinabove incorporated by reference.

As described earlier in connection with FIGS. 6–9, first rotatable elements 40 can be rotated to expose or to conceal the light-colored infralayer, thus producing the visual effect of either a light-colored aspect, or a dark-colored aspect. Thus, first rotatable elements 40 provides the aspect associated with the substantive aspect.

First rotatable elements 40 have a first work function 124 of FIG. 30, which is higher than second work function 122 associated with second rotatable elements 50, and third work function 126 associated with third rotatable elements 60. One manner of establishing the difference of work functions is to vary the diameter of the rotatable elements as described earlier.

Again, FIG. 30 depicts an exemplary set of work functions associated with rotating element sheet material 74 of FIGS. 29 and 31. First work function 124, $V_W^1$, represents the threshold necessary to address all of first saturation level 116, $V_W^1$, of first rotatable elements 40, second saturation level 114, $V_W^2$, of second rotatable elements 50, and third saturation level 118, $V_W^3$, of third rotatable elements 60; second work function 122, $V_W^2$, represents the threshold necessary to address both second saturation level 114, $V_W^2$, of second rotatable elements 50 and third saturation level 118, $V_W^3$, of third rotatable elements 60; and finally, third work function 126, $V_W^3$, represents the threshold necessary to address the third saturation level 118, $V_W^3$, of third rotatable elements 60 only.

In FIGS. 29 and 31, region 170, region 172, region 174, and region 176 depict regions of rotating element sheet material 74 that have been placed under the influence of separate vector fields for addressing purposes. This can be accomplished through the use of an addressing implement 190 as depicted in FIG. 17, as well as through the use of a reversible highlighting implement as described below. In the embodiment depicted in FIGS. 29 and 31, each region is initially erased through the application of vector field 24 in the direction of transverse arrow 110. Thus, in region 170, observer 28 views all of first rotatable elements 40, second rotatable elements 50, and third rotatable elements 60 edge on. Because all first rotatable elements 40, second rotatable elements 50, and third rotatable elements 60 function as "light valves," observer 28 views a transparent-clear aspect associated with this configuration. Thus, observer 28 views infralayer 26, which is a light-reflective layer, as depicted in FIG. 31.

In region 172 of FIGS. 29 and 31, observer 28 views all of first rotatable elements 40 in a closed orientation, all of second rotatable elements 50 in an open orientation, and all of third rotatable elements 60 in a closed orientation. Thus, observer 28 views a dark-colored aspect associated with this configuration and highlighted aspect associated with third rotatable elements 60. In the preferred embodiment described above, such a highlighted aspect may be associated with the highlight color yellow.

In region 174, observer 28 views all of first rotatable elements 40 in an open orientation, all of second rotatable elements 50 in a closed orientation, and all of third rotatable elements 60 in a closed orientation. Thus, observer 28 views infralayer 26 in a highlighted state and no dark-colored aspect. In this case, and in the preferred embodiment discussed above, such a highlighted aspect may be associated with the highlight color orange.

Finally, in region 176, observer 28 views all of first rotatable elements 40, second rotatable elements 50, and third rotatable elements 60 in a closed orientation. Thus, observer 28 views a highlighted dark aspect, where the highlighted aspect is associated with the color orange in the preferred embodiment discussed above.

The method of selectively orienting first rotatable element 40, third rotatable element 60 only, or both second rotatable element 50 and third rotatable element 60 is summarized below in Table 3. In Table 3, the columns are divided according to applied vector field 24 at first work function 124, applied vector field 24 at second work function 122, or applied vector field 24 at third work function 126 and the columns are further subdivided according to whether the orientation of vector field 24 is in the general direction of observer 28, indicated by the symbol ⊙ and corresponding to the direction of arrow 100, or whether it is generally transverse to the direction of observer 28, indicated by the symbol →and corresponding to the direction of transverse arrow 110. The letter "Y" indicates that an applied field of magnitude suitable to overcome the appropriate work function is present in that particular orientation, and the letter "N" indicates that an applied field of magnitude not suitable to overcome the appropriate work function is present in that particular orientation. An additional column that indicates the number of steps necessary to obtain the desired aspect from a previous different aspect is also indicated. The rows are subdivided according to region 172, region 174, and region 176 of FIGS. 29 and 31. The use of "Y-1st" indicates the first step of a two-step process, the use of "Y-2nd" indicates the second step of a two-step process, and the use of "Y-3rd". For all rows, the starting orientation is that orientation depicted in region 170 of FIGS. 29 and 31.

TABLE 3

| Region | ⊙$v^1_w$ | →$v^1_w$ | ⊙$v^2_w$ | →$v^2_w$ | ⊙$v^3_w$ | →$v^3_w$ | Number of steps |
|---|---|---|---|---|---|---|---|
| Region 172 | Y-1st | N | N | Y-2nd | Y-3rd | N | 3 |
| Region 174 | N | N | Y | N | N | N | 1 |
| Region 176 | Y | N | N | N | N | N | 1 |

Figure 32:
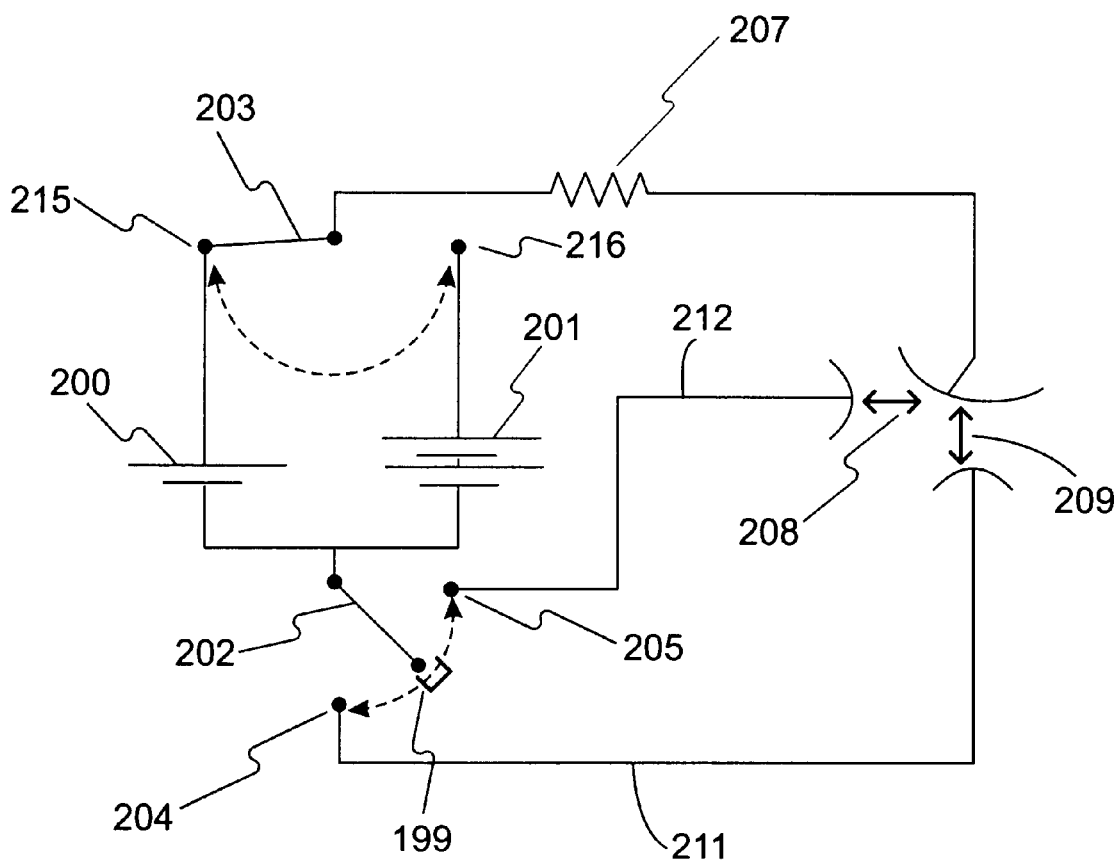
FIG. 32 is a second exemplary circuit diagram associated with a reversible highlighting implement.

In a preferred embodiment of the present invention, the plurality of first rotatable elements 40 dispersed throughout an exemplary sheet of rotating element sheet material with reversible highlighting 74 are addressed to present a substantive aspect using an applied vector field at first work function 124. Since, in the embodiment discussed here, this would also highlight-address the plurality of second rotatable elements 50 and third rotatable elements 60, the entire sheet should be put under the influence of an applied vector field at a second work function 122 in the direction of transverse arrow 110 or another suitable transverse direction as discussed earlier. This will reorient the plurality of second rotatable elements 50 and the plurality of third rotatable elements 60 into an highlight-erased orientation. The highlight-erasure field can be introduced by using selective-erasure system 180 of FIG. 15, or the bulk-erasure system of FIG. 16 discussed earlier. The user, then, with a reversible highlighting implement, can selectively highlight-address second rotatable elements 50 or both second rotatable elements 50 and third rotatable elements 60, and may also selectively highlight-erase second rotatable elements 50 or both second rotatable elements 50 and third rotatable elements 60 with a reversible highlighting implement. An exemplary circuit diagram associated with such a reversible highlighting implement is depicted in FIG. 32. Toggle 202 can be manipulated by a user to be in off position 199, highlight-address position 204, or highlight-erase position 205. Toggle 203 can be manipulated by a user in first power source position 215 or second power source position 216. The elements of the circuit depicted in FIG. 32 include first power source 200, second power source 201, exemplary resistance 207, and the capacitors associated with gap 208 or 209. Gap 208 corresponds to the gap introduced by potential drop implement 182 depicted in FIG. 15 of selective-erasing system 180. Thus, toggle 202 in highlight-erase position 205 closes highlight-erasing circuit 212 associated with an implement for selective highlight erasure. Circuit 212 may include first power source 200 or second power source 201 depending upon the position of toggle 203. Gap 209 corresponds to the gap between surface 94 of rotating element sheet material with reversible highlighting 74 and conducting layer 105 as depicted in FIG. 29. Thus, the combination of toggle 202 in highlight position 204 and the distal end of reversible highlighting implement applied to surface 94 of rotating element sheet material with reversible highlighting 74 closes highlight-address circuit 211 associated with an implement for selective highlight-addressing. Again, highlight-address circuit 211 may include first power source 200 or second power source 201 depending upon the position of toggle 203.

Figure 33:
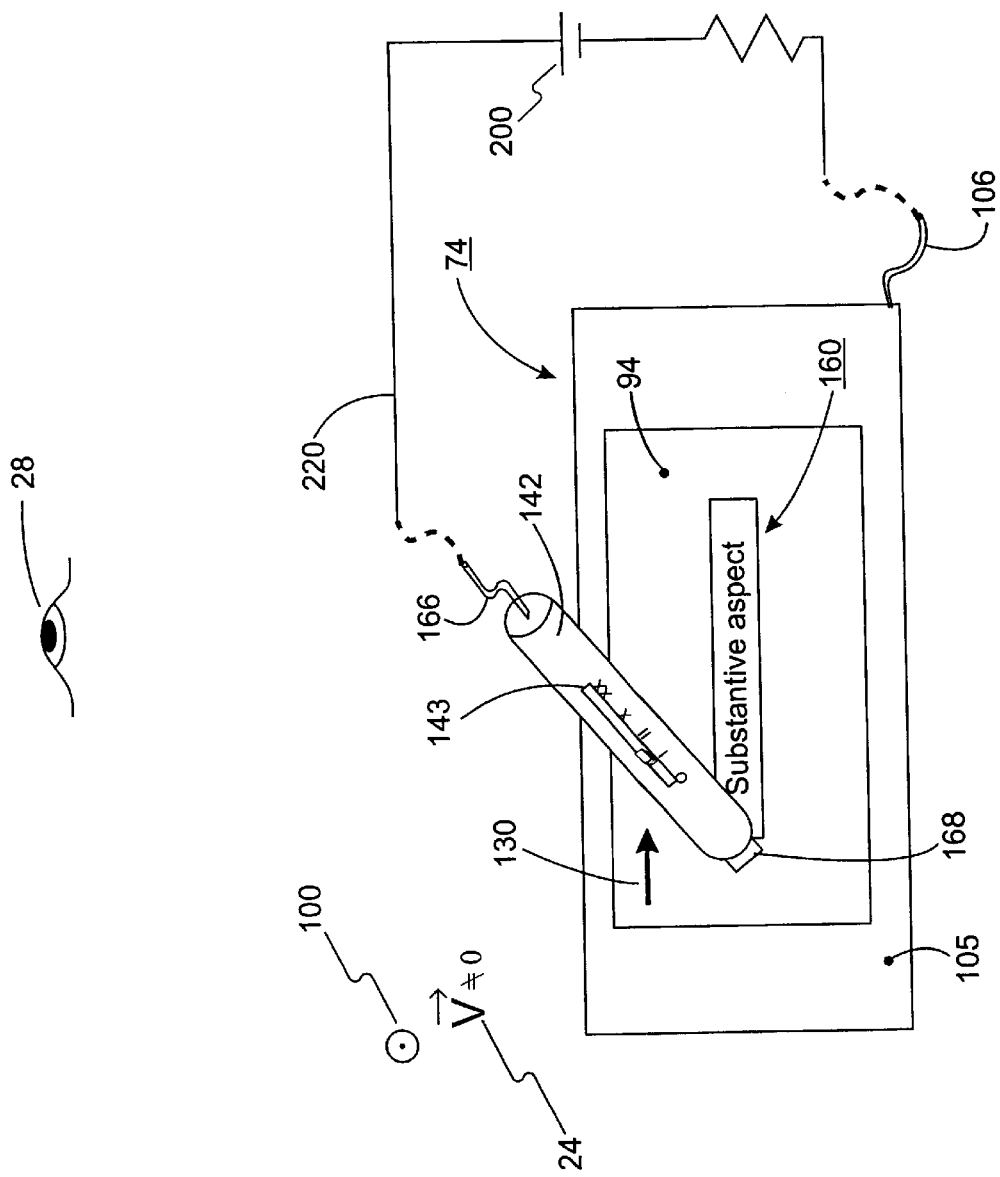
FIG. 33 depicts a second exemplary reversible highlighting implement consistent with the present invention and a substantive aspect to be highlighted.
Figure 34:
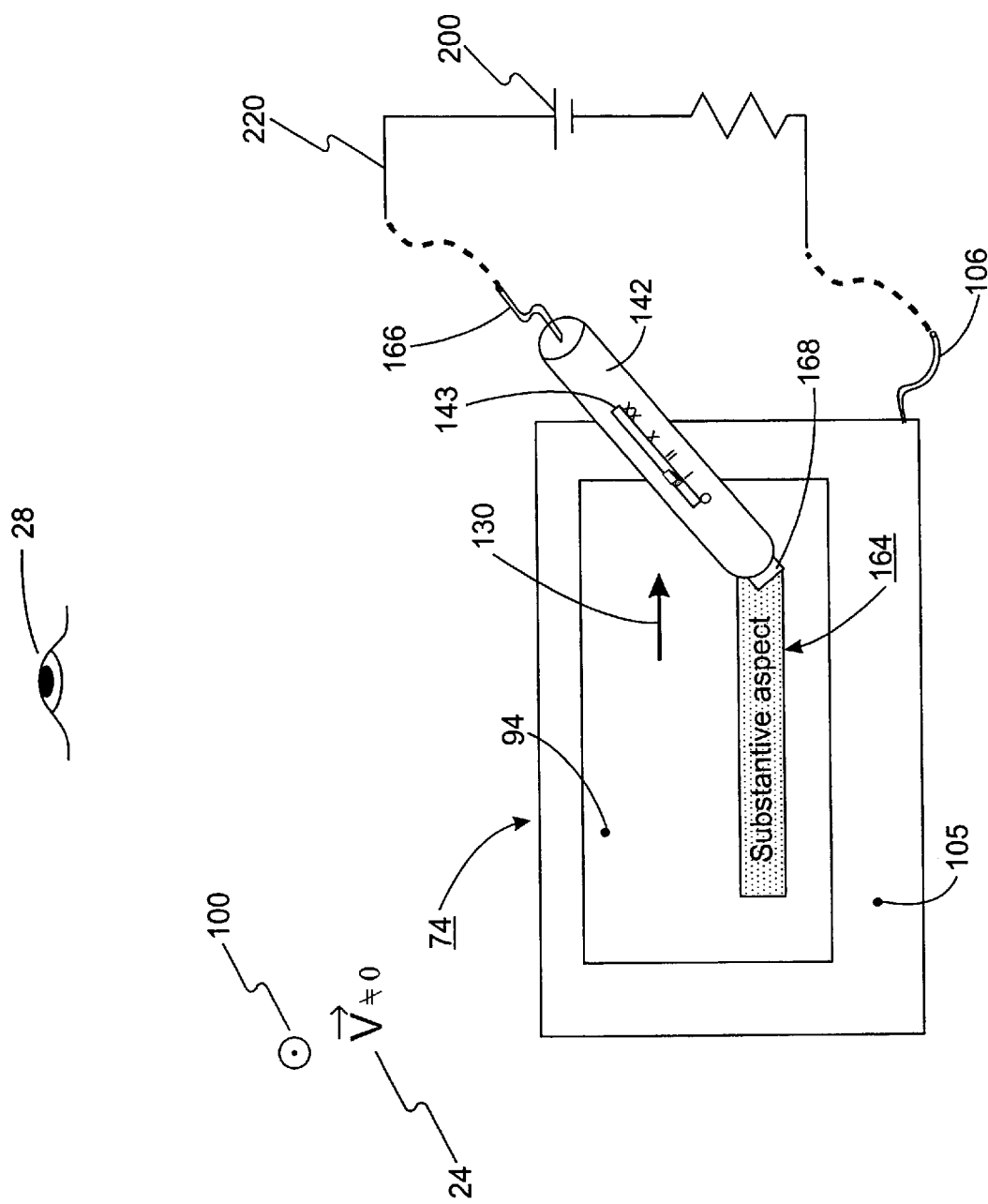
FIG. 34 depicts the second reversible highlighting implement and a highlighted aspect of the system of FIG. 33.

In one embodiment of the present invention, rotating element sheet material is prepared containing substantive aspect with all of the second rotatable elements 50 and third rotatable elements 60 in an open orientation. Next, a user can manipulate highlighting implement 142 such that it is dragged across surface 94 of rotating element sheet material 74. This is depicted in FIGS. 33 and 34. Highlighting implement 142 in this case operates at third work function 126. As described above, highlighting implement introduces a vector field in the direction of arrow 100. For example, if conducting layer 105 is set at a first potential, V1, and if distal end 168 of reversible highlighting implement 142 is set at a third potential V3, then by introducing highlighting implement 142 to the surface of rotating element sheet material 74, all of third rotatable elements 60 in the vicinity of highlighting implement 142 will change their orientation. Highlighting implement 142 does not change the aspect presented to observer 28 associated with first rotatable elements 40 or second rotatable elements 50 even though it does change the aspect presented to observer 28 associated with third rotatable elements 60.

Again, FIG. 33 displays an aspect as it might be presented to observer 28 before the application of highlighting implement 142, and FIG. 34 displays the exemplary aspect plus highlighting aspect 164 after highlighting implement 142 has been dragged across in the direction of arrow 130. Connector 166 is a connection to the first power source of circuit 220.

Figure 35:
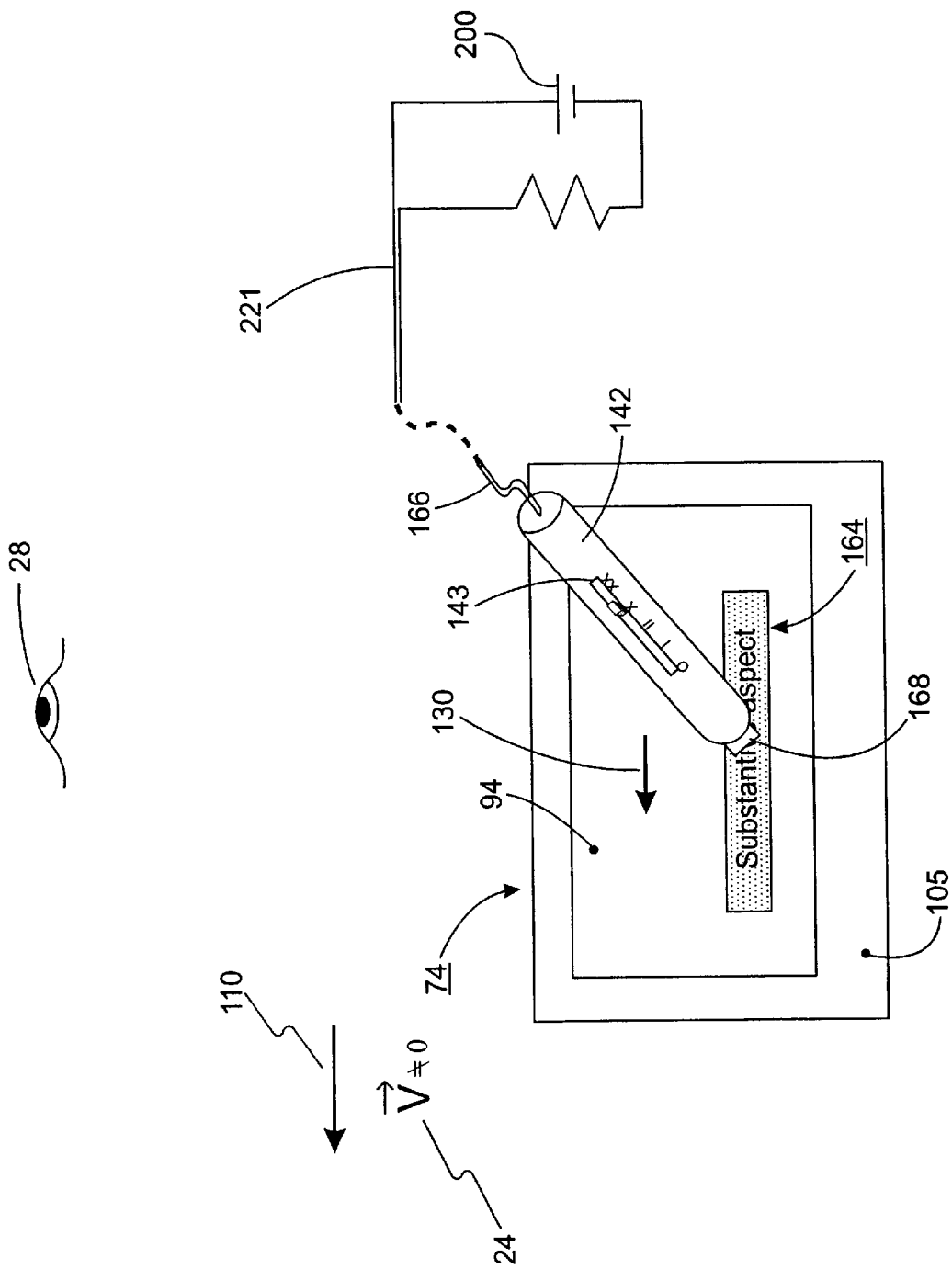
FIG. 35 depicts a second exemplary reversible highlighting implement and a highlighted aspect to be selectively erased consistent with the present invention.
Figure 36:
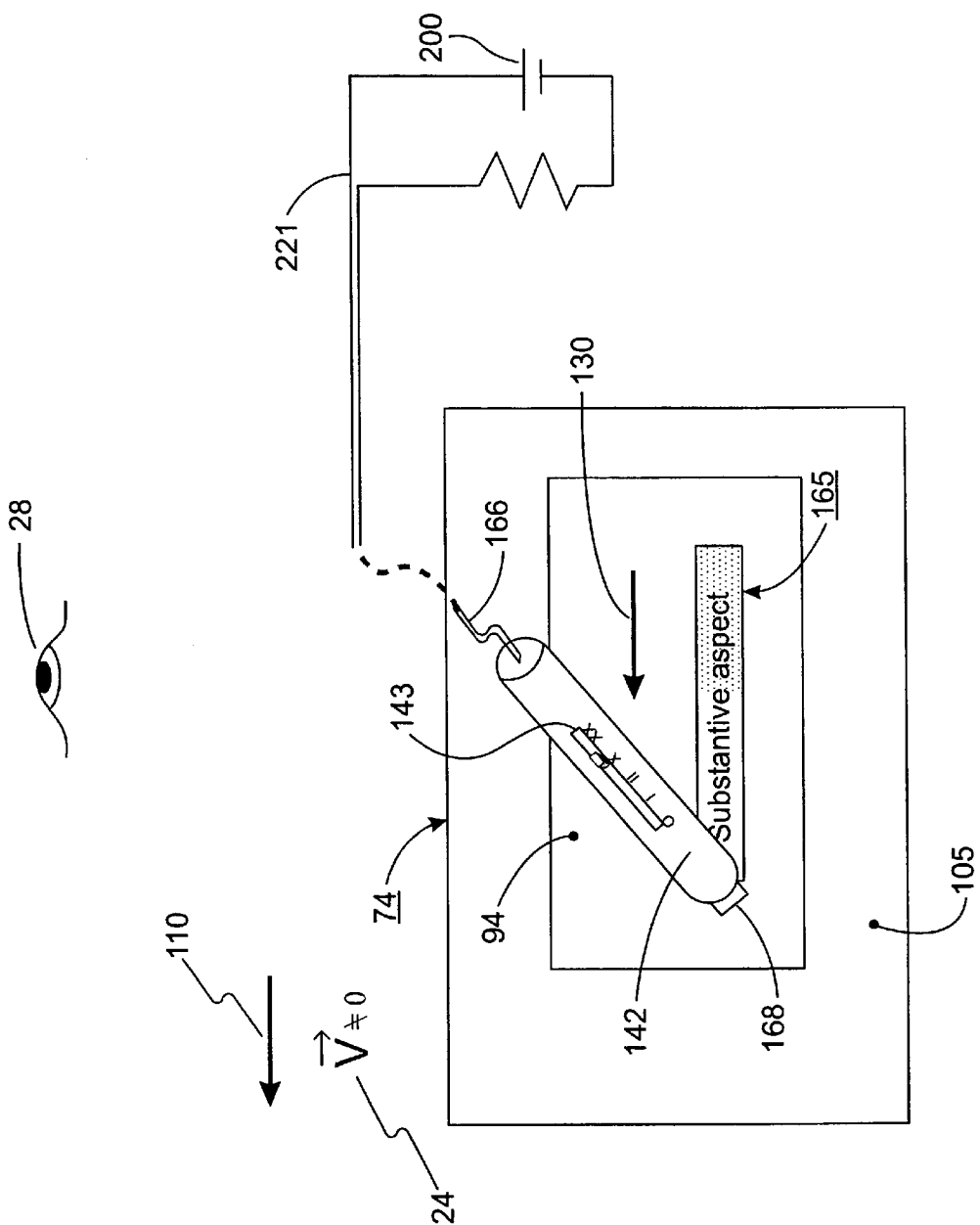
FIG. 36 depicts the second exemplary reversible highlighting implement and a highlighted aspect selectively erased of the system of FIG. 35.

In a further embodiment of the present invention, rotating element sheet material is prepared containing substantive material 160 with some of third rotatable elements 60 in a closed orientation. Next, highlighting implement 142 with toggle 143 set in "highlight-erase" mode, denoted by an "X" in FIG. 35, can be manipulated by a user such that it is dragged across surface 94 of rotating element sheet material 74 in order to have selective highlight-erasure. This is depicted in FIGS. 35 and 36. Highlighting implement 142 in highlight-erase mode functions with selective erasure implement 180 as depicted in FIG. 15. It operates at third work function 126 and introduces vector field 24 in the direction of transverse arrow 110 or another suitable transverse direction. For example, as discussed with respect to FIG. 15 above, if one side of distal end 168 of reversible highlighting implement 142 is set at a first potential, V1, and if the other side of distal end 168 of reversible highlighting implement 142 is set at a second potential V2, then by introducing distal end 168 of reversible highlighting implement 142 to surface 94 of rotating element sheet material 74, all of the third rotatable elements 60 in the vicinity of highlighting implement 142 will change their orientation, as depicted in FIG. 36. Again, highlighting implement 142 does not change the aspect presented to observer 28 associated with first rotatable elements 40 or second rotatable elements 50 even though it does change the aspect presented to observer 28 associated with third rotatable elements 60.

FIG. 35 displays highlighted material 164 as it might be presented to observer 28 before the application of highlighting implement 142, and FIG. 36 displays substantive material plus selective erasure aspect 165 after highlighting implement 142 has been dragged across a portion of the highlighted aspect area in the direction of arrow 130. Connector 166 is a connection from highlighting implement 162 to first power source of erasing circuit 221.

Figure 37:
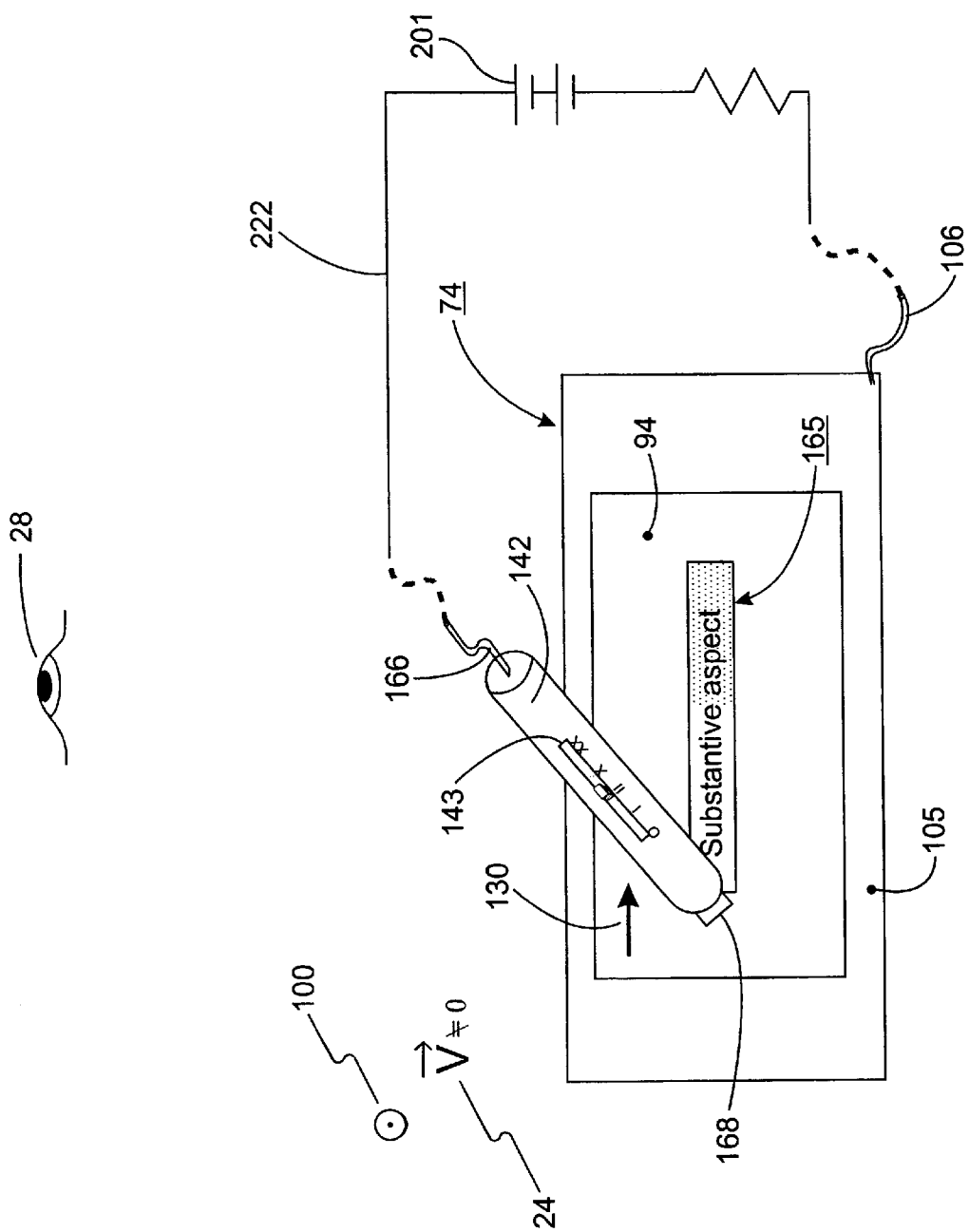
FIG. 37 depicts a second exemplary reversible highlighting implement consistent with the present invention and a substantive aspect to be highlighted.
Figure 38:
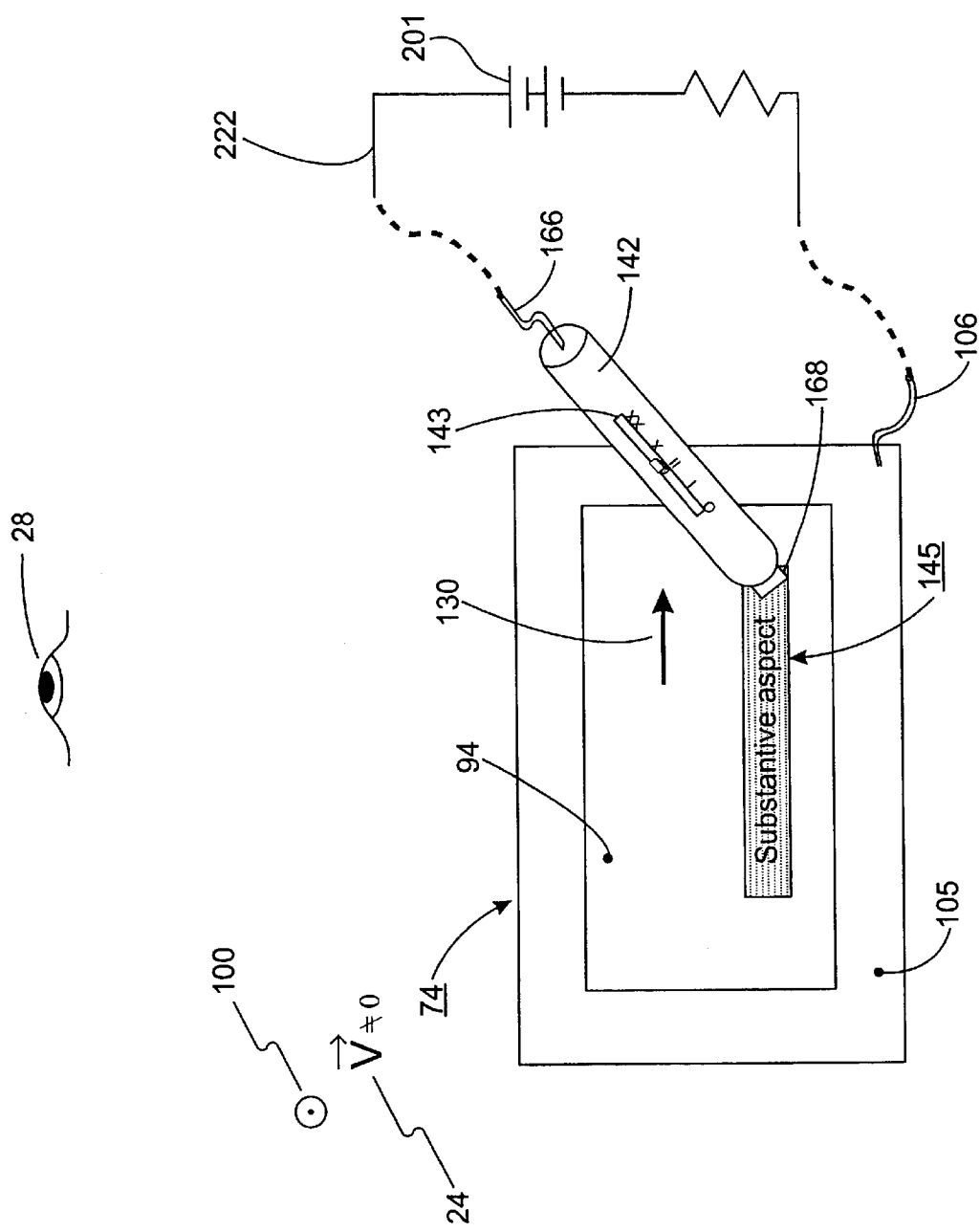
FIG. 38 depicts the second exemplary reversible highlighting implement and a highlighted aspect of the system of FIG. 37.

In a further embodiment of the present invention, rotating element sheet material is prepared containing substantive material plus selective erasure aspect 165 with all of second rotatable elements 50 in an erased orientation. As shown in FIG. 37, some of first rotatable elements 50 and third rotatable elements 60 may be oriented so as to present a closed aspect to favorably situated observer 28. Next, a user can manipulate highlighting implement 142 such that it is dragged across surface 94 of rotating element sheet material 74. This is depicted in FIGS. 37 and 38. Reversible highlighting implement 142 operates at second work function 122, denoted in toggle 143 by the symbol "II," and introduces vector field 24 in the direction of arrow 100. For example, if bottom surface 192 is set at a first potential, V1, and if highlighting implement 142 is set at a second potential V2, then by introducing highlighting implement 142 to surface 94 of rotating element sheet material 74, all of second rotatable elements 50 and third rotatable elements 60 in the vicinity of highlighting implement 142 will change their orientation, as depicted in FIG. 38. Highlighting implement 162 does not change the aspect presented to observer 28 associated with first rotatable elements 40, even though it does change the aspect presented to observer 28 associated with second rotatable elements 50 and third rotatable elements 60.

FIG. 37 displays substantive aspect with selective erasure 165 as it might be presented to observer 28 before the application of highlighting implement 142, and FIG. 38 displays substantive plus highlighting aspect 145 after highlighting implement 142 has been dragged across in the direction of arrow 130. Connector 166 is a connection from highlighting implement 142 to second power source of highlighting circuit 222.

Figure 39:
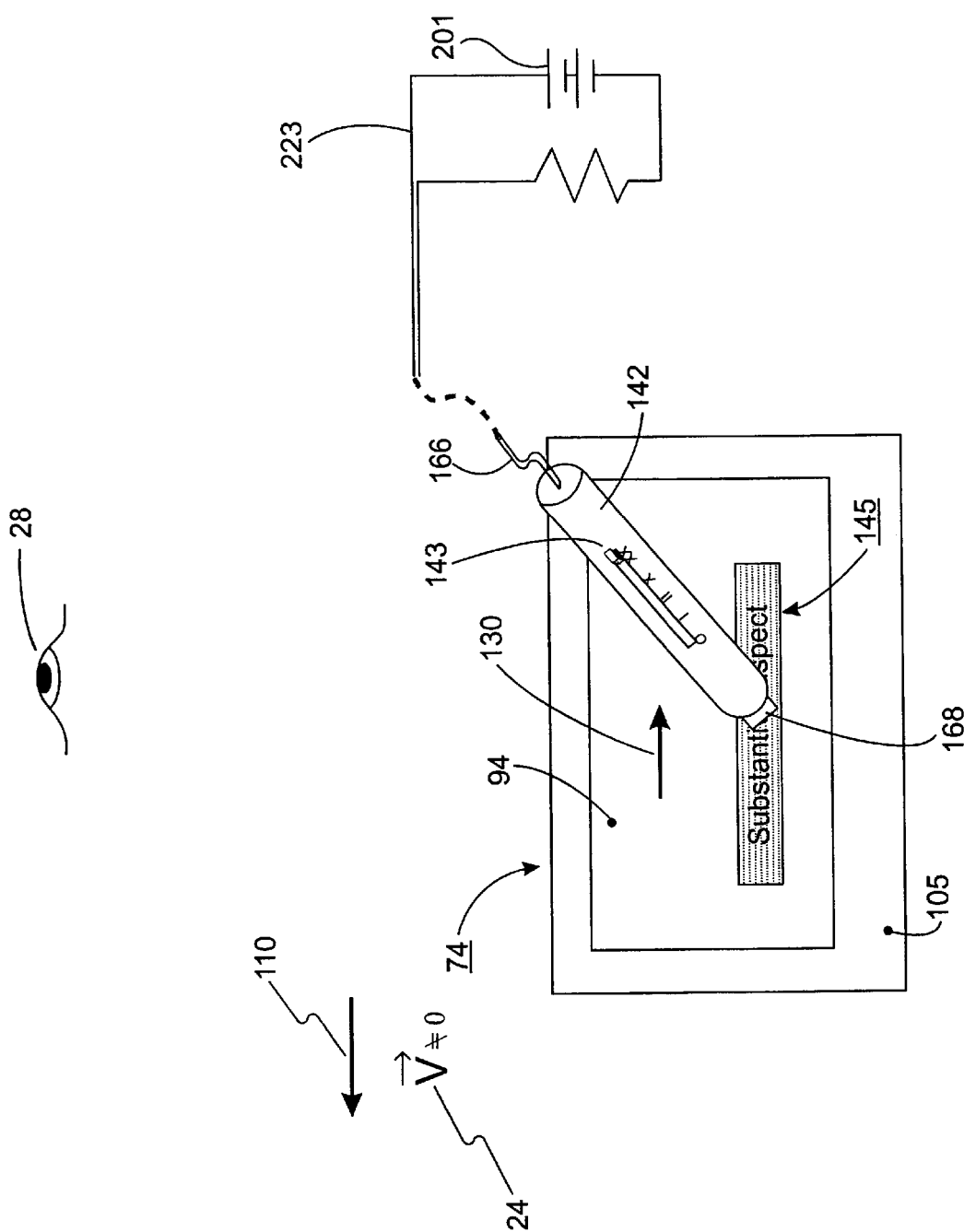
FIG. 39 depicts a second exemplary reversible highlighting implement and a highlighted aspect to be selectively erased consistent with the present invention.
Figure 40:
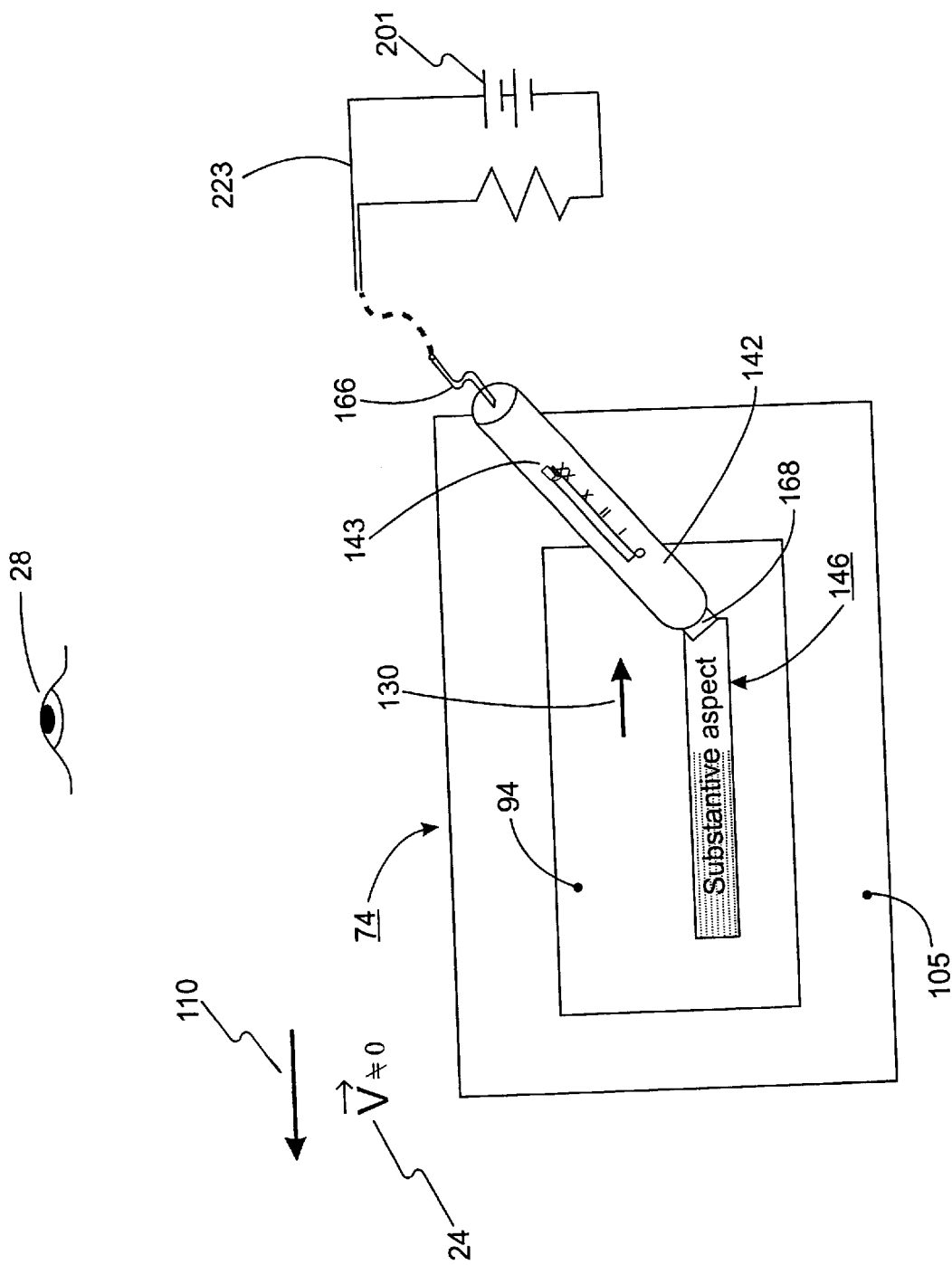
FIG. 40 depicts the second exemplary reversible highlighting implement and a highlighted aspect selectively erased of the system of FIG. 39.

In a further embodiment of the present invention, rotating element sheet material is prepared containing substantive material 145 with some of second rotatable elements 50 in a closed orientation. Next, highlighting implement 142 with toggle 143 set in "erase" mode, denoted by an "XX" in FIG. 39, can be manipulated by a user such that it is dragged across surface 94 of rotating element sheet material 74 in order to have selective highlight-erasure. This is depicted in FIGS. 39 and 40. Highlighting implement 142 in highlight-erase mode functions with selective erasure implement 180 as depicted in FIG. 15. It operates at second work fiction 122 and introduces vector field 24 in the direction of transverse arrow 110 or another suitable transverse direction. For example, as discussed with respect to FIG. 15 above, if one side of distal end 168 of reversible highlighting implement 142 is set at a first potential, V1, and if the other side of the distal end 168 of reversible highlighting implement 142 is set at a second potential V2, then by introducing the distal end 168 of reversible highlighting implement 142 to surface 94 of rotating element sheet material 74, all of the second rotatable elements 50 and third rotatable elements 60 in the vicinity of reversible highlighting implement 142 will change their orientation, as depicted in FIG. 40. Again, reversible highlighting implement 142 does not change the aspect presented to observer 28 associated with first rotatable elements 40 even though it does change the aspect presented to observer 28 associated with second rotatable elements 50 and third rotatable elements.

FIG. 39 displays highlighted material 145 as it might be presented to observer 28 before the application of reversible highlighting implement 142, and FIG. 40 displays substantive material plus selective erasure aspect 146 after reversible highlighting implement 142 has been dragged across a portion of the highlighted aspect area in the direction of arrow 130. Connector 166 is a connection from highlighting implement 142 to second power source 201 of erasing circuit 223.

As discussed earlier, one skilled in the art will appreciate that the above embodiment can be fabricated so as to function one both sides of rotating element sheet material.

V.D. Reusable Electric Paper Course Packs with Reversible Highlighting

Figure 41:
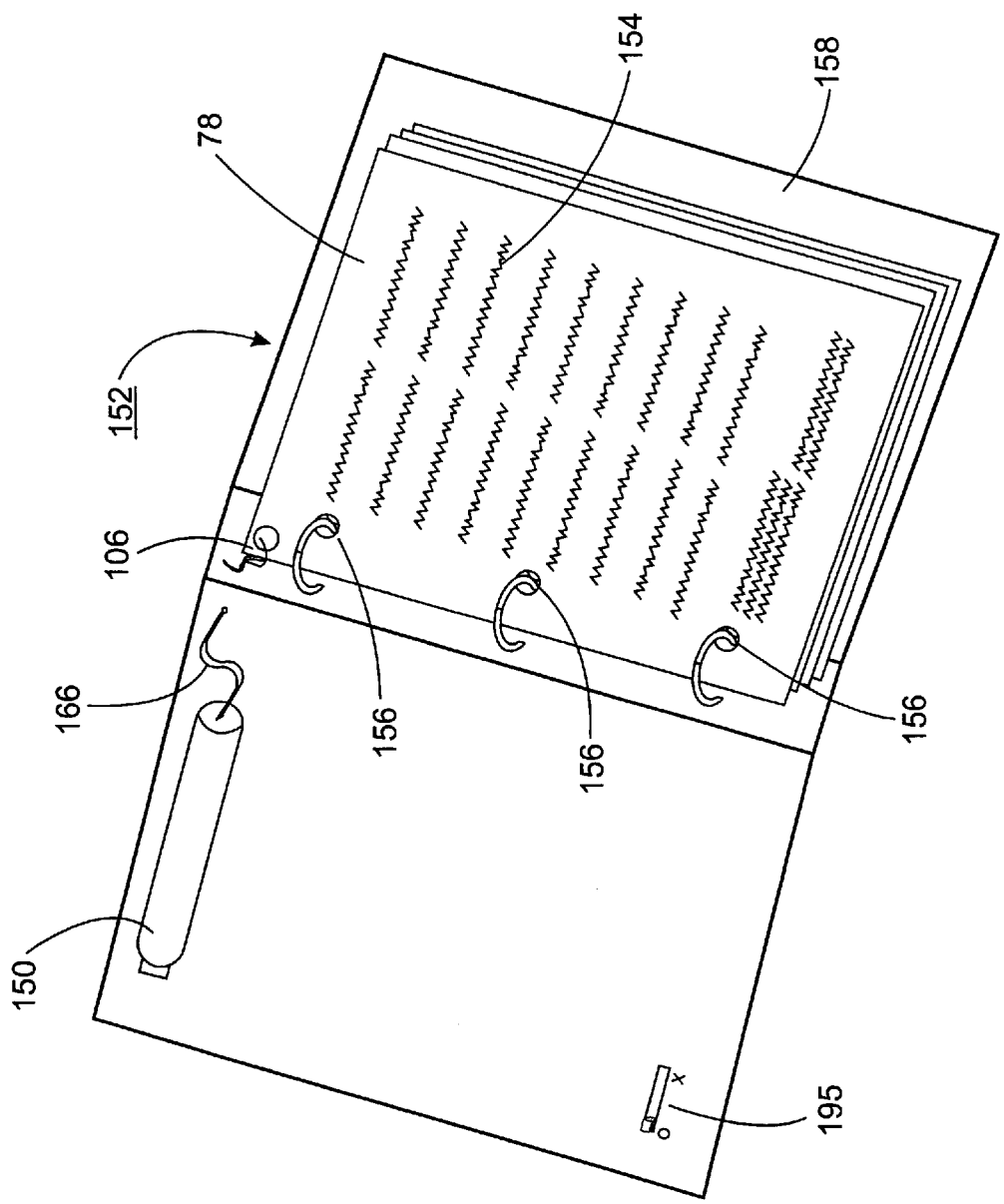
FIG. 41 depicts an exemplary course pack of reversible highlighting rotatable element sheet material with a reversible highlighting implement.

Kit 152 comprising rotating element sheet material with reversible highlighting 78, highlighting implement 150, and binder 158 is depicted in a preferred embodiment of the present invention in FIG. 41. In the embodiment depicted in FIG. 41, rotating element sheet material 78 is prepared with hole punches 156 so as to be able to place in a conventional three-ring binder. Furthermore, rotating element sheet material with reversible highlighting 78 is selected from the group consisting of rotating element sheet material with reversible highlighting 70 as depicted in FIG. 20, rotating element sheet material with reversible highlighting 74 as depicted in FIG. 29, and the corresponding two-sided versions of such rotating element sheet material with reversible highlighting. Binder 158 comprises a conventional three-ring binder, and, in addition, accommodates highlighting implement 150, a power supply (not shown), and the appropriate connections, as connector 166 and connector 106, so as to be able to use highlighting implement 150 to address applied vector field 24 to specific regions on the surface of rotating element sheet material 78. Substantive aspect 154 is an aspect associated with a preferred orientation of first rotatable elements 40 from rotating element sheet material with reversible highlighting, as depicted, for example, in FIGS. 20 and 29.

Binder 158 may also be equipped with bulk erase toggle 195 in order to bulk-erase the highlighted aspect of the rotating element sheet material with reversible highlighting. Connector 106 can connect to a bulk-erase system embedded in rotating element sheet material 18 as depicted, for example, in FIG. 16. Alternatively, or in addition, reversible highlighting implement 150 can incorporate a toggle (not shown) in order to enable selective highlight-erasure in addition to selective highlight-addressing as depicted in any of FIGS. 23–26 and 33–40.

Furthermore, one of skill in the art will appreciate that binder 158 is exemplary only, and that other forms of binding are consistent with the present invention including spiral binding and in a form known commercially as VeloBind (General Binding Corporation, Northbrook, Illinois).

V.E. Conclusion

A system comprising rotating element sheet material and a highlighting implement as well as a kit including a binder and a method of reversible highlighting has been described. The foregoing description of an implementation of the invention has been presented for purposes of illustration and description. It is not exhaustive and does not limit the invention to the precise form disclosed. Modifications and variations are possible in light of the above teachings or may be acquired from practicing the invention. For example, some of the examples used the spectrum associated with visible light as the electromagnetic energy of interest. However, the use of any electromagnetic energy, including infrared, ultraviolet and x-rays as the electromagnetic energy of interest is consistent with the present invention. For example, a highlighting aspect that is responsive to infrared light in one orientation and that is not responsive to infrared light in another orientation is consistent with the present invention. Furthermore, the examples described above utilized rotatable elements where the geometry of a layer of the rotatable element determined light-valve property. However, rotatable elements that possess an inherent crystal-like dichroism, whereby they transmit or reflect incident electromagnetic energy as a function of the orientation of the rotatable element with respect to direction of the incident electromagnetic energy of interest is also consistent with the present invention. Accordingly, the invention is not limited to the above described embodiments, but instead is defined by the appended claims in light of their full scope of equivalents.

What is claimed is:

1. A system comprising rotating element sheet material with reversible highlighting; and a highlighting implement;

wherein said rotating element sheet material with reversible highlighting comprises:

a conducting layer; and a plurality of first rotatable elements and a plurality of second rotatable elements disposed in a substrate and in contact with an enabling fluid;

wherein said substrate is adjacent to said conducting layer;

wherein each said first rotatable element in said plurality has:

a first collection of responses to incident electromagnetic radiation of interest, where a first response in said first collection of responses renders said first rotatable element transparent-clear to said incident electromagnetic energy of interest, and wherein a second response in said first collection of responses renders said first rotatable element opaque to said incident electromagnetic energy of interest; and a first work function; and wherein each said second rotatable element in said plurality has:

a second collection of responses to incident electromagnetic radiation of interest, where a first response in said second collection renders said second rotatable element transparent-clear to said incident electromagnetic energy of interest, and a second response in said second collection renders said second rotatable element transparent-colored to said incident electromagnetic energy of interest; and a second work function; and wherein said second work function is less than said first work function; and wherein said highlighting implement and said conducting layer are configured to introduce a first vector field in a first direction in said substrate where said first vector field has a magnitude greater than said second work function and less than said first work function.

2. The system of claim 1, further comprising an erasing implement, wherein said erasing implement introduces a second vector field in a second direction in said substrate where said second vector field has a magnitude greater than said second work function and less than said first work function.

3. A kit comprising:

said system of claim 2; and a binder;

wherein said rotating element sheet material with reversible highlighting, said highlighting implement, said erasing implement, and said binder are configured such that said binder holds said rotating element sheet material with reversible highlighting, and accommodates said highlighting implement, and said erasing implement.

4. A system comprising
rotating element sheet material with reversible highlighting; and
a highlighting implement;
wherein said rotating element sheet material with reversible highlighting comprises:
a conducting layer; and
a plurality of first rotatable elements, a plurality of second rotatable elements, and a plurality of third rotatable elements disposed in a substrate and in contact with an enabling fluid;
wherein said substrate is adjacent to said conducting layer;
wherein each said first rotatable elements in said plurality has:
a first collection of responses to incident electromagnetic radiation of interest, where a first response in said first collection of responses renders said first rotatable element transparent-clear to said incident electromagnetic energy of interest, and wherein a second response in said first collection of responses renders said first rotatable element opaque to said incident electromagnetic energy of interest; and
a first work function; and
wherein each said second rotatable elements in said plurality has:
a second collection of responses to incident electromagnetic radiation of interest, where a first response in said second collection renders said second rotatable element transparent-clear to said incident electromagnetic energy of interest, and a second response in said second collection renders said second rotatable element a first transparent-color to said incident electromagnetic energy of interest; and
a second work function; and
wherein said second work function is less than said first work function; and
wherein each said third rotatable elements in said plurality has:
a third collection of responses to incident electromagnetic radiation of interest, where a first response in said third collection renders said third rotatable element transparent-clear to said incident electromagnetic energy of interest, and a second response in said third collection renders said third rotatable element a second transparent-color to said incident electromagnetic energy of interest; and
a third work function; and
wherein said third work function is less than said first work function and said second work function; and
wherein said second transparent-color is different from said first transparent-color; and
wherein said highlighting implement and said conducting layer are configured to introduce a first vector field in a first direction in said substrate and a second vector field in a first direction in said substrate, where said first vector field in said first direction has a magnitude greater than said second work function and less than said first work function, and said second vector field in said first direction has a magnitude greater than said third work function and less than said second work function.

5. The system of claim 4, further comprising an erasing implement,
wherein said erasing implement introduces said first vector field in a second direction in said substrate and said second vector field in a second direction in said substrate where said first vector field in said second direction has a magnitude greater than said second work function and less than said first work function, and said second vector field in said second direction has a magnitude greater than said third work function and less than said second work function.

6. A kit comprising:
the system of claim 5; and
a binder;
wherein said rotating element sheet material with reversible highlighting, said highlighting implement, said erasing implement, and said binder are configured such that said binder holds said rotating element sheet material with reversible highlighting, and accommodates said highlighting implement, and said erasing implement.

7. A method of reversible highlighting comprising:
providing rotating element sheet material with reversible highlighting;
wherein said rotating element sheet material with reversible highlighting comprises:
a conducting layer; and
a plurality of first rotatable elements and a plurality of second rotatable elements disposed in a substrate and in contact with an enabling fluid;
wherein said substrate is adjacent to said conducting layer;
wherein each said first rotatable element in said plurality has:
a first collection of responses to incident electromagnetic radiation of interest, where a first response in said first collection of responses renders said first rotatable element transparent-clear to said incident electromagnetic energy of interest, and wherein a second response in said first collection of responses renders said first rotatable element opaque to said incident electromagnetic energy of interest; and
a first work function; and
wherein each said second rotatable element in said plurality has:
a second collection of responses to incident electromagnetic radiation of interest, where a first response in said second collection renders said second rotatable element transparent-clear to said incident electromagnetic energy of interest, and a second response in said second collection renders said second rotatable element transparent-colored to said incident electromagnetic energy of interest; and
a second work function; and
wherein said second work function is less than said first work function;
applying a highlighting implement to a first region of said rotating element sheet material with reversible highlighting so as to introduce a first vector field in a first direction in said substrate where said first vector field has a magnitude greater than said second work function and less than said first work function; and
applying an erasing implement to a portion of said first region of said rotating element sheet material with reversible highlighting so as to introduce a second vector field in a second direction in said substrate where said second vector field has a magnitude greater than said second work function and less than said first work function.

8. A method of reversible highlighting comprising:
providing rotating element sheet material with reversible highlighting;
wherein said rotating element sheet material with reversible highlighting comprises:
   a conducting layer; and
   a plurality of first rotatable elements, a plurality of second rotatable elements, and a plurality of third rotatable elements disposed in a substrate and in contact with an enabling fluid;
   wherein said substrate is adjacent to said conducting layer;
   wherein each said first rotatable elements in said plurality has:
      a first collection of responses to incident electromagnetic radiation of interest, where a first response in said first collection of responses renders said first rotatable element transparent-clear to said incident electromagnetic energy of interest, and wherein a second response in said first collection of responses renders said first rotatable element opaque to said incident electromagnetic energy of interest; and
      a first work function; and
   wherein each said second rotatable elements in said plurality has:
      a second collection of responses to incident electromagnetic radiation of interest, where a first response in said second collection renders said second rotatable element transparent-clear to said incident electromagnetic energy of interest, and a second response in said second collection renders said second rotatable element a first transparent-color to said incident electromagnetic energy of interest; and
      a second work function; and
   wherein said second work function is less than said first work function; and
   wherein each said third rotatable elements in said plurality has:
      a third collection of responses to incident electromagnetic radiation of interest, where a first response in said third collection renders said third rotatable element transparent-clear to said incident electromagnetic energy of interest, and a second response in said third collection renders said third rotatable element a second transparent-color to said incident electromagnetic energy of interest; and
      a third work function; and
   wherein said third work function is less than said first work function and said second work function; and
   wherein said second transparent-color is different from said first transparent-color;
   applying a highlighting implement to a first region of said rotating element sheet material with reversible highlighting so as to introduce a first applied vector field selected from the group of: a first vector field in a first direction in said substrate; and a second vector field in said first direction in said substrate; where said first vector field in said first direction has a magnitude greater than said second work function and less than said first work function, and said second vector field in said first direction has a magnitude greater than said third work function and less than said second work function; and
   applying an erasing implement to a portion of said first region of said rotating element sheet material with reversible highlighting so as to introduce a second applied vector field selected from the group of: a first vector field in a second direction in said substrate; and a second vector field in said second direction in said substrate; where said first vector field in said second direction has a magnitude greater than said second work function and less than said first work function, and said second vector field in said second direction has a magnitude greater than said third work function and less than said second work function.

9. A system comprising
two-sided rotating element sheet material with reversible highlighting; and
a highlighting implement;
wherein said two-sided rotating element sheet material with reversible highlighting comprises:
   a conducting layer; and
   a plurality of first rotatable elements, and a plurality of second rotatable elements disposed in a first substrate and a second substrate and in contact with an enabling fluid;
   wherein said first substrate and said second substrate are separated by said conducting layer;
   wherein each said first rotatable element in said plurality has:
      a first collection of responses to incident electromagnetic radiation of interest, where a first response in said first collection of responses renders said first rotatable element transparent-clear to said incident electromagnetic energy of interest, and wherein a second response in said first collection of responses renders said first rotatable element opaque to said incident electromagnetic energy of interest; and
      a first work function; and
   wherein each said second rotatable element in said plurality has:
      a second collection of responses to incident electromagnetic radiation of interest, where a first response in said second collection renders said second rotatable element transparent-clear to said incident electromagnetic energy of interest, and a second response in said second collection renders said second rotatable element transparent-colored to said incident electromagnetic energy of interest; and
      a second work function; and
   wherein said second work function is less than said first work function; and
   wherein said highlighting implement and said conducting layer are configured to introduce a first vector field in a first direction in one of said first substrate and said second substrate, where said first vector field has a magnitude greater than said second work function and less than said first work function.

10. The system of claim 9, further comprising an erasing implement,
   wherein said erasing implement introduces a second vector field in a second direction in one of said first substrate and second substrate, where said second vector field has a magnitude greater than said second work function and less than said first work function.

11. A kit comprising:

said system of claim 10; and a binder;

wherein said two-sided rotating element sheet material with reversible highlighting, said highlighting implement, said erasing implement, and said binder are configured such that said binder holds said two-sided rotating element sheet material with reversible highlighting, and accommodates said highlighting implement, and said erasing implement.

12. A system comprising two-sided rotating element sheet material with reversible highlighting; and a highlighting implement;

wherein said two-sided rotating element sheet material with reversible highlighting comprises:

a conducting layer; and a plurality of first rotatable elements, a plurality of second rotatable elements, and a plurality of third rotatable elements disposed in a first substrate and a second substrate and in contact with an enabling fluid;

wherein said first substrate and said second substrate are separated by said conducting layer;

wherein each said first rotatable elements in said plurality has:

a first collection of responses to incident electromagnetic radiation of interest, where a first response in said first collection of responses renders said first rotatable element transparent-clear to said incident electromagnetic energy of interest, and wherein a second response in said first collection of responses renders said first rotatable element opaque to said incident electromagnetic energy of interest; and a first work function; and wherein each said second rotatable elements in said plurality has:

a second collection of responses to incident electromagnetic radiation of interest, where a first response in said second collection renders said second rotatable element transparent-clear to said incident electromagnetic energy of interest, and a second response in said second collection renders said second rotatable element a first transparent-color to said incident electromagnetic energy of interest; and a second work function; and wherein said second work function is less than said first work function; and wherein each said third rotatable elements in said plurality has:

a third collection of responses to incident electromagnetic radiation of interest, where a first response in said third collection renders said third rotatable element transparent-clear to said incident electromagnetic energy of interest, and a second response in said third collection renders said third rotatable element a second transparent-color to said incident electromagnetic energy of interest; and a third work function; and wherein said third work function is less than said first work function and said second work function; and wherein said second transparent-color is different from said first transparent-color; and wherein said highlighting implement and said conducting layer are configured to introduce a first vector field in a first direction in one of said first substrate and second substrate, and a second vector field in a first direction in one of said first substrate and second substrate, where said first vector field in said first direction has a magnitude greater than said second work function and less than said first work function, and said second vector field in said first direction has a magnitude greater than said third work function and less than said second work function.

13. The system of claim 12, farther comprising an erasing implement, wherein said erasing implement introduces said first vector field in a second direction in one of said first substrate and second substrate, and said second vector field in a second direction in one of said first substrate and second substrate, where said first vector field in said second direction has a magnitude greater than said second work function and less than said first work function, and said second vector field in said second direction has a magnitude greater than said third work function and less than said second work function.

14. A kit comprising:

the system of claim 13; and a binder;

wherein said two-sided rotating element sheet material with reversible highlighting, said highlighting implement, said erasing implement, and said binder are configured such that said binder holds said two-sided rotating element sheet material with reversible highlighting, and accommodates said highlighting implement, and said erasing implement.

15. The system of claims 1 or 2, wherein said incident electromagnetic energy of interest comprises the wavelengths of visible light.

16. The kit of claims 3, 6, 11, or 14, wherein said incident electromagnetic energy of interest comprises the wavelengths of visible light.

17. The method of claim 7, wherein said incident electromagnetic energy of interest comprises the wavelengths of visible light.

* * * * *